US012237746B2

(12) United States Patent
Kim et al.

(10) Patent No.: US 12,237,746 B2
(45) Date of Patent: Feb. 25, 2025

(54) LENS DRIVING DEVICE, CAMERA MODULE, AND OPTICAL APPARATUS

(71) Applicant: LG INNOTEK CO., LTD., Seoul (KR)

(72) Inventors: Jung Cheol Kim, Seoul (KR); Tae Bong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 464 days.

(21) Appl. No.: 17/628,333

(22) PCT Filed: Aug. 6, 2020

(86) PCT No.: PCT/KR2020/010449
§ 371 (c)(1),
(2) Date: Jan. 19, 2022

(87) PCT Pub. No.: WO2021/025511
PCT Pub. Date: Feb. 11, 2021

(65) Prior Publication Data
US 2022/0255414 A1      Aug. 11, 2022

(30) Foreign Application Priority Data

Aug. 6, 2019   (KR) .................. 10-2019-0095442
Oct. 2, 2019   (KR) .................. 10-2019-0122129
Oct. 25, 2019  (KR) .................. 10-2019-0134140

(51) Int. Cl.
*H02K 41/035*    (2006.01)
*G01D 5/14*      (2006.01)
(Continued)

(52) U.S. Cl.
CPC ......... *H02K 41/0354* (2013.01); *G01D 5/145* (2013.01); *G02B 27/646* (2013.01);
(Continued)

(58) Field of Classification Search
CPC ........ G01D 5/145; G02B 27/646; G03B 5/00; G03B 30/00; G03B 2205/0007;
(Continued)

(56) References Cited

U.S. PATENT DOCUMENTS

2018/0252893 A1    9/2018  Park et al.
2019/0025540 A1    1/2019  Shin et al.
(Continued)

FOREIGN PATENT DOCUMENTS

CN    106094160 A    11/2016
CN    107203026 A    9/2017
(Continued)

*Primary Examiner* — Wyatt A Stoffa
*Assistant Examiner* — Grant A Gagnon
(74) *Attorney, Agent, or Firm* — Birch, Stewart, Kolasch & Birch, LLP

(57) ABSTRACT

The present embodiment relates to a lens driving device which includes: a substrate; a housing; a bobbin; a sensing coil; a first magnet; a second magnet; a third magnet; a dummy member; a first coil that includes a first coil unit and a second coil unit; and a first position sensor that is disposed on the substrate and corresponds to the sensing coil, wherein the first magnet and the second magnet are positioned on opposite sides from each other, the third magnet and the dummy member are positioned on opposite sides from each other, the sensing coil is provided with a driving signal, and the first position sensor senses the strength of the magnetic field of the sensing coil and outputs an output signal.

20 Claims, 58 Drawing Sheets

(51) Int. Cl.
*G02B 27/64* (2006.01)
*G03B 5/00* (2021.01)
*G03B 13/36* (2021.01)
*G03B 30/00* (2021.01)
*H04N 23/55* (2023.01)
*H04N 23/54* (2023.01)

(52) U.S. Cl.
CPC ............... *G03B 5/00* (2013.01); *G03B 30/00* (2021.01); *H04N 23/55* (2023.01); *G03B 2205/0007* (2013.01); *G03B 2205/0069* (2013.01); *H04N 23/54* (2023.01)

(58) Field of Classification Search
CPC ....... G03B 2205/0069; H02K 41/0354; H04N 23/55; H04N 23/54
USPC ......................................................... 359/557
See application file for complete search history.

(56) References Cited

U.S. PATENT DOCUMENTS

| | | |
|---|---|---|
| 2019/0137781 A1 | 5/2019 | Hu et al. |
| 2019/0297237 A1 | 9/2019 | Lee et al. |
| 2020/0033551 A1 | 1/2020 | Lee et al. |

FOREIGN PATENT DOCUMENTS

| | | |
|---|---|---|
| CN | 107340668 A | 11/2017 |
| CN | 108476283 A | 8/2018 |
| CN | 109073851 A | 12/2018 |
| CN | 109416456 A | 3/2019 |
| CN | 109477998 A | 3/2019 |
| CN | 109856756 A | 6/2019 |
| CN | 109906407 A | 6/2019 |
| CN | 109975942 A | 7/2019 |
| CN | 111788507 A | 10/2020 |
| KR | 10-2017-0029986 A | 3/2017 |
| KR | 10-2017-0062196 A | 6/2017 |
| KR | 10-2017-0104772 A | 9/2017 |
| KR | 10-2018-0009098 A | 1/2018 |
| WO | WO 2018/182203 A1 | 10/2018 |

LENS DRIVING DEVICE, CAMERA MODULE, AND OPTICAL APPARATUS

CROSS REFERENCE TO RELATED APPLICATIONS

This application is the National Phase of PCT International Application No. PCT/KR2020/010449, filed on Aug. 6, 2020, which claims priority under 35 U.S.C. 119 (a) to Patent Application Nos. 10-2019-0095442 filed in the Republic of Korea on Aug. 6, 2019, 10-2019-0122129 filed in the Republic of Korea on Oct. 2, 2019, and 10-2019-0134140 filed in the Republic of Korea on Oct. 25, 2019, all of which are hereby expressly incorporated by reference into the present application.

TECHNICAL FIELD

The present embodiment relates to a lens driving device, a camera module, and an optical apparatus.

BACKGROUND ART

Since it is difficult to apply the technology of a voice coil motor (VCM) used in an existing general camera module to a camera module for ultra-small size and low power consumption, research related thereto has been actively conducted.

In the case of a camera module mounted on a small electronic product such as a smartphone, the camera module may frequently be impacted during use, and the camera module may be slightly shaken according to a user's hand shake while photographing. In consideration of this point, a technique for additionally installing an anti-shake means to a camera module has recently been developed.

Meanwhile, the autofocus function for automatically adjusting the focus according to the distance of the subject is being studied for a camera module. Furthermore, a feedback function is being studied to perform a more accurate autofocus function.

However, in the case of a conventional camera module with an autofocus feedback function, since the overall size of the camera module increases due to the configuration for detecting the position of the lens, there is a problem in that it is difficult to apply to a smartphone that has a limited space for installing a camera module.

DETAILED DESCRIPTION OF THE INVENTION

Technical Subject

The first embodiment of the present invention provides a lens driving device, and a camera module and an optical apparatus comprising the same capable of: reducing magnetic field interference between magnets comprised in two adjacent lens driving devices mounted on the dual camera module; balancing the electromagnetic force in the X-axis direction and the electromagnetic force in the Y-axis direction to perform the OIS function; and reducing the current consumption by reducing the weight of the OIS moving part.

The second embodiment of the present invention provides a lens driving device, and a camera module and an optical apparatus comprising the same capable of preventing malfunction of AF drive due to magnetic field interference and enhancing the accuracy of autofocusing by providing a magnetic field to the position sensor using a sensing coil instead of a sensing magnet.

The third embodiment of the present invention provides a camera module comprising a structure in which an increase in the overall size of the camera module is minimized compared to a camera module not equipped with an autofocus feedback function, and an assembly operation for electrically conducting the sensing coil is easy.

In addition, it is to provide a lens driving device provided to the camera module.

Technical Solution

A lens driving device according to a first embodiment comprises: a substrate; a housing disposed on the substrate; a bobbin disposed inside the housing; a sensing coil disposed on the bobbin; a first magnet, a second magnet, a third magnet, and a dummy member disposed on different side portions of the housing; a first coil comprising a first cod unit corresponding to the first magnet and a second coil unit corresponding to the second magnet; and a first position sensor disposed on the substrate and corresponding to the sensing coil, wherein the first magnet and the second magnet are located opposite to each other, and the third magnet and the dummy member are located opposite to each other, and wherein a driving signal is provided to the sensing coil, and the first position sensor detects the strength of the magnetic field of the sensing coil and outputs an output signal.

The sensing coil may be overlapped with the first position sensor in an optical axis direction.

The bobbin may comprise a protruding part being protruded from an outer side surface, and the sensing coil may be coupled to the protruding part of the bobbin.

The sensing coil may have a ring shape comprising a central hole, and the central hole of the sensing coil may be parallel to an optical axis.

The sensing coil may be coupled to a lower surface of the protruding part.

The dummy member may comprise a first dummy and a second dummy spaced apart from each other, and at least a portion of the sensing coil may be disposed between the first dummy and the second dummy.

The lens driving device may comprise a second coil comprising third to fifth coil units corresponding to the first to third magnets in the optical axis direction, and a second position sensor disposed on the substrate and comprising a first sensor corresponding to the first magnet and a second sensor corresponding to the third magnet.

The sensing coil may not be overlapped with the third to fifth coil units in the optical axis direction.

The first position sensor may be a Hall sensor, a driver IC comprising the Hall sensor, or a tunnel magnetoresistance (TMR) sensor.

The lens driving device may comprise: an elastic member coupled to the bobbin and the housing; and a support member connecting the elastic member and the substrate.

A lens driving device according to another embodiment comprises: a fixed part; an AF moving part comprising bobbin, and an OIS moving part comprising housing; a first elastic part for supporting the AF moving part against the housing; a second elastic part for supporting the OIS moving part against the fixed part; an AF coil disposed on the bobbin; a sensing coil disposed on the bobbin; a first magnet and a second magnet disposed on the housing and positioned opposite to each other; a third magnet and a dummy member disposed on the housing and positioned opposite to each other; first to third OIS coil units corresponding to the first to third magnets in the optical axis direction; an AF position sensor disposed on the fixed part and corresponding to the sensing coil in the optical axis direction; and a first OIS sensor disposed in the fixed part and corresponding to the first magnet and a second OIS sensor corresponding to the third magnet, wherein a driving signal is provided to the sensing coil, and wherein the AF position sensor may detect the strength of the magnetic field of the sensing coil and output an output signal.

A lens driving device according to a second embodiment of the present invention comprises: a base; a housing disposed on the base; a bobbin disposed inside the housing; a coil disposed on the bobbin; a sensing coil disposed on the bobbin; and a position sensor disposed on the base and corresponding to the sensing coil, wherein a first driving signal is provided to the sensing coil, and wherein the position sensor detects the strength of the magnetic field of the sensing coil and may output an output signal.

A second driving signal is provided to the coil, and the bobbin is moved in the optical axis direction by interaction between the coil and the magnet, wherein when the bobbin moves in the optical axis direction, and wherein the first driving signal may be a DC signal having a constant value.

The sensing coil may be overlapped with the position sensor in the optical axis direction.

The coil may be coupled to an outer side surface of the bobbin, and the sensing coil may be disposed below the coil.

The sensing coil may have a ring shape comprising a central hole, and the central hole of the sensing coil may be parallel to an optical axis.

The lens driving device comprises: a terminal part disposed on the base, wherein the terminal part comprises a first terminal; a second terminal, a third terminal, and a fourth terminal spaced apart from one another, and wherein the position sensor may be electrically connected to the first to fourth terminals.

The lens driving device comprises a lower elastic member coupled to a lower portion of the bobbin and a lower portion of the housing, wherein the lower elastic member comprises a first elastic member, a second elastic member, a third elastic member, and a fourth elastic member, wherein the coil is electrically connected to the first and second elastic members, and wherein the sensing coil may be electrically connected to the third and fourth elastic members.

The shortest distance between the coil and the position sensor may be smaller than the shortest distance between the position sensor and the magnet.

The first to fourth terminals are disposed in the base, wherein the base comprises a groove exposing one end of each of the first to fourth terminals, and the position sensor is disposed in the groove, and wherein the other end of each of the first to fourth terminals may be exposed to an outer side surface of the base.

The position sensor may be a Hall sensor, a driver IC comprising the Hall sensor, or a Tunnel Magnetoresistance (TMR) sensor.

A lens driving device according to a third embodiment of the present invention comprises: a cover comprising an upper plate and a side plate being extended from the upper plate; a bobbin disposed inside the cover; a base disposed below the bobbin; a first coil disposed on the bobbin; a magnet disposed between the first coil and the side plate of the cover; an elastic member connected to the bobbin; and a substrate comprising a second coil and disposed on the base, wherein the substrate is disposed on an upper surface of the base, and wherein the elastic member may comprise an outer side portion disposed on an upper surface of the substrate.

An induced voltage may be generated in the second coil by interaction with the first coil.

The outer side portion of the elastic member may be fixed to the upper surface of the substrate by an adhesive.

The elastic member comprises a hole formed in the outer side portion, wherein the substrate comprises a hole formed in a position corresponding to the hole in the outer side portion, wherein the base comprises a groove formed on the upper surface of the base at a position corresponding to the hole of the substrate, and wherein an adhesive may be disposed in at least a portion of the hole of the outer side portion, the hole of the substrate, and the groove of the base.

The elastic member comprises a hole formed in the outer side portion, wherein the substrate comprises a hole formed in a position corresponding to the hole in the outer side portion, wherein the base comprises a protrusion formed on the upper surface of the base at a position corresponding to the hole of the substrate, and wherein the protrusion of the base may be inserted into the hole of the outer side portion and the hole of the substrate.

The second coil may be formed as a patterned coil on the substrate.

The base comprises a protruding part formed on the upper surface of the base and being extended from an outer side surface of the base, wherein the protruding part comprises a first protruding part formed on a first side of the outer side surface of the base, and a second protruding part formed on a second side of the outer side surface of the base opposite to the first side, and wherein the substrate may comprise a body part disposed between the first protruding part and the second protruding part.

The substrate comprises a terminal part being extended downwardly from the body part and disposed on a third side of the outer side surface of the base, wherein the elastic member comprises a first lower elastic unit electrically connected to one end of the first coil, and a second lower elastic unit spaced apart from the first lower elastic unit and electrically connected to the other end of the first coil, wherein each of the first lower elastic unit and the second lower elastic unit comprises a terminal, and wherein the terminal part of the substrate may be disposed between the terminal of the first lower elastic unit and the terminal of the second lower elastic unit.

The board comprises a terminal part being extended downward from the body part and disposed on a third side of the outer side surface of the base, wherein the elastic member comprises a first lower elastic unit electrically connected to one end of the first coil, and a second lower elastic unit spaced apart from the first lower elastic unit and electrically connected to the other end of the first coil, wherein each of the first lower elastic unit and the second lower elastic unit are electrically connected to the substrate, and wherein the terminal unit of the substrate may comprise two terminals electrically connected to the first coil and two terminals electrically connected to the second coil.

The bobbin may comprise a stopper being overlapped with the base in the optical axis direction and being protruded from a lower surface of the bobbin, wherein the substrate may comprise a hole formed at a position corresponding to the stopper.

At least a portion of the second coil may be overlapped with the first coil in the optical axis direction.

At least a portion of the substrate may be overlapped with the magnet in the optical axis direction.

A camera module according to a third embodiment of the present invention may comprise a printed circuit board; an image sensor disposed on the printed circuit board; the lens driving device; and a lens coupled to the bobbin of the lens driving device and disposed at a position corresponding to the image sensor.

The optical apparatus according to the third embodiment of the present invention may comprise the camera module.

A lens driving device according to a third embodiment of the present invention comprises: a cover comprising an upper plate and a side plate being extended from the upper plate; a bobbin disposed inside the cover; a base disposed below the bobbin; a first coil disposed on the bobbin; a magnet disposed between the first coil and the side plate of the cover; an elastic member connected to the bobbin; and a substrate comprising a second coil and disposed on the base, wherein the elastic member comprises an inner portion coupled to the bobbin, an outer side portion coupled to the substrate or the base, and a connection part connecting the inner portion and the outer side portion, and wherein the substrate may be disposed between the outer side portion of the elastic member and the base.

A lens driving device according to a third embodiment of the present invention comprises: a cover comprising an upper plate and a side plate being extended from the upper plate; a bobbin disposed inside the cover; a base disposed under the bobbin; a first coil disposed on the bobbin; a magnet disposed between the first coil and the side plate of the cover; an elastic member connected to the bobbin; and a substrate comprising a second coil and disposed on the base, wherein the elastic member comprises a first lower elastic unit electrically connected to one end of the first coil, and a second lower elastic unit spaced apart from the first lower elastic unit and electrically connected to the other end of the first coil, and wherein each of the first lower elastic unit and the second lower elastic unit may be electrically connected to the substrate.

Advantageous Effects

A first embodiment of the present invention is capable of: reducing magnetic field interference between magnets comprised in two adjacent lens driving devices mounted on a dual camera module; balancing the electromagnetic force in the X-axis direction and the electromagnetic force in the Y-axis direction to perform the OIS function; and reducing the current consumption by reducing the weight of the OIS moving part.

The second embodiment of the present invention provides a magnetic field to the position sensor using a sensing coil instead of a sensing magnet, thereby preventing malfunction of AF driving due to magnetic field interference and improving autofocusing accuracy.

The size of a camera module having an auto focus feedback function can be minimized through the third embodiment of the present invention.

In addition, there is an advantage in that there is no need to separately wind and assemble the sensing coil when compared to other comparative examples using the sensing coil.

Furthermore, since the electrical conduction of the sensing coil is completed only by electrically conducting the terminal of the FPCB patterned with the sensing coil to the printed circuit board, there is an advantage that an additional soldering connection process is not required.

BRIEF DESCRIPTION OF DRAWINGS

FIG. 33b shows a bottom view of FIG. 33a.

FIG. 58 is a perspective view illustrating a state in which a lower elastic member is additionally coupled to FIG. 57a.

BEST MODE

Figure 1:
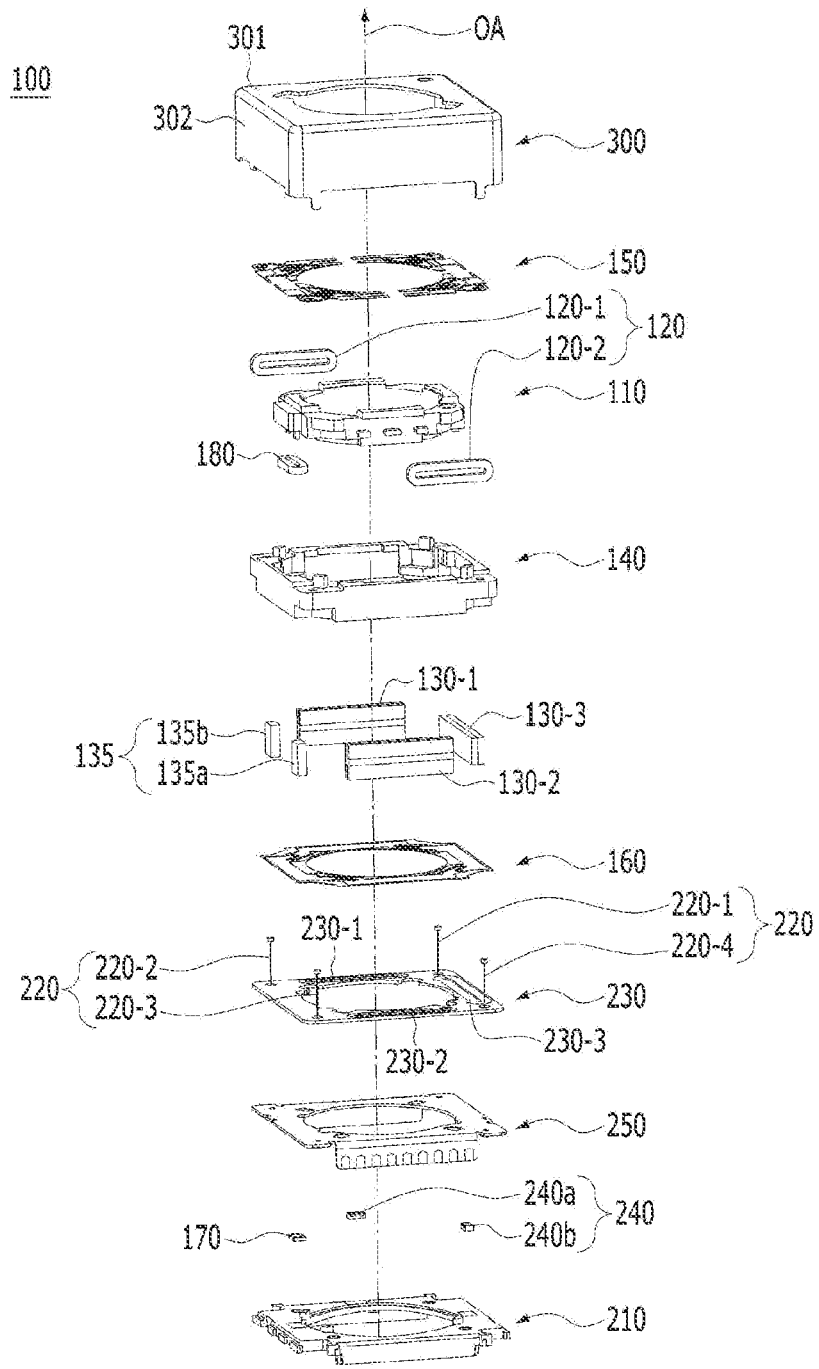
FIG. 1 is an exploded view of a lens driving device according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention. In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components. In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

Hereinafter, the lens driving device may be expressed by replacing it with a lens driving unit, a voice coil motor (VCM), an actuator, or a lens moving device, and the like, and the term "coil" hereinafter may be expressed by replacing it with a coil unit, and the term "elastic member" may be expressed by replacing it with an elastic unit or a spring.

In addition, in the following description, the term "terminal" may be expressed by replacing it with a pad, an electrode, a conductive layer, or a bonding part and the like.

For convenience of description, the lens driving device according to the embodiment is described using a Cartesian coordinate system (x, y, z), but may be described using other coordinate systems, and the embodiment is not limited thereto. In each drawing, the x-axis and y-axis refer to directions perpendicular to the z-axis, which is the optical axis direction, the z-axis direction, which is the optical axis (OA) direction, is referred to as a 'first direction', the x-axis direction is referred to as a 'second direction', and the y-axis direction may be referred to as a 'third direction'.

A lens driving device according to an embodiment may perform an 'auto-focusing function'. Here, the auto-focusing function refers to automatically focusing the image of the subject on the image sensor surface.

In addition, the lens driving device according to the embodiment may perform a 'hand shake correction function'. Here, the hand shake correction function refers to a function that can prevent the outline of a photographed image from not being clearly formed due to vibration caused by a user's hand shake during photographing of a still image.

Figure 2:
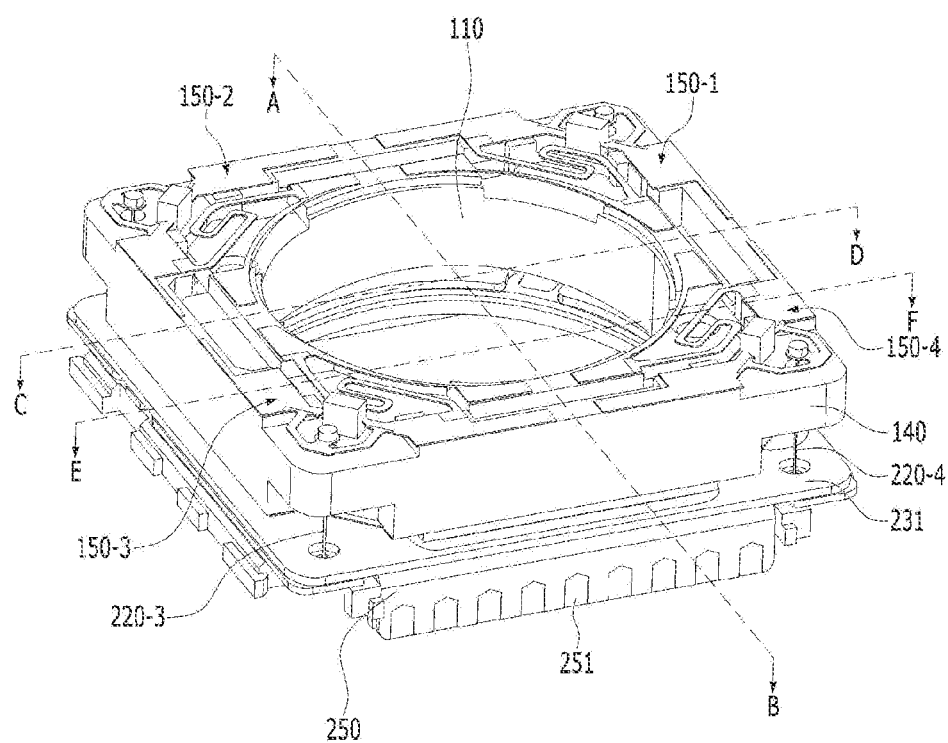
FIG. 2 is a perspective view of a lens driving device excluding a cover member.

FIG. 1 is an exploded view of a lens driving device 100 according to a first embodiment of the present invention, and FIG. 2 is a perspective view of a lens driving device 100 excluding a cover member 300.

Referring to FIGS. 1 and 2, the lens driving device 100 may comprise: a bobbin 110, a first coil 120, a first magnet 130-1, a second magnet 130-2, and a third magnet 130-3, a dummy member 135, a housing 140, an upper elastic member 150, a lower elastic member 160, a first position sensor 170, a sensing coil 180, and a second coil 230.

The lens driving device 100 may further comprise at least one of a base 210, a circuit board 250, and a support member 220.

In addition, the lens driving device 100 may further comprise a balancing coil (not shown) for attenuating the weight of the sensing coil 180 or the influence of a magnetic field.

In addition, the lens driving device 100 may further comprise a second position sensor 240 for driving an optical image stabilizer (OIS) feedback. In addition, the lens driving device 100 may further comprise a cover member 300.

The present embodiment may provide a lens driving device comprising an OIS function capable of reducing or suppressing magnetic field interference between magnets comprised in two adjacent lens driving devices mounted on a dual camera module.

In addition, the present embodiment can balance the electromagnetic force generated in the X-axis direction and the electromagnetic force generated in the Y-axis direction in order to perform the OIS function.

In addition, the present embodiment reduces the number of magnets for OIS, reduces the size of the magnet for OIS, and reduces the weight of the OIS moving part, thereby reducing current consumption.

First, the bobbin 110 will be described.

The bobbin 110 is disposed at an inner side of the housing 140, and may be moved in an optical axis OA direction or in a first direction (e.g., the Z-axis direction) by the electromagnetic interaction between the first coil 120 and the first and second magnets 130-1 and 130-2.

Figure 3A:
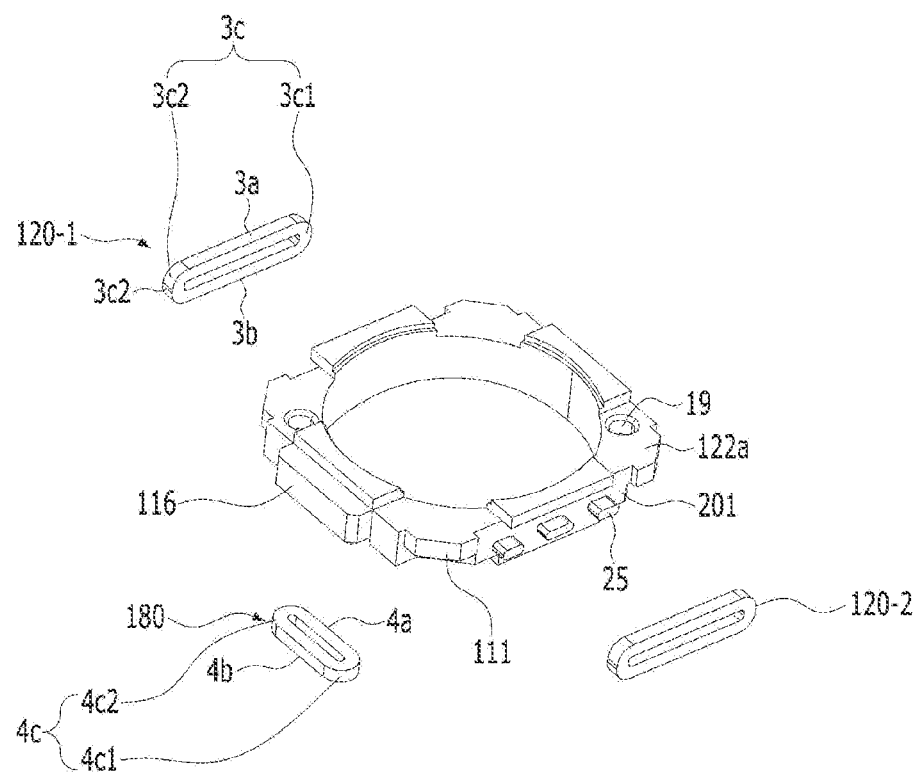
FIG. 3a is an exploded perspective view of a bobbin, a first coil unit, a second coil unit, and a sensing coil.
Figure 3B:
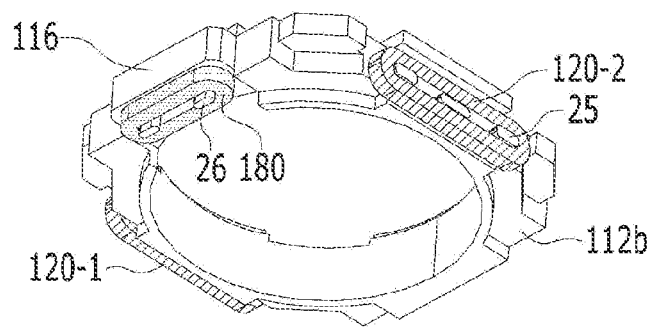
FIG. 3b is an assembled perspective view of a bobbin, a first coil unit, a second coil unit, and a sensing coil.

FIG. 3a is an exploded perspective view of a bobbin 110, a first coil unit 120-1, a second coil unit 120-2, and a sensing coil 180, and FIG. 3b is an assembled perspective view of a bobbin 110, a first coil unit 120-1, a second coil unit 120-2, and a sensing coil 180.

Referring to FIGS. 3a and 3b, the bobbin 110 may have an opening for mounting a lens or a lens barrel. For example, the opening of the bobbin 110 may be in the form of a through hole penetrating through the bobbin 110, and the opening of the bobbin 110 may have a circular shape, an oval shape, or a polygonal shape, but is not limited thereto.

A lens may be directly mounted in the opening of the bobbin 110, but is not limited thereto, and in another embodiment, a lens barrel to which at least one lens is mounted or coupled may be coupled or mounted to the opening of the bobbin 110. The lens or the lens barrel may be coupled to the inner circumferential surface of the bobbin 110 in various ways.

The bobbin 110 may comprise a plurality of side portions spaced apart from each other, and the plurality of side portions may be connected to each other.

For example, the bobbin 110 may comprise side portions corresponding to the side portions 141-1 to 141-4 of the housing 140 and corner portions (or corners) corresponding to the corner portions 1424 to 142-4 of the housing 140.

In two side portions located opposite to each other among the side portions of the bobbin 110, a seating groove 201 for disposing, mounting, or seating the first coil unit 120-1 and the second coil unit 120-2 may be provided.

For example, the seating groove 201 may be formed on first and second outer side surfaces of the bobbin 110 positioned opposite to each other. The seating groove 201 may have a structure that is recessed from the first and second outer side surfaces of the bobbin 110 and may have a shape that matches the shapes of the first coil unit 120-1 and the second coil unit 120-2.

On each of the first and second outer side surfaces positioned opposite to each other of the bobbin 110, a protrusion 25 for coupling with a corresponding one of the first and second coil units 120-1 and 120-2, respectively can be provided.

For example, a first protrusion for mounting or winding the first coil unit 120-1 may be formed on the first outer side surface of the bobbin 110, and a second protrusion for mounting or winding the second coil unit 120-2 may be formed on the second outer side surface of the bobbin 110. For example, the protrusion 25 may be protruded from the bottom surface of the seating groove 201.

On the other one outer side surface (for example, the fourth outer side surface) of the bobbin 110, which is not the first and second outer side surfaces of the bobbin 110, a protruding part 116 may be provided. A protrusion 26 for mounting or disposing the sensing coil 180 may be formed on the protruding part 116.

The protruding part 116 may be protruded from an outer side surface (for example, a fourth outer side surface) of the side portion of the bobbin 110 in a direction perpendicular to the optical axis. For example, the protruding part 116 may be protruded in a direction parallel to a straight line passing through the center of the opening of the bobbin 110 and perpendicular to the optical axis direction.

For example, the protrusion 26 may be protruded downward from the lower surface of the protruding part 116 or in a direction toward the first position sensor 170.

In addition, the bobbin 110 may further comprise a protrusion formed on another side portion (or a third outer side surface) of the bobbin 110 for mounting or disposement of the balancing coil. In this case, the third outer side surface of the bobbin 110 may be an outer side surface positioned opposite to the fourth outer side surface of the bobbin 110.

A protruding part 111 may be formed at corner portions of the bobbin 110. The protruding part 111 of the bobbin 110 passes through the center of the opening of the bobbin 110 and may be protruded in a direction parallel to a straight line perpendicular to the optical axis direction, but is not limited thereto.

The protruding part 111 of the bobbin 110 corresponds to the groove portion 145 of the housing 140, and may be inserted or disposed in the groove portion 145 of the housing 140, and it is possible to suppress or prevent the bobbin 110 from being moved or rotated over a certain range about the optical axis.

A first escape groove 122a for avoiding spatial interference with the first frame connection part 153 of the upper elastic member 150 may be provided on an upper surface of the bobbin 110, and a second escape groove 122b for avoiding spatial interference with the second frame connection part 163 of the lower elastic member 150 may be provided on a lower surface of the bobbin 110. For example, the first and second escape grooves 122a and 122b may be formed in the corner portion of the bobbin 110, but is not limited thereto. In another embodiment, the first and second escape grooves 122a and 122b may be formed in the side portion of the bobbin 110.

Although not illustrated in FIGS. 3a and 3b, the bobbin 110 may comprise a first stopper being protruded from the upper surface and a second stopper being protruded from the lower surface. When the bobbin 110 moves in the first direction for the auto-focusing function, the first and second stoppers of the bobbin 110 may prevent the upper surface of the bobbin 110 from directly colliding with the inner side of the upper plate of the cover member 300 even if the bobbin 110 moves beyond the prescribed range due to an external impact, and may prevent the lower surface of the bobbin 110 from directly colliding with the base 210, the second coil 230, and/or the circuit board 250.

A first coupling part for coupling and fixing to the upper elastic member 150 may be provided on an upper surface of the bobbin 110, and a second coupling part for coupling and fixing to the lower elastic member 160 may be provided on a lower surface of the bobbin 110.

For example, in FIGS. 3a and 3b, the first and second coupling parts of the bobbin 110 may have a planar shape, but are not limited thereto, and in another embodiment, the first and second coupling parts of the bobbin 110 may have a groove or protrusion shape.

A screw thread for coupling with a lens or a lens barrel may be provided on an inner circumferential surface of the bobbin 110. A thread may be formed on an inner circumferential surface of the bobbin 110 in a state in which the bobbin 110 is fixed by a jig or the like, and a groove 19 for fixing the jig may be provided on an upper surface of the bobbin 110.

Next, the first coil 120 will be described.

The first coil 120 comprises a first coil unit 120-1 and a second coil unit 120-2 disposed on two side portions positioned opposite to each other among side portions of the bobbin 110.

Here, the "coil unit" may be expressed by replacing it with a coil part, a coil block, or a coil ring.

For example, the first coil unit 120-1 may be disposed on the first side portion of the bobbin 110 corresponding to the first side portion 1414 of the housing 140, and the second coil unit 120-2 may be disposed on the second side portion of the bobbin 110 corresponding to the second side portion 141-2 of the housing 140.

The first and second coil units 120-1 and 121-2 may be disposed in the seating groove 201 of the bobbin 110. The first and second coil units 120-1 and 121-2 may be coupled to the protrusion 25 of the bobbin 110 or wound around the protrusion 25.

Each of the first coil unit 120-1 and the second coil unit 120-2 may comprise at least one of a circular shape, an elliptical shape, and a closed curve shape. For example, each of the first coil unit 120-1 and the second coil unit 120-2 passes through the center of the opening of the bobbin and may have a coil ring shape wound around an axis perpendicular to the optical axis.

For example, each of the first and second coil units 120-1 and 120-2 may comprise a central hole, and the central hole may face an outer side surface of the bobbin 110 on which the first and second coil units 120-1 and 120-2 are disposed, and may be coupled to the protrusion 25.

For example, each of the first and second coil units 120-1 and 120-2 may comprise a first portion 3a, a second portion 3b disposed below the first portion 3a, and a connecting portion 3c connecting the first portion 3a and the second portion 3b to each other, and a closed curve may be formed by the first to third portions 3a to 3c.

The third part 3c may comprise: a first connecting portion 3c1 connecting one end of the first portion 3a and one end of the second portion 3b; and a second connecting portion 3c2 connecting the other end of the first portion 3a and the other end of the second portion 3b.

The first coil 120 is disposed between the first coil unit 120-1 and the second coil unit 120-2, and may comprise a connection part (not shown) or a connection coil for connecting the first coil unit 120-1 and the second coil unit 121-2 to each other.

One end of the connection part of the first coil 120 may be connected to one end of the first coil unit 120-1, and the other end of the connection part of the first coil 120 may be connected to one end of the second coil unit 120-2. That is, the first coil unit 120-1 and the second coil unit 120-2 may be connected in series by the connection part of the first coil 120, and one driving signal may be provided to the first coil 120.

For example, the connection part of the first coil 120 may face the third magnet 130-1, and may be disposed between the third magnet 130-1 and the bobbin 110.

According to another embodiment, the connection part of the first coil 120 may face the dummy member 135 and may be disposed between the dummy member 135 and the bobbin 110.

In another embodiment, the first coil unit 120-1 and the second coil unit 120-2 may be separated or spaced apart from each other, and separate driving signals may be provided to each of the first coil unit 120-1 and the second coil unit 120-2.

Power or a driving signal may be provided to the first coil 120.

The power or driving signal provided to the first coil 120 may be a DC signal or an AC signal, or may comprise a DC signal and an AC signal, and may be in the form of voltage or current.

When a driving signal (for example, driving current) is supplied to the first coil 120, an electromagnetic force may be formed through electromagnetic interaction between the first coil 120 and the first and second magnets 130-1 and 130-2, and the bobbin 110 may be moved in the optical axis OA direction by the generated electromagnetic force.

In the initial position of the AF moving part, the bobbin 110 may be moved in an upper or lower direction (for example, Z-axis direction), which is referred to as bidirectional driving of the AF moving part. Or, in the initial position of the AF moving part, the bobbin 110 may be moved upward, which is referred to as unidirectional driving of the AF moving part.

The AF moving part may comprise a bobbin 110 and components coupled to the bobbin 110. For example, the AF moving part may comprise a bobbin 110, a first coil 120, a sensing coil 180, and/or a balancing magnet. In addition, the AF moving part may further comprise a lens mounted on the bobbin 110.

And the initial position of the AF moving part is the initial position of the AF moving part in the state that power is not applied to the first coil 120, or it may be the position where the AF moving part is placed as the upper and lower elastic members 150 and 160 are elastically deformed only by the weight of the AF moving part.

In addition, the initial position of the bobbin 110 is when the gravity acts in the direction from the bobbin 110 to the base 210, or conversely, it can be a location when the gravity acts in the direction from the base 210 to the bobbin 110, the AF moving part is placed.

At the initial position of the AF moving part, the first coil unit 120-1 may face or overlap with the first magnet 130-1 in a direction perpendicular to the optical axis and in a direction directing from the optical axis toward the first coil unit 120-1 (or the center of the first coil unit 120-1), but does not face or overlap with the third magnet 130-3.

At the initial position of the AF moving part, the second coil unit 120-2 may face or overlap with the second magnet 130-2 in a direction perpendicular to the optical axis, in a direction from the optical axis toward the second coil unit 120-2 (or the center of the second coil unit 120-2), but does not face or overlap with the third magnet 130-3.

Next, the sensing coil 180 will be described.

The sensing coil 180 may be disposed on any one side portion of the side portions of the bobbin 110 in which the first coil unit 120-1 and the second coil unit 120-2 are not disposed. For example, the sensing coil 180 may be disposed on the protruding part 116 of the bobbin 110, and may be coupled to or wound around the protrusion 26.

When the lens driving device 100 comprises a balancing sensing coil, the balancing sensing coil may be disposed at any one side portion among the side portions of the bobbin 110, in which the first coil unit 120-1 and the second coil unit 120-2 are not disposed. For example, the balancing sensing coil may be coupled to or wound on a protrusion formed on the other side portion of the bobbin 110.

The balancing sensing coil may be the one for canceling the effect of the magnetic field of the sensing coil 180 and balancing the weight with the sensing coil 180, thereby performing an accurate AF operation.

The sensing coil 180 may provide a magnetic field to the first position sensor 170 for sensing thereby. The sensing coil 180 may be provided with a driving signal or power to generate a magnetic field. The driving signal provided to the sensing coil 180 may comprise at least one of a direct current signal and an alternating current signal. In addition, the driving signal may be in the form of current or voltage.

The sensing coil 180 may comprise at least one of a circular shape, an elliptical shape, and a closed curve shape. For example, the sensing coil 180 may have a coil ring shape wound to be rotated around an axis parallel to the optical axis.

For example, the sensing coil 180 may comprise a central hole, and the central hole may be parallel to the optical axis. Or, the central hole of the sensing coil 180 may face the lower surface of the protruding part 116 of the bobbin 110 on which the sensing coil 180 is disposed, and may be coupled to the protrusion 26.

For example, the sensing coil 180 may comprise: a first part 4a; a second portion 4b disposed below the first portion 4a; and a connecting portion 4c connecting the first portion 4a and the second portion 4b to each other, wherein a closed curve may be formed by the first to third portions 4a to 4c.

The third part 4c may comprise a first connection portion 4c1 connecting one end of the first portion 4a and one end of the second portion 4b, and a second connection portion 4c2 connecting the other end of the first portion 4a and the other end of the second portion 4b.

For example, the first portion 3a or 4a may be expressed as a "first straight portion", the second portion 3b or 4b may be expressed as a "second straight portion", and the third portion 3c or 4c may be expressed as a "curved portion", the first connection portion 3c1 or 4c1 may be expressed as a "first curved portion", and the second connection portion 3c2 or 4c2 may be expressed as "second curved portion".

The sensing coil 180 may move in the optical axis OA direction together with the bobbin 110 by the interaction between the first coil unit 120-1 and the first magnet 130-1 and the interaction between the second coil unit 120-2 and the second magnet 130-2, and the first position sensor 170 may detect the strength of the magnetic field of the sensing coil 180 moving in the optical axis direction, and may output an output signal according to the detected result.

For example, the control unit 830 of the camera module or the control unit 780 of the terminal may detect the displacement of the bobbin 110 in the optical axis direction based on the output signal outputted by the first position sensor 170.

Next, the housing 140 will be described.

The housing 140 accommodates at least a portion of the bobbin 110 inside thereof, and supports the first magnet 130-1, the second magnet 134-2, the third magnet 130-3, and the dummy member 135.

Figure 4A:
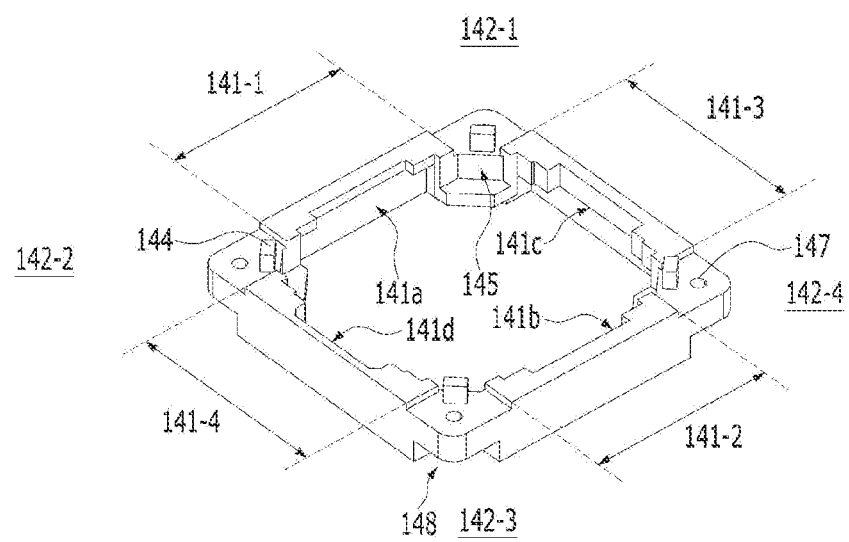
FIG. 4a is an exploded perspective view of a housing, first to third magnets, and a dummy member.
Figure 4B:
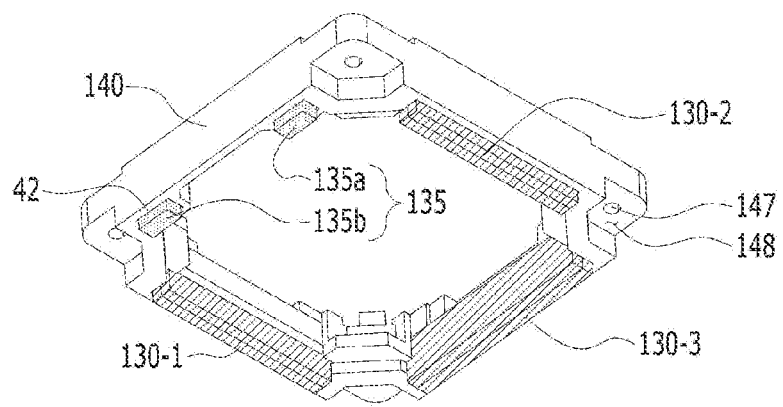
FIG. 4b is an assembled perspective view of a housing, first to third magnets, and a dummy member.

FIG. 4a is an exploded perspective view of a housing 140, first to third magnets 130-1 to 130-3, and a dummy member, and FIG. 4b is an assembled perspective view of a housing, first to third magnets, and a dummy member.

Referring to FIGS. 4a and 4b, the housing 140 may be disposed inside the cover member 300, and may be disposed between the cover member 300 and the bobbin 110. The housing 140 may accommodate the bobbin 110 inside. The outer side surface of the housing 140 may be spaced apart from the inner surface of the side plate 302 of the cover member 300.

The housing 140 may be in the shape of a hollow column comprising an opening or a hollow.

For example, the housing 140 may have a polygonal (For example, square, or octagonal) or circular opening, and the opening of the housing 140 may be in the form of a through hole penetrating through the housing 140 in the optical axis direction.

The housing 140 may comprise a plurality of side portions 141-1 to 141-4 and a plurality of corner portions 142-1 to 142-4.

For example, the housing 140 may comprise first to fourth side portions 141-1 to 141-4 and first to fourth corner portions 142-1 to 142-4.

The first to fourth side portions 141-1 to 141-4 may be spaced apart from each other. Each of the corner portions 142-1 to 142-4 of the housing 140 may be disposed or positioned two adjacent side portions 141-1 and 141-3, 141-1 and 141-4, 141-4 and 141-2, 141-2 and 141-3, and may connect the side portions 141-1 to 141-4 to each other.

For example, the corner portions 142-1 to 142-4 may be located at a corner or a corner of the housing 140. For example, the number of side portions of the housing 140 is four, and the number of corner portions is four, but is not limited thereto.

Each of the side portions 141-1 to 141-4 of the housing 140 may be disposed parallel to any corresponding one of the side plates of the cover member 300.

The length of each of the side portions 141-1 to 141-4 of the housing 140 in a horizontal direction may be greater than the length of each of the corner portions 142-1 to 142-4 in a horizontal direction, but is not limited thereto.

The first side portion 141-2 and the second side portion 141-2 of the housing 140 may be located opposite to each other, and the third side portion 141-3 and the fourth side portion 141-4 may be located opposite to each other. Each of the third side portion 141-3 and the fourth side portion 141-4 of the housing 140 may be positioned between the first side portion 141-2 and the second side portion 141-2.

In order to prevent a direct collision with the inner side surface of the upper plate 301 of the cover member 300, a stopper 144 may be provided on an upper portion, an upper end, or an upper surface of the housing 140.

For example, a stopper 144 may be provided on an upper surface (For example, the first surface 51a) of each of the corner portions 142-1 to 142-4 of the housing 140, but is not limited thereto.

In an upper part, an upper part, or an upper surface of the housing 140, at least one first coupling part coupled to the first outer frame 152 of the upper elastic member 150 may be provided. In addition, in a lower portion, a lower end, or a lower surface of the housing 140, at least one second coupling part coupled to and fixed to the second outer side frame 162 of the lower elastic member 160 may be provided.

Each of the first coupling part and the second coupling part of the housing 140 may be any one of a flat surface, a groove, or a protrusion.

The first coupling part of the housing 140 and the first outer side frame 152 of the upper elastic member 150 may be coupled to each other using heat fusion or an adhesive, and the second coupling part of the housing 140 and the second outer side frame 162 of the lower elastic member 160 may be coupled to each other.

The housing 140 may comprise: a first seating portion 141a provided on any one of the two side portions positioned opposite to each other, for example, the first side portion 141-1, in which the first magnet 130-1 is to be disposed; and a second seating part 141b provided on the other one 141-2 of the two side portions, in which the second magnet 130-2 is to be disposed.

In addition, the housing 140 may comprise: a third seating portion 141c provided on any one of the other two side portions positioned opposite to each other, for example, the third side portion 141-3, in which the third magnet 130-3 is to be disposed; and a fourth seating portion 141d provided on the other one 141-4 of the other two side portions, in which the protruding part 116 of the bobbin 110 is to be disposed.

For example, at least a portion of the sensing coil 180 may be disposed on the fourth seating portion 141d of the housing 140.

Each of the first to third seating portions 141a to 141c of the housing 140 may be provided on an inner side surface of any one of the side portions of the housing 140, but is not limited thereto, and may be provided on an outer side surface.

Each of the first to third seating portions 141a to 141c of the housing 140 may be formed to be corresponding to any one among the first to third magnets 130-1 to 130-3, or as a groove with a matching shape, for example, a convex groove, but is not limited thereto.

For example, the first seating portion 141a (or the second seating portion 141b) of the housing 140 may be formed with a first opening facing the first coil unit 120-1 (or the second coil unit), and may be formed with a second opening facing the third coil unit 230-1 (or the fourth coil unit 230-2, and this is for facilitating the mounting of the magnet 130.

A first opening facing the outer side surface of the bobbin 110 and a second opening facing the fifth coil unit 230-3 may be formed in the third seating portion 141c of the housing 140.

In addition, the fourth seating portion 141d of the housing 140 may be formed to be corresponding to the protruding part 116 of the bobbin 110 or as a groove with a matching shape, for example, a convex groove, but is not limited thereto, and in another embodiment, it may be in the form of a through hole penetrating the side portion of the housing 140.

The fourth seating portion 141d of the housing 140 may comprise a first opening open toward the inner side surface of the fourth side portion 141-4 of the housing 140 and a second opening open toward the lower surface of the fourth side portion 141-4 of the housing 140.

For example, one side of the first to third magnets 130-1, 130-2, 130-3 fixed to, or disposed at the first to third seating portions 141a, 141b, and 141c of the housing 140 may be exposed through the first opening of the seating portions 141a, 141b, and 141c. In addition, the lower surfaces of the first to third magnets 130-1, 130-2, and 130-3 fixed to or disposed at the first to third seating portions 141a, 141b, and 141c of the housing 140 may be exposed through the second opening of the seating portion 141a, 141b, and 141c.

At least a portion of the sensing coil 180 disposed on the fourth seating portion 141d of the housing 140 may be exposed through the second opening of the fourth side portion 141-1 of the housing 140.

For example, at least a portion of a lower portion or a lower surface of the sensing coil 180 may be exposed through the second opening of the fourth side portion of the housing 140, and may face or overlap with the first position sensor 170 in the optical axis direction.

For example, at least one of the first straight portion 4a and the second straight portion 4b of the sensing coil 180 may be overlapped with the first position sensor 170 in the optical axis direction. Or, at least a portion of the central hole of the sensing coil 180 may be overlapped with the first position sensor 170 in the optical axis direction.

Seating grooves 41 and 42 for disposement of the dummy member 135 may be provided in the fourth side portion 141-4 of the housing 140. For example, in the fourth side portion 141-4 of the housing 140, a first seating groove 41 for disposement of the first dummy 135a, and a second seating groove 42 for disposement of the second dummy 135b may be formed. Each of the first and second seating: grooves 41 and 42 may be in the form being recessed from a lower surface of the fourth side portion 141-4 of the housing 140, but is not limited thereto.

A fourth seating portion 141d may be disposed between the first seating groove 41 and the second seating groove 42 of the housing 140, but is not limited thereto.

For example, the first to third magnets 130-1 to 130-3 may be attached to or fixed to the first to third seating portions 141a to 141c by means of an adhesive. In addition, the dummy member 135 may be attached or fixed inside the seating grooves 41 and 42 of the housing 140 by an adhesive.

Support members 220-1 to 220-4 may be disposed on the corner portions 142-1 to 142-4 of the housing 140, and the corner portions 142-1 to 142-4 may be provided with a hole 147 forming a path through which the support members 220-1 to 220-4 pass.

For example, the housing 140 may comprise a hole 147 penetrating through upper portions of the corner portions 142-1 to 142-4.

In another embodiment, the holes provided in the corner portions 142-1 to 142-4 of the housing 140 may be a structure that is recessed from an outer side surface of the corner portion of the housing 140, and at least a portion of the hole may be open toward an outer side surface of the corner portion. The number of holes 147 of the housing 140 may be the same as the number of support members.

The housing 140 may comprise at least one stopper (not shown) being protruded from the outer side surfaces of the side portions 141-1 to 141-4, and the at least one stopper may prevent the housing 140 from colliding with the cover member 300 when the housing 140 moves in a direction perpendicular to an optical axis direction.

In order to prevent the lower surface of the housing 140 from colliding with the base 210 and/or the circuit board 250, the housing 140 may further comprise a stopper (not shown) being protruded from the lower surface.

The housing 140 may be provided with a groove 148 provided in a lower portion, or at a lower end of the corner portions 142-1 to 142-4 not only to secure a path through which support members 220-1 to 220-4 pass, but also to secure a space to fill the silicone that can play the role of damping can be provided.

Next, the first magnet 130-1, the second magnet 130-2, the third magnet 131-3, and the dummy member 135 will be described.

The first magnet 130-1, the second magnet 130-2, and the third magnet 130-3 may be spaced apart from each other and disposed in the housing 140. For example, each of the first to third magnets 130-1 to 130-3 may be disposed between the bobbin 110 and the housing 140.

The first magnet 130-1, the second magnet 130-2, and the third magnet 130-3 may be disposed on a side portion of the housing 140.

The first magnet 130-1 and the second magnet 130-2 may be disposed in any two side portions 141-1 and 141-2 located opposite to each other among the side portions 141-1 to 141-4 of the housing 140.

In addition, the third magnet 130-3 and the dummy member 135 may be disposed in any other two side portions 141-3 and 141-4 positioned opposite to each other among the side portions 141-1 to 141-4 of the housing 140.

For example, the first magnet 130-1 may be disposed on the first side portion 141-1 of the housing 140, and the second magnet 130-2 may be disposed on the second side portion 141-2 of the housing 140 facing the first side portion 141-1.

The third magnet 130-3 may be disposed on the third side portion 141-3 of the housing 140, and the dummy member 135 may be disposed on the fourth side portion 141-4 of the housing 140 facing the third side portion 141-3.

Since the first and second coil units 120-1 and 120-2 for AF driving are disposed on two side portions of the bobbin 110 that are facing each other, no coil unit for AF driving is disposed between the bobbin 110 and the third magnet 130-3. In addition, a coil unit for AF driving is not disposed between the bobbin 110 and the dummy member 135.

In addition, for OIS driving, since the third to fifth coil units 230-1 to 230-3 and the first to third magnets 130-1 to 130-3 correspond to each other, the second coil 230 for OIS driving is not disposed between the dummy member 135 and the circuit board 250.

For example, the first magnet 130-1 may comprise a first surface facing the first coil unit 120-1, and the first surface of the first magnet 130-1 may comprise two polarities of the N pole and the S pole and a first non-magnetic partition wall 11c positioned between the two polarities.

For example, the first magnet 130-1 may comprise a second surface facing the third coil unit 2304, and the second surface of the first magnet 130-1 may comprise two polarities of N pole and an S pole.

For example, the second magnet 130-2 may comprise a first surface facing the second coil unit 120-2, and the first surface of the second magnet 130-2 may comprise two polarities of the N pole and the S pole and a second non-magnetic partition wall 12c positioned between the two polarities.

For example, the second magnet 130-2 may comprise a second surface facing the fourth coil unit 230-2, and the second surface of the second magnet 130-2 may comprise two polarities of an N pole and an S pole.

For example, the third magnet 130-3 may comprise a first surface opposite to the side portion of the bobbin 110 facing the third side portion 141-3 of the housing 140 on which the third magnet 130 is disposed, and the first surface of the third magnet 130-3 may comprise one polarity of an N pole or an S pole.

For example, the third magnet 130-3 may comprise a second surface facing the fifth coil unit 230-3, and the second surface of the third magnet 130-3 may have two polarities, an N pole and an S pole.

In another embodiment, the third magnet 130-3 may be a bipolar magnetized magnet. In another embodiment, at least one among the first to third magnets 130-1 to 130-3 may be a unipolar magnetized magnet or a bipolar magnetized magnet.

At the initial position of the AF moving part, the first magnet 130-1 may be overlapped with the first coil unit 120-1 in a direction perpendicular to the optical axis OA and toward the first coil unit 120-1 (or the center of the first coil unit 120-1) from the optical axis OA.

At the initial position of the AF moving part, the second magnet 130-2 may be overlapped with the second coil unit 120-2 in a direction perpendicular to the optical axis and toward the second coil unit 120-2 (or the center of the second coil unit 120-2) from the optical axis.

At the initial position of the AF moving part, the third magnet 130-3 does not face or overlap with the first coil unit 120-1 and the second coil unit 120-2 in a direction perpendicular to the optical axis and in a direction from the third side portion 141-3 of the housing 140 toward the fourth side portion 141-4.

For example, each of the first to third magnets 130-1 to 130-3 may be disposed on a corresponding one among the first to third seating portions 141a to 141e of the housing 140.

The first magnet 130-1 may be overlapped with the second magnet 131-2 in a direction perpendicular to the optical axis and directing from the first side portion 141-1 of the housing 140 toward the second side portion 141-4.

The shape of each of the first to third magnets 130-1 to 130-3 may be a polyhedral shape that is easy to be seated or disposed on any corresponding one among the first to third side portions 141-1 to 141-3 of the housing 140, for example, cuboid. For example, each of the first to third magnets 130-1 to 130-3 may have a flat plate shape, but is not limited thereto.

For example, each of the first and second magnets 130-1 and 130-2 may be a 4 pole magnet comprising two N poles and two S poles, the third magnet 130-3 may be a two-pole magnet comprising one N pole and one S pole. Here, the 4-pole magnet may be expressed as "a bipolar magnetized magnet", and a two-pole magnet may be expressed as a "unipolar magnetized magnet". The first to third magnets 130-1 to 130-3 will be described later.

In another embodiment, at least one among the first to third magnets may be two-pole magnets. Or, at least one among the first to third magnets may be a four-pole magnet.

The dummy member 135 may be disposed on the fourth side portion 141-4 of the housing 140. The dummy member 135 may be a non-magnetic material or a non-magnetic material, but is not limited thereto, and may comprise a magnetic material in another embodiment.

The dummy member 135 may have the same mass as the third magnet 130-3, but is not limited thereto. The dummy member 135 may be disposed on the side portion 141-4 opposite to the side portion 141-3 of the housing 140, in which the third magnet 130-3 is disposed for weight balancing. The dummy member 135 may be expressed by replacing it with "weight balancing member", "balancing member", or "weight member".

The dummy member 135 may comprise a first dummy 135a and a second dummy 135b that are spaced apart from each other.

For example, at least a portion of the protruding part 116 of the bobbin 110 may be disposed between the first dummy 135a and the second dummy 135b. In addition, for example, at least a portion of the sensing coil 180 may be disposed between the first dummy 135a and the second dummy 135b.

For example, the first dummy 135a and the second dummy 135b may have symmetrical shapes. For example, the first dummy 135a and the second dummy 135b may be symmetrically disposed with respect to the sensing coil 180 or the protruding part 116 of the bobbin 110, but is not limited thereto.

The dummy member according to another embodiment may comprise only one of the first dummy 135a and the second dummy 135b. In the dummy member according to another embodiment, the first dummy 135a and the second dummy 135b may be connected to each other.

At the initial position of the AF moving part, the dummy member 135 does not face or overlap with the first coil unit 120-1 and the second coil unit 120-2 in a direction perpendicular to the optical axis and in a direction directing from the third side portion 141-3 of the housing 140 toward the fourth side portion 141-4.

The dummy member 135 may be perpendicular to the optical axis and may face or overlap with the third magnet 130-3 in a direction directing from the third side portion 141-3 of the housing 140 toward the fourth side portion 141-4.

In addition, the dummy member 135 does not overlap with the first position sensor 170 in a direction perpendicular to the optical axis and in a direction directing from the third side portion 141-3 of the housing 140 toward the fourth side portion 141-4.

In addition, the dummy member 135 may not overlap with the first position sensor 170 in the optical axis direction. In addition, the dummy member 135 may not overlap with the sensing coil 180 in the optical axis direction, but is not limited thereto, and in another embodiment, the dummy member 135 may be overlapped with each other in the optical axis direction.

In addition, the dummy member 135 does not overlap with the second coil 230 in the optical axis direction.

For example, the coil unit may not be formed in a region (for example, one region of the circuit member 231) corresponding to the dummy member 135 in the optical axis direction.

When the dummy member 135 comprises a magnetic material, the magnetic strength of the dummy member 135 may be smaller than that of the third magnet 130-3.

For example, the dummy member 135 may comprise tungsten, and tungsten may account for 95% or more of the total weight. For example, the dummy member 135 may be a tungsten alloy.

The first and second dummies 135a and 135b may be in the form of a polyhedron, for example, a cuboid or a cube shape, but are not limited thereto, and may be formed in various shapes. For example, the dummy member 135 may comprise a rounded portion or a curved surface in the edge of a side surface.

Next, the upper elastic member 150, the lower elastic member 160, the support member 220, the second coil 230, the circuit board 250, and the base 210 will be described.

Figure 5:
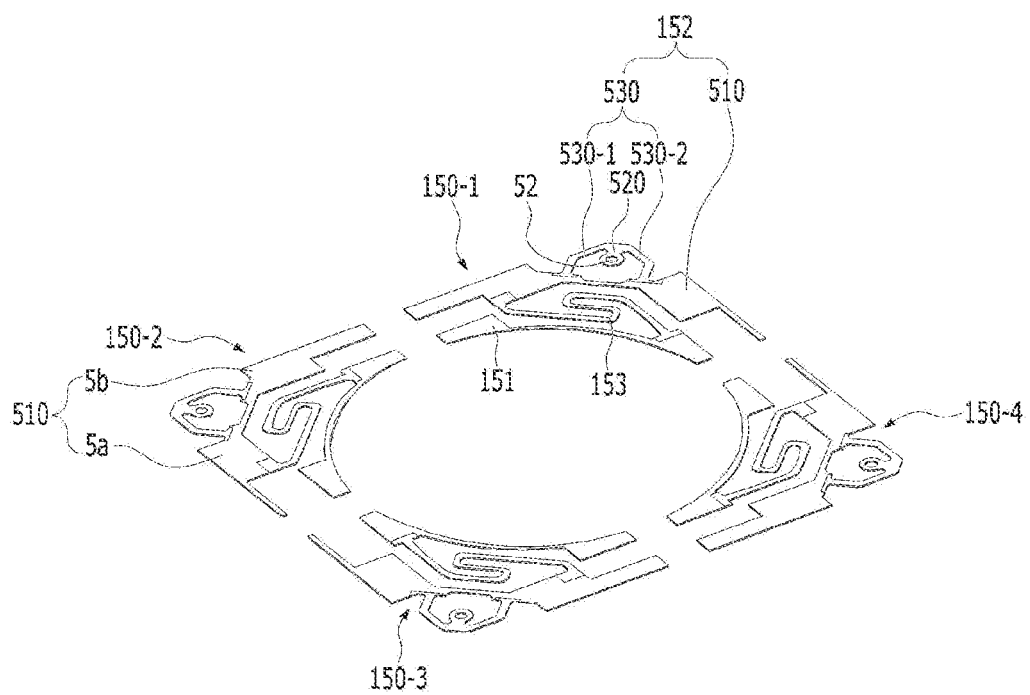
FIG. 5 is a perspective view of an upper elastic member.
Figure 6:
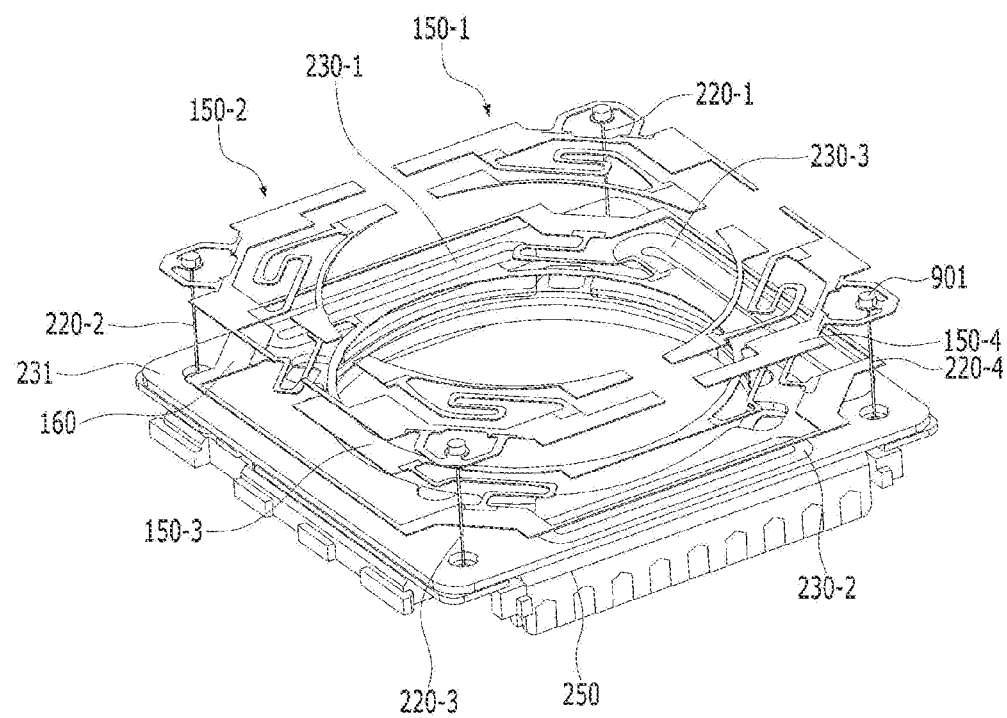
FIG. 6 is a view for explaining an electrical connection relationship between the upper elastic member, the support member, and the circuit board.
Figure 7:
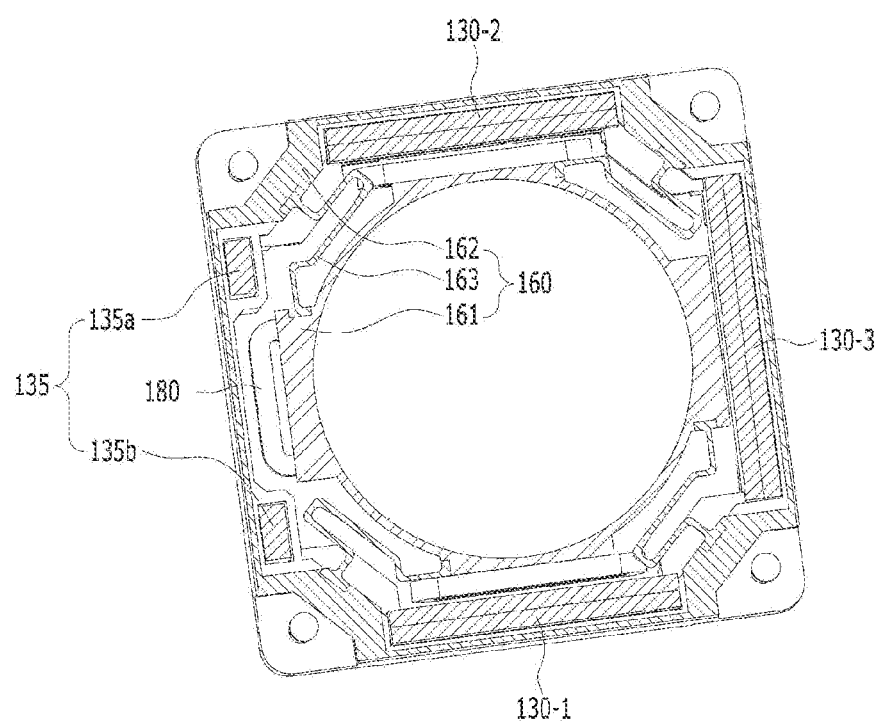
FIG. 7 is a bottom view of first to third magnets, a dummy member, a housing, a lower elastic member, and a sensing coil.
Figure 8:
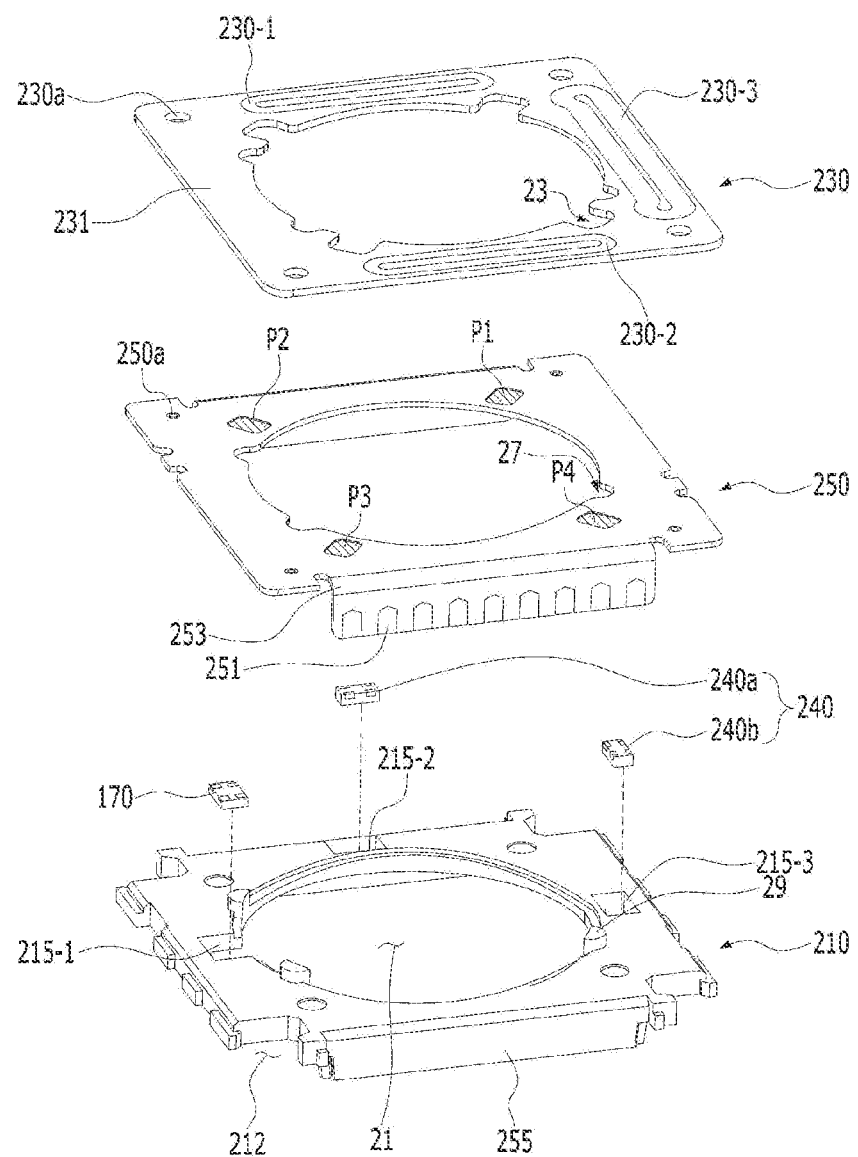
FIG. 8 is an exploded perspective view of a second coil, a circuit board, and a base.
Figure 9:
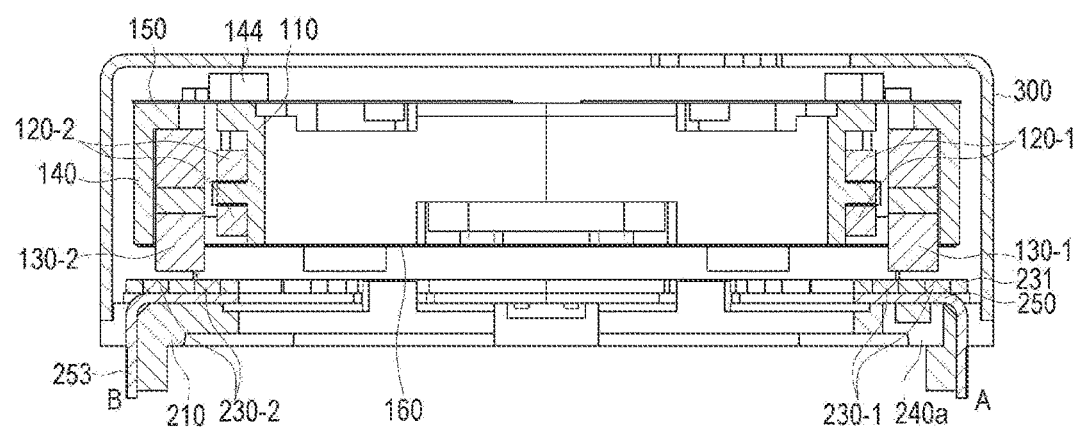
FIG. 9 is a cross-sectional view taken in the direction AB of FIG. 2 of the lens driving device.
Figure 10:
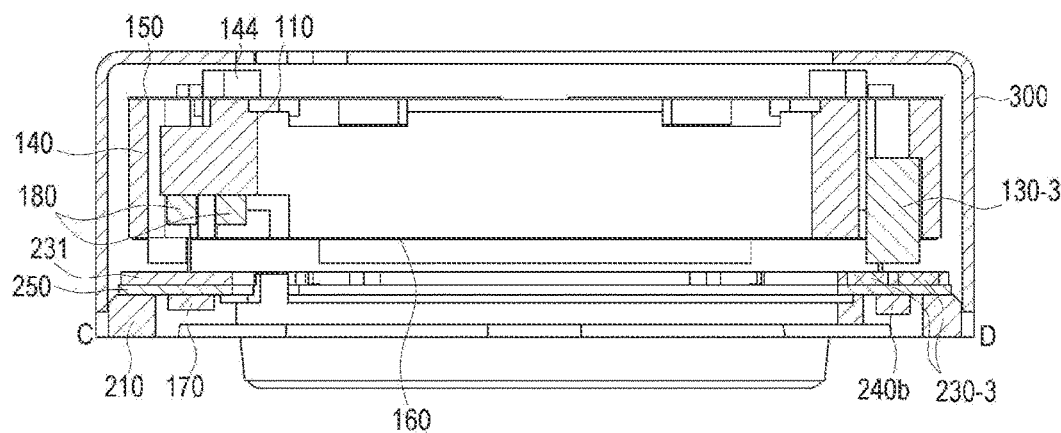
FIG. 10 is a cross-sectional view of the lens driving device in the CD direction of FIG. 2.
Figure 11:
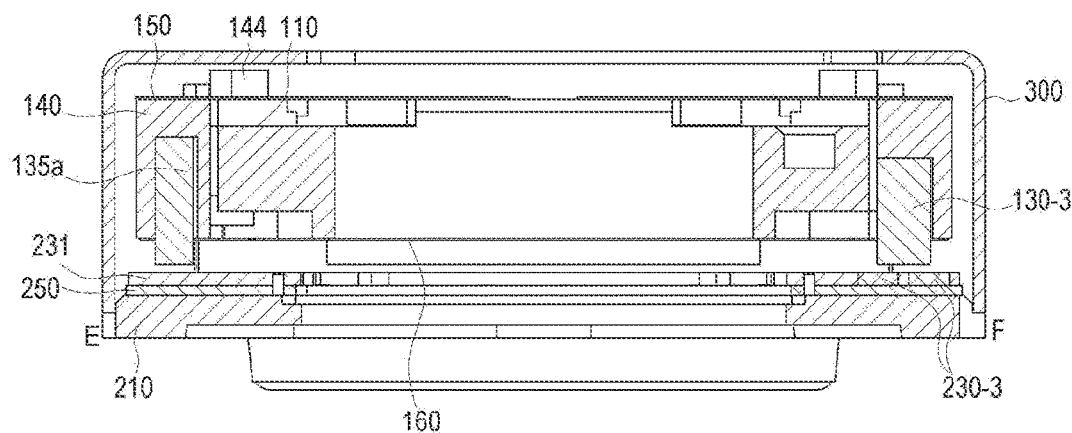
FIG. 11 is a cross-sectional view of the lens driving device in the direction EF of FIG. 2.

FIG. 5 is a perspective view of an upper elastic member 150, FIG. 6 is a view for explaining an electrical connection relationship between the upper elastic member 150, the support member 220, and the circuit board 250, FIG. 7 is a bottom view of first to third magnets 130-1 to 130-3, a dummy member 135, a housing 140, a lower elastic member 160, and a sensing coil 180, FIG. 8 is an exploded perspective view of a second coil 230, a circuit board 250, and a base 210, FIG. 9 is a cross-sectional view taken in the direction AB of FIG. 2 of the lens driving device 100, FIG. 10 is a cross-sectional view of the lens driving device 100 in the CD direction of FIG. 2, and FIG. 11 is a cross-sectional view of the lens driving device 100 in the direction EF of FIG. 2.

Referring to FIGS. 5 to 11, the upper elastic member 150 and the lower elastic member 160 may constitute an elastic member, the elastic member may be coupled to the bobbin 110 and the housing 140, and the elastic member may elastically support the bobbin 110 against the housing 140.

The upper elastic member 150 may be coupled to the upper portion, the upper surface, or the upper end of the bobbin 110, and the upper portion, the upper surface, or the upper end of the housing 140. The lower elastic member 160 may be coupled to the lower portion, lower surface, or lower end of the bobbin 110 and the lower portion, lower surface, or lower end of the housing 140. In the upper elastic member and the lower elastic member, the elastic member may be expressed by replacing it with an "elastic unit", a "spring", or an "elastic body".

The upper elastic member 150 may comprise a plurality of upper elastic members 150-1 to 150-4 spaced apart or separated from each other. FIG. 5 illustrates four upper elastic members separated from each other, but the number is not limited thereto, and may be two or more in another embodiment. Or, in another embodiment, the upper elastic member 150 may be implemented as a single elastic unit integrally formed.

A first inner side frame 151 in which at least one among the first to fourth upper elastic members 150-1 to 150-4 coupled to the bobbin 110, a first outer side frame 152 coupled to the housing 140, and a first frame connection part 153 connecting the first inner side frame 151 and the first outer side frame 152 may be further comprised. At this time, the inner side frame may be expressed as an "inner side portion", and the outer side frame may be expressed as an "outer side portion".

For example, in the first and second inner side frames 151 and 161, a first region for coupling with the first and second coupling parts of the bobbin 110 may be provided, and in the first and second outer side frames 152 and 162, a second region for coupling with the first and second coupling parts of the housing 140 may be provided. Although not illustrated in FIG. 6, in the first and second regions, a hall may be provided for being coupled with the first and second coupling parts of the bobbin 110 and the first and second coupling parts of the housing 140.

The first outer side frame 152 of each of the first to fourth upper elastic members 150-1 to 150-4 may comprise: a first coupling part 510 coupled to a corresponding one of the corner portions 142-1 to 142-4 of the housing 140; a second coupling part 520 coupled with the support members 220-1 to 220-4; and a connection part 530 for connecting the first coupling part 510 and the second coupling part 520.

The first coupling part 510 may comprise at least one coupling region (for example, 5a, 5b) coupled to the housing 140 (for example, corner portions 142-1 to 142-4).

For example, no holes are formed in the coupling regions 5a and 5b of the first coupling part 510 in FIG. 5, but in another embodiment, the coupling regions 5a and 5b of the first coupling part 510 may comprise at least one hole or a through hole (not shown) being coupled to the first coupling part of the housing 140.

For example, each of the coupling regions 5a and 5b may have one or more holes, and one or more first coupling parts corresponding to the corner portions 142-1 to 142-4 of the housing 140 may be provided. In another embodiment, the coupling regions of the first coupling part 510 may be implemented in various shapes sufficient to couple with the housing 140, for example, a groove shape, and the like.

The second coupling part 520 may have a hole 52 through which the support member 220 passes. One end of the support member 220 that has passed through the hole 52 may be directly coupled to the second coupling part 520 by a conductive adhesive member or solder 901 (refer to FIG. 6), and the second coupling part 520 and the support members 220-1 to 220-4 may be electrically connected.

For example, the second coupling part 520 is a region in which the solder 901 is disposed for coupling with the support member 220, and may comprise a hole 52 and a region in the periphery of the hole 52.

The connection part 530 may connect the coupling regions 5a and 5b of the first coupling part 510 and the second coupling part 510.

For example, connection part 530 may comprise: a first connection part 530-1 connecting the first region 5a of the first coupling part 510 and the second coupling part 520; and a second connection part 530-2 connecting the second region 5b of the first coupling part 510 and the second coupling part 520. Each of the first and second connection parts 530 may comprise a bent portion or a curved portion at least once.

Referring to FIG. 5b, the lower elastic member 160 may be implemented as one elastic unit integrally formed, but is not limited thereto, and in another embodiment may comprise a plurality of elastic units separated from each other.

For example, the lower elastic member 160 may comprise: a second inner side frame 161 that is coupled or fixed to a lower portion, a lower surface, or a lower end of the bobbin 110; a second outer side frame 162 coupled or fixed to a lower portion, a lower surface, or a lower end of the housing 140; and a second frame connection part 163 connecting the second inner side frame 161 and the second outer side frame 162 to each other.

Each of the first frame connection part 153 of the upper elastic member 150 and the second frame connection part 163 of the lower elastic member 160 may be formed to be bent or curved (or curved line) at least once or more to form a pattern having a predetermined shape. The bobbin 110 may be flexibly (or elastically) supported by the movement of rising and/or lowering in a first direction through position change and micro-deformation of the first and second frame connection parts 153 and 163.

The upper elastic members 150-1 to 150-4 and the lower elastic member 160 may be formed of a leaf spring, but are not limited thereto, and may be implemented as a coil spring or the like.

Next, the support member 220 will be described.

The support member 220 may elastically support the OIS moving part (for example, the housing 140) against the fixed part, and may support the OIS moving part to be movable in a direction perpendicular to the optical axis. The fixed part may comprise at least one of the circuit board 250, the second coil 230, and/or the base 210.

The support member 220 may electrically connect the upper elastic member 150 and the circuit board 250.

The support member 220 may comprise a plurality of support members 220-1 to 220-4.

For example, the support member 220 may comprise first to fourth support members 220-1 to 220-4 corresponding to the corner portions 142-1 to 142-4 of the housing 140.

Each of the first to fourth support members 220-1 to 220-4 may be disposed on a corresponding one of the first to fourth corner portions 142-1 to 142-4 of the housing 140, and a corresponding one of the first to fourth upper elastic members 150-1 to 150-4 and the circuit board 250 may be connected to each other.

In FIG. 2, one support member is disposed in one corner portion of the housing 140, but the present invention is not limited thereto. In another embodiment, two or more support members may be disposed in one corner portion of the housing 140.

For example, each of the first to fourth support members 220-1 to 220-4 may electrically connect any corresponding one among the first to fourth upper elastic members 150-1 to 150-4 and any corresponding one among the terminals of the circuit board 250.

The first to fourth support members 220-1 to 220-4 may be spaced apart from the housing 140, rather than being coupled or fixed to the housing 140, one end of each of the first to fourth support members 220-1 to 220-4 may be directly connected or coupled to the first coupling parts 510 of any corresponding one among the first to fourth upper elastic members 150-1 to 150-4 through conductive adhesive or soldering.

In addition, the other end of each of the first to fourth support members 220-1 to 220-4 may be directly connected or coupled to the circuit board 250 through solder, or the like. For example, the other end of each of the first to fourth support members 220-1 to 20-4 may be directly connected or coupled to the lower surface of the circuit board 250. In another embodiment, the other end of each of the support members 220-1 to 220-4 may be coupled to the circuit member 231 or the base 210 of the second coil 230.

For example, each of the first to fourth support members 220-1 to 220-4 may pass a hole 147 provided in any corresponding one of the corner portions 142-1 to 142-4 of the housing 140, but is not limited thereto. In another embodiment, the support members may be disposed adjacent to the boundary line of the side portions 141-1 to 141-4 and the corner portions 142 of the housing 140, and may not pass through the corner portions 142-1 to 142-4 of the housing 140.

The first coil 120 may be electrically connected to the upper elastic member 150. One end of the first coil unit 120-1 may be coupled or connected to the first upper elastic member 150-4, and the other end of the first coil unit 120-1 may be connected to the second upper elastic member 150-2. For example, the first coil unit 120-1 may be coupled or connected to the first inner side frame 151 of the first and second upper elastic members 150-4 and 150-2.

One end of the second coil unit 120-2 may be coupled or connected to the third upper elastic member 150-3, and the other end of the second coil unit 120-2 may be connected to the fourth upper elastic member 150-4. For example, the second coil unit 120-2 may be coupled or connected to the first inner side frame 151 of the third and fourth upper elastic members 150-3 and 150-4.

The first and second coil units 120-1 and 120-2 may be electrically connected to the circuit board 250 by the first to fourth support members 220-1 to 220-4.

For example, the first and second coil units 120-1 and 120-2 may be connected in series to each other through wirings or circuit patterns formed on the circuit board 250. In addition, both ends of the first and second coil units connected in series may be electrically connected to any two terminals of the terminals of the circuit board 250. In this case, one driving signal may be provided to the first coil unit 120-1 and the second coil unit 120-2 through any two terminals of the circuit board 250.

In another embodiment, the first and second coil units 120-1 and 120-2 may not be connected in series with each other, the first coil units 120-1 may be electrically connected to two terminals of the circuit board 250, the second coil units 120-2 may be electrically connected to the other two terminals of the circuit board 250, and a separate driving signal (For example, driving current) may be provided to each of the first coil unit 120-1 and the second coil unit 120-2 through the four terminals of the circuit board 250.

In another embodiment, the first coil unit 120-1 and the second coil unit 120-2 may be connected in series with each other by an upper elastic member. For example, the upper elastic member may comprise first to third elastic units, the first coil unit 120-1 may be coupled to the first elastic unit and the third elastic unit, the second coil unit 120-2 may be coupled to the second elastic unit and the third elastic unit, and both may be connected in series by the third elastic unit.

The support member 220 may be implemented with conductive member that can be supported by elasticity, for example, a suspension wire, a leaf spring, or a coil spring and the like. In addition, in another embodiment, the support member 220 may be integrally formed with the upper elastic member 150.

In order to absorb and buffer the vibration of the bobbin 110, the lens driving device 100 may be further provided with a first damper (not shown) disposed between each of the upper elastic members 150-1 to 150-4 and the bobbin 110 (or the housing 140).

For example, a first damper (not shown) may be disposed in a space between the first frame connection part 153 and the bobbin 110 of each of the upper elastic members 150-1 to 150-4.

In addition, for example, the lens driving device 100 may be further provided with a second damper (not shown) disposed between the second frame connection part 163 of the lower elastic member 160 and the bobbin 110 (or the housing 140).

In addition, for example, the lens driving device 100 may further comprise a third damper (not shown) disposed between the support member 220 and the hole 147 of the housing 140.

In addition, for example, the lens driving device 100 may further comprise a fourth damper (not shown) disposed at one end of the second coupling part 520 and the support member 220, and may further comprise a fifth damper (not shown) disposed on the other end and the circuit board 250.

In addition, a sixth damper (not shown) may be filled in an empty space between the connection part 530 and the housing 140 in order to prevent oscillation due to vibration.

In addition, for example, a seventh damper (not shown) may be further disposed between the inner side surface of the housing 140 and the outer circumferential surface of the bobbin 110.

Next, the base 210, the circuit board 250, and the second coil 230 will be described.

Referring to FIG. 8, the base 210 is disposed below the bobbin 110 (or the housing 140).

The base 210 may have an opening 21 corresponding to the opening of the bobbin 110, or/and the opening of the housing 140, and may match or correspond to the cover member 300, for example, may be a rectangular shape. For example, the opening of the base 210 may be in the form of a through hole penetrating through the base 210 in the optical axis direction.

A support part 255 or a support part may be provided in a region of the base 210 facing the terminal 251 of the circuit board 250. The support part 255 of the base 210 may support the terminal surface 253 of the circuit board 250 on which the terminal 251 is formed.

The base 210 may have a concave groove 212 in the corner region in order to avoid spatial interference with the other ends of the support members 220-1 to 220-4 coupled to the circuit board 250. For example, the concave groove 212 may be formed to correspond to the edge of the cover member 300.

In addition, a protruding part 29 for coupling with the coupling groove 23 of the circuit member 231 and the coupling groove 27 of the circuit board 250 may be provided on an upper surface in the periphery of the opening of the base 210. For example, the coupling groove 23 may be formed adjacent to the opening of the circuit member 231, and may be recessed from the inner side surface of the circuit member 231. In addition, for example, the coupling groove 27 may be formed adjacent to the opening of the circuit board 250, and may be recessed from the inner circumferential surface of the circuit board 250.

In addition, a seating portion (not shown) in which the filter 610 of the camera module 200 is installed may be formed on a lower surface of the base 210.

The base 210 may comprise: a first seating groove 215-1 for disposing, seating, or accommodating the first position sensor 170; a second seating groove 215-2 for disposing, seating or accommodating the first sensor 240a of the second position sensor 240; and a third seating groove 215-3 for disposing, seating or accommodating the second sensor 240b of the second position sensor 240.

The first to third seating grooves 215-1 to 215-3 may be recessed from the upper surface of the base 210.

The second coil 230 may be disposed below the bobbin 110 and/or the housing 140, and may be disposed on the circuit board 250. For example, the second coil 230 may be disposed on an upper surface of the circuit board 250.

The second coil 230 may be disposed below the housing 140 and the bobbin 110.

The second coil 230 may comprise a plurality of coil units 230-1 to 230-3.

For example, the second coil 230 may comprise: a third coil unit 230-1 corresponding to the first magnet 130-1 disposed in the housing 140; a fourth coil unit 230-2 corresponding to the second magnet 130-2; and a fifth coil unit 230-3 corresponding to the third magnet 130-3.

Here, the third coil unit 230-1 may be expressed by replacing it with "first OIS coil unit" or "first coil ring", and the fourth coil unit 230-2 expressed by replacing it with "second OIS coil unit" or "second coil ring", and the fourth coil unit 230-4 may be expressed by replacing it with "third OIS coil unit" or "third coil ring".

For example, the third coil unit 2304 may face or overlap with the first magnet 130-1 in the optical axis direction, and the fourth coil unit 230-2 may face or overlap with the second magnet 130 in the optical axis direction, and the fifth coil unit 230-3 may face or overlap with the third magnet 130-3 in the optical axis direction.

Each of the third to fifth coil units 230-1 to 230-3 may have a closed curve having a central hole, for example, a ring shape, and the central hole may be formed to face an optical axis direction.

Each of the third to fifth coil units 230-1 to 230-4 may be in the form of a coil pattern formed of a fine pattern (FP) coil, but is not limited thereto.

For example, the third coil unit 230-1 and the fourth coil unit 230-2 may be disposed facing each other or opposite to each other in a direction directing from the first magnet 130-1 toward the second magnet 130-2.

In addition, for example, each of the third coil unit 230-1 and the fourth coil unit 230-2 may not be overlapped with the fifth coil unit 230-3 in the direction directing from the first magnet 130-1 toward the second magnet 130-2.

For example, the second coil 230 may further comprise a circuit member 231 having a polygonal shape (for example, a rectangle) in which the third to fifth coil units 230-1 to 230-3 are formed. Here, the circuit member 231 may be expressed as a "substrate", "circuit board", or "coil substrate".

For example, the circuit member 231 may comprise four sides, and each of the third to fifth coil units 230-1 to 230-3 may be disposed on any corresponding one among the three sides of the circuit member 231, and the coil unit may not be disposed on a remaining side of the circuit member 231.

For example, each of the third coil unit 230-1 and the fourth coil unit 230-2 may be disposed to be parallel to any corresponding one of first and second sides of the circuit member 231 facing each other, and the fifth coil unit 230-3 may be disposed to be parallel to the third side or the fourth side of the circuit member 231.

In another embodiment, the second coil in a form in which a circuit member is omitted may comprise only ring-shaped coil blocks or third to fifth coil units implemented in a fine patterned (FP) form.

In another embodiment, the third to fifth coil units of the second coil may be implemented in the form of a circuit pattern or wiring formed on the circuit board 250.

The circuit board 250 and the circuit member 231 are expressed separately as separate components, but are not limited thereto, and in another embodiment, the circuit board 250 and the circuit member 231 may be bundled together and expressed as a term "circuit member". In this case, the other end of the support members may be coupled to a "circuit member (for example, a lower surface of the circuit member)".

In order to avoid spatial interference with the support members 220-1 to 220-4, a hole 230a may be provided at the edge of the circuit member 231, and the support members 220-1 to 220-4 may pass through the hole 230a of the circuit member 231. In another embodiment, the circuit member may have a groove provided at an edge of the circuit member instead of a hole to avoid spatial interference with the support members.

The third to fifth coil units 230-1 to 230-3 may be electrically connected to the circuit board 250. For example, the third to fifth coil units 230-1 to 230-3 may be electrically connected to terminals 251 of the circuit board 250.

The circuit board 250 is disposed on an upper surface of the base 210, and may comprise an opening of the bobbin 110, an opening of the housing 140, and/or an opening corresponding to the opening of the base 210. The shape of the circuit board 250 may match or correspond to the upper surface of the base 210, for example, a rectangular shape.

The circuit board 250 may comprise at least one terminal surface 253 being bent from the top surface. A plurality of terminals 251 to which electrical signals are supplied from the outside may be provided on at least one terminal surface 253 of the circuit board 250.

For example, the circuit board 250 may comprise two terminal surfaces disposed on two sides facing each other among sides of the upper surface, but is not limited thereto.

A driving signal may be provided to each of the first coil 120 and the second coil 230 through the plurality of terminals 251 provided on the terminal surface 253 of the circuit board 250. In addition, a driving signal may be provided to each of the first position sensor 170 and the second position sensor 240 through the terminals 251 of the circuit board 250, and the circuit board 250 may receive an output signal of each of the first and second position sensors 170 and 240 and output through the terminals 251.

The circuit board 250 may be provided as an FPCB, but is not limited thereto, and it is also possible to directly form the terminals of the circuit board 250 on the surface of the base 210 using a surface electrode method or the like.

The circuit board 250 may comprise a hole 250a through which the support members 220-1 to 220-4 pass in order to avoid spatial interference with the support members 220-1 to 220-4. The position and number of the holes 250a may correspond to or match with the position and number of the support members 220-1 to 220-4. In another embodiment, the circuit board 250 may have escape grooves in the corners instead of the holes 250a.

For example, the support members 220-1 to 220-4 may pass through the hole 250a of the circuit board 250 and be electrically connected to the circuit pattern disposed on a lower surface of the circuit board 250 through solder or the like, but is not limited thereto.

In another embodiment, the circuit board 250 may not have a hole, and the support members 220-1 to 220-4 may be electrically connected to a circuit pattern or pad formed on an upper surface of the circuit board 250 through solder or the like.

Or, in another embodiment, the support members 220-1 to 220-4 may be electrically connected to the circuit member 231, and the circuit member 231 may electrically connect the support members 220-1 to 220-4 and the circuit board 250.

The circuit board 250 may comprise pads P1 to P4 electrically connected to the third to fifth coil units 230-4 to 230-3. Power or a driving signal may be provided to the second coil 230 through the circuit board 250. The power or driving signal provided to the second coil 230 may be a DC signal or an AC signal, or may comprise a DC signal and an AC signal, and may be in the form of a current or a voltage.

For example, one end of the third coil unit 230-1 may be connected to the first pad P1, and the other end of the third coil unit 230-1 may be connected to the second pad P2.

One end of the fourth coil unit 230-2 may be connected to the third pad P3, and the other end of the fourth coil unit 230-2 may be connected to the fourth pad P4. And any one of the first and second pads (for example, P2) and any one of the third and fourth pads P3 and P4 (for example, P4) can be connected to each other by a first circuit pattern (or first wiring).

The third and fourth coil units 230-1 and 230-2 may be connected in series with each other. And the remaining other one (for example, P1) of the first and second pads P1 and P2 and the remaining other one (for example, P3) of the third and fourth pads P3 and P4 may be electrically connected to the first and second terminals of the circuit board 250 through the second circuit pattern (or second wiring). In addition, the first driving signal may be provided to the first and second coil units 230-4 and 230-2 through the first and second terminals of the circuit board 250.

In addition, for example, one end of the fifth coil unit 230-3 may be connected to the fifth pad P5, and the other end of the fifth coil unit 230-3 may be connected to the sixth pad P6. The fifth and sixth pads P5 and P6 may be electrically connected to third and fourth terminals of the circuit board 250 through a third circuit pattern (or third wiring). The second driving signal may be provided to the fifth coil unit 230-3 through the third and fourth terminals of the circuit board 250.

The first to third circuit patterns (or wirings) may be formed inside the circuit board 250.

By the interaction between the first to third magnets 130-1 to 130-3 and the third to fifth coil units 230-1 to 230-3 to which the first and second driving signals are provided, the OIS moving part (for example, housing 140) may move in the second and/or third direction, for example, in the x-axis and/or y-axis direction, and as a result, handshake correction may be performed.

The first and second sensors 240a and 240b of the first position sensor 170 and the second position sensor 240 may be disposed between the circuit board 250 and the base 210. For example, the first position sensor 170 and the first and second sensors 240a and 240b may be disposed, mounted, or coupled on a lower surface of the circuit board 250.

In another embodiment, the first position sensor 170 and at least one of the first and second sensors 240a and 240b may be disposed on an upper surface of the circuit board 250.

In another embodiment, the first position sensor may be disposed in the housing 140 not in the base 210, and the housing 140 may be provided with a seating portion for disposing the first position sensor 170, and at this time, the seating portion may be a groove or a hole. For example, the first position sensor disposed in the housing 140 may be overlapped with the sensing magnet in the optical axis direction, but is not limited thereto, and in another embodiment, the two may not be overlapped with each other in the optical axis direction. In addition, the first position sensor disposed in the housing 140 may be disposed below the sensing coil 180, but is not limited thereto, and may be disposed at one side of the sensing coil.

The first position sensor 170 and each of the first and second sensors 240a and 240b may be electrically connected to the circuit board 250. For example, the first position sensor 170, and each of the first and second sensors 240a and 240b may be electrically connected to the terminals 251 of the circuit board 250.

The first position sensor 170 may be an "AF position sensor," and the second position sensor 240 may be an "OIS position sensor". The second position sensor 240 may comprise the first sensor 240a and the second sensor 240b.

The AF moving part (for example, the bobbin 110 and the sensing coil 180) may be moved in the optical axis direction by the electromagnetic force due to the interaction between the first coil 120 and the magnet 130, the first position sensor 170 may detect the strength or magnetic force of the magnetic field of the sensing coil 180 being moved in the optical axis direction, and an output signal according to the sensed result may be outputted.

For example, the strength or magnetic force of the magnetic field of the sensing coil 180 detected by the first position sensor 170 may change according to the displacement of the bobbin 110 in the optical axis direction, the first position sensor 170 may output an output signal proportional to the strength of the sensed magnetic field, and the displacement of the bobbin 110 in the optical axis direction may be detected using the output signal of the first position sensor 170.

The OIS moving part can be moved in a direction perpendicular to an optical axis by the electromagnetic force due to the interaction between the second coil 230 and the magnet 130, each of the first and second sensors 240a and 240b may detect the strength of the magnetic field of the magnet 130 of the OIS moving part moving in a direction perpendicular to the optical axis, and an output signal according to the detected result may be outputted.

The displacement of the OIS moving part in the direction perpendicular to the optical axis, for example, shift or tilt of the OIS moving part can be detected using the output signals of the first and second sensors 240a and 240b. Here, the OIS moving part may comprise the AF moving part and components mounted on the housing 140.

For example, the OIS moving part may comprise an AF moving part and a housing 140, a magnet 130, and a dummy member 135.

The first position sensor 170 and at least one of the first and second sensors 240a and 240b may be implemented as a Hall sensor alone.

Or, the first position sensor 170 and at least one of the first and second sensors 240a and 240b may be implemented in the form of a driver integrated circuit (IC) comprising a Hall sensor.

In addition, since the first position sensor 170 is disposed on the base 210, compared with the case where the first position sensor 170 is disposed on an OIS moving part (for example, housing), the separation distance between the first position sensor 170 and the sensing coil 180 may be increased, and therefore the first position sensor 170 may be implemented as a high-sensitivity Hall sensor or a tunnel magnetoresistance MAR) sensor.

In an embodiment in which the Hall sensor alone is implemented, the Hall sensor 170, 240a, or 240b may comprise two input terminals and two output terminals. Two input terminals of the Hall sensor may be electrically connected to two terminals of the circuit board 250, and a driving signal may be provided through this. In addition, two output terminals of the Hall sensor may be electrically connected to the other two terminals of the circuit board 250, through which an output signal of the Hall sensor may be outputted.

In an embodiment implemented in the form of a driver integrated circuit (IC) comprising a Hall sensor, a driving signal may be provided directly to the first coil 120 from the first position sensor 170. For example, the first position sensor 170 may be electrically connected to the two upper elastic members through the two support members, and a driving signal may be provided directly to the first coil 120. In addition, the first driving signal may be provided directly to the third and fourth coil units 230-1 and 230-2 from the first sensor 240a, and a second driving signal may be provided directly from the second sensor 240b to the fifth coil unit 230-3.

For example, the first sensor 240a may be electrically connected to two pads of the circuit board 250 electrically connected to the third and fourth coil units 2301 and 230-2 connected in series, and the second sensor 240b may be electrically connected to two pads of the circuit board 250 electrically connected to the fifth coil unit 230-3.

In addition, in an embodiment implemented in the form of a driver IC (Integrated Circuit) comprising a Hall sensor, signals for data communication with the driver IC may be transmitted and received through the terminals 251 of the circuit board 250. Signals for data communication may comprise a clock signal, a data signal, and a power supply signal.

Next, the cover member 300 will be described.

The cover member 300 can accommodate OIS moving part, upper elastic member 150, lower elastic member 160, first position sensor 170, second coil 230, base 210, circuit board 250, support member 220, and second position sensor 240 in an accommodating space formed together with the base 210.

The cover member 300 may be in the form of a box comprising an upper plate 310 and side plates 302 and having an open lower portion, and a lower portion of the cover member 300 may be coupled to an upper portion of the base 210. The shape of the upper plate of the cover member 300 may be a polygon, for example, a rectangle, or an octagon.

The cover member 300 may have an opening in an upper plate for exposing a lens (not shown) coupled to the bobbin 110 to external light. The material of the cover member 300 may be a non-magnetic material such as SUS to prevent sticking to the magnet 130. The cover member 300 may be formed of a metal plate, but is not limited thereto, and may be formed of plastic. In addition, the cover member 300 may be connected to the ground of the second holder 800 of the camera module 200. The cover member 300 may block electromagnetic interference (EMI).

Figure 12:
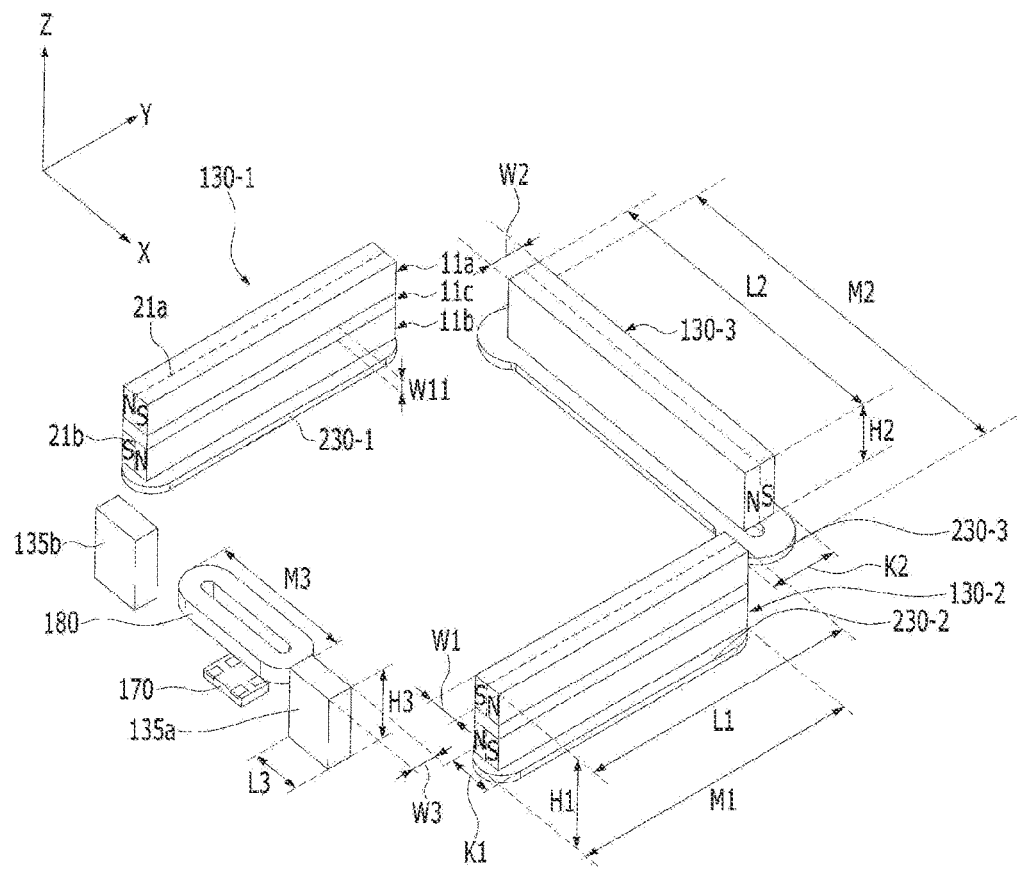
FIG. 12 is a perspective view illustrating a first position sensor, a sensing coil, first to third magnets, a dummy member, and third to fifth coil units.
Figure 13:
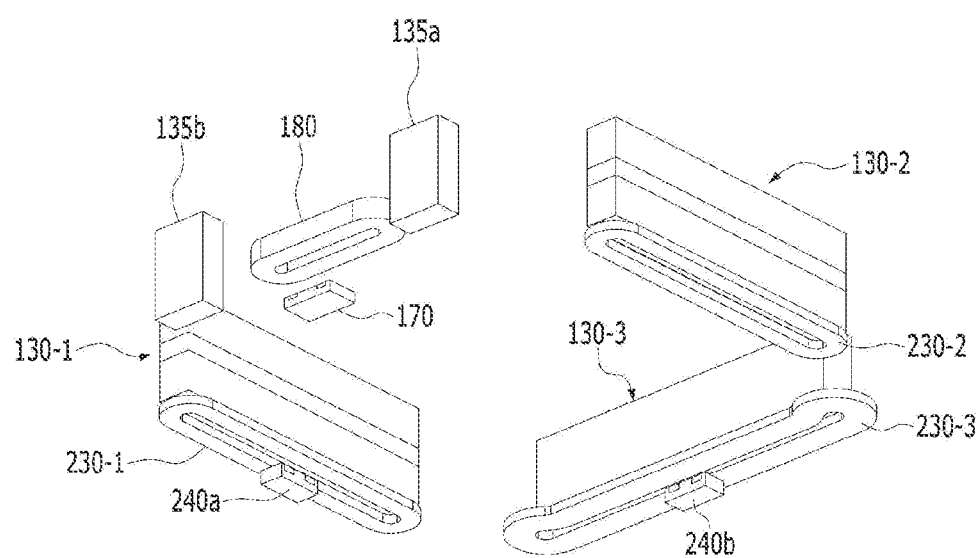
FIG. 13 is a perspective view of a first position sensor, a sensing coil, first to third magnets, a dummy member, third to fifth coil units, and first and second sensors.

FIG. 12 is a perspective view illustrating a first position sensor 170, a sensing coil 180, first to third magnets 130-1 to 130-3, a dummy member 135, and third to fifth coil units 230-1 to 230-5; FIG. 13 is a perspective view of a first position sensor 170, a sensing coil 180, first to third magnets 130-1 to 130-3, a dummy member 135, third to fifth coil units 230-1 to 230-5, and first and second sensors 240a and 240b; and FIG. 14 is a bottom view of the configurations illustrated in FIG. 12.

Figure 14:
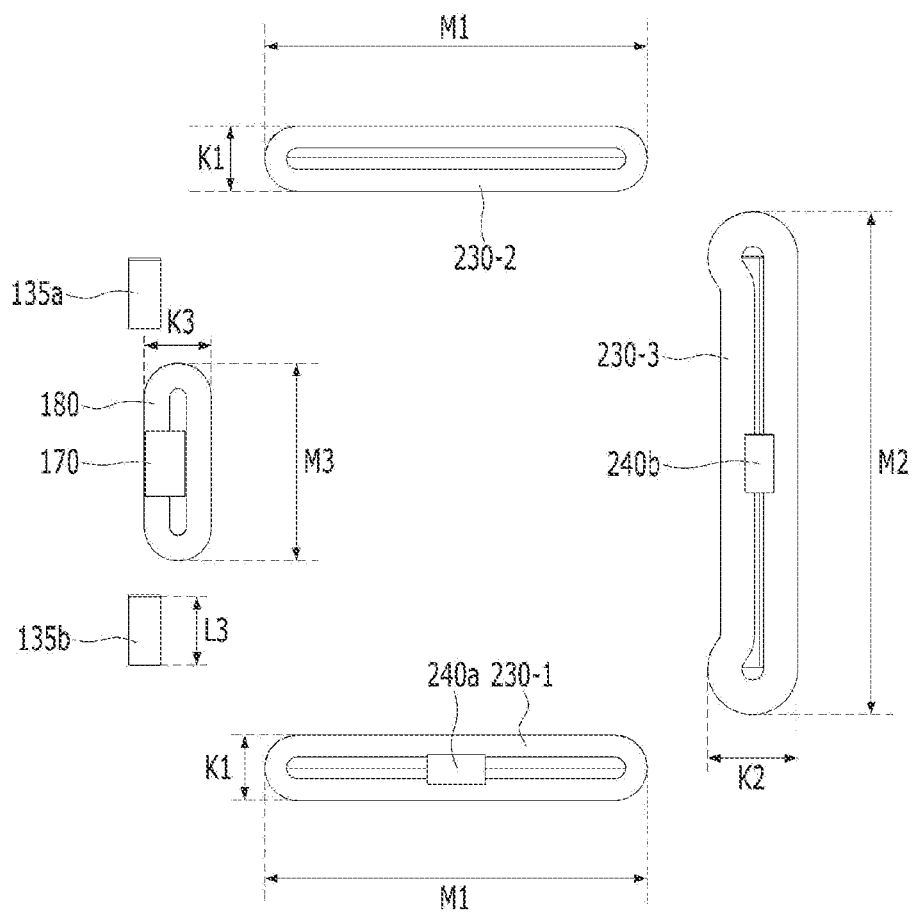
FIG. 14 is a bottom view of the configurations illustrated in FIG. 12.

Referring to FIGS. 12 to 14, the first magnet 130-1 may comprise a first magnet part 11a, a second magnet part 11b, and a first partition wall 11c disposed between the first magnet part 11a and the second magnet part 11b. Here, the first partition wall 11c may be expressed by replacing it with a "first non-magnetic partition wall".

For example, the first magnet part 11a and the second magnet part 11b may be spaced apart from each other in the optical axis direction, and the first partition wall 11c may be positioned between the first magnet part 11a and the second magnet part 11b.

The first magnet part 11a may comprise an N pole, an S pole, and a first boundary surface 21a between the N pole and the S pole. The first boundary surface 21a is a portion that does not substantially have magnetism and may comprise a section having little polarity, and it may be a naturally occurring portion to form a magnet consisting of one N pole and one S pole.

The second magnet part 11b may comprise an N pole, an S pole, and a second boundary surface 21b between the N pole and the S pole. The second boundary surface 21b may comprise a section having little polarity as a portion that does not substantially have magnetism, and it may be a naturally occurring portion to form a magnet consisting of one N pole and one S pole.

The first partition wall 11c separates or isolates the first magnet part 11a and the second magnet part 11b, and is a portion that does not substantially have magnetism and may be a part having little polarity. For example, the first partition wall 11c may be a non-magnetic material or air. The partition wall may be expressed as a "neutral zone" or a "neutral region". The first partition wall 11c separates or isolates the first magnet part 11a and the second magnet part 11b, and is a part that does not substantially have magnetism and may be a part having little polarity. For example, the first partition wall 11c may be a non-magnetic material or air. The partition wall may be expressed as a "neutral zone" or a "neutral zone".

The first partition wall 11c is a portion artificially formed when the first magnet part 11a and the second magnet part 11b are magnetized, and the width W11 of the first partition wall 11c may be larger than the respective widths of the first boundary surface 21a and the second boundary surface 21b.

Here, the width W11 of the first partition wall 11c may be the length of the first partition wall 11c in a direction directing from the first magnet part 11a toward the second magnet part 11b. Or, the width W11 of the first partition wall 11c may be the length of the first partition wall 11c in the optical axis direction.

The first magnet part 11a and the second magnet part 11b may be disposed so that polarities opposite to each other face each other in the optical axis direction. For example, the S pole of the first magnet part 11a and the N pole of the second magnet part 11b may be disposed to face the first coil unit 120-1, but is not limited thereto, and may be disposed vice versa.

The second magnet 130-2 may comprise a third magnet part 12a, a fourth magnet part 12b, and a second partition wall 12c disposed between the third magnet part 12a and the fourth magnet part 12b. Here, the second partition wall 12c may be expressed by replacing it with a "second non-magnetic partition wall".

For example, the third magnet part 12a and the fourth magnet part 12b may be spaced apart from each other in the optical axis direction, and the second partition wall 12c may be positioned between the third magnet part 12a and the fourth magnet part 12b.

Each of the third magnet part 12a and the fourth magnet part 12b may comprise an N pole, an S pole, and a boundary surface between the N pole and the S pole.

The description of the boundary surfaces 21a and 21b of the first and second magnet parts 11a and 11b may be applied to the boundary surface of each of the third magnet part 12a and the fourth magnet part 12b. In addition, the above-described description of the first partition wall 11c may be applied to the second partition wall 12c.

Each of the first partition wall 11c and the second partition wall 12c may be extended in a horizontal direction or a direction perpendicular to an optical axis. For example, each of the first and second partition walls 11c and 12c may isolate or separate the two magnet parts 11a and 11b and 12a and 12b from each other in the optical axis direction.

The first magnet part 11a, the first partition wall 11c, and the second magnet part 11b may be sequentially disposed in the optical axis direction. The third magnet part 12a, the second partition wall 12c, and the fourth magnet part 12b may be sequentially disposed in the optical axis direction.

For example, the first magnet part 11a may be disposed on the first partition wall 11c, and the second magnet part 11b may be disposed below the first partition wall 11c. In addition, the third magnet part 12a may be disposed on the second partition wall 12c, and the fourth magnet part 12b may be disposed below the second partition wall 12c.

For example, each of the first partition wall 11c and the second partition wall 12c may be parallel to a straight line perpendicular to an optical axis, and the boundary surfaces 21a and 21b of each of the first and second magnet parts 11a and 11b may be parallel to an optical axis.

For example, in each of the first magnet 130-4 and the second magnet 130-2, a bipolar magnetized N pole and an S pole may be disposed in the optical axis direction.

The third magnet 130-3 may comprise an N pole, an S pole, and a second boundary surface 21b between the N pole and the S pole. The boundary surface of the third magnet 130-3 may comprise a section having little polarity as a portion that does not substantially have magnetism, and it may be a naturally occurring portion to form a magnet consisting of one N pole and one S pole.

For example, the first magnet 130-1 may be located on an inner side of a region of the third coil unit 230-1, and may be overlapped with the third coil unit 230-1 in the optical axis direction.

For example, the second magnet 130-2 may be located on an inner side of a region of the fourth coil unit 230-2, and may be overlapped with the fourth coil unit 230-2 in the optical axis direction.

For example, the third magnet 130-3 may be located on an inner side of a region of the fifth coil unit 230-3, and may be overlapped with the fifth coil unit 230-3 in the optical axis direction.

Any one portion of the third coil unit 2304 may be overlapped with the first polarity portion of the first magnet part 11a, the first partition wall 11c, and the second polarity portion of the second magnet part 11b at the same time in the optical axis direction. Here, the first polarity portion may be an N pole or an S pole, and the second polarity portion may be a portion having a polarity opposite to the first polarity.

Any one portion of the fourth coil unit 230-2 may be overlapped with the first polarity portion of the third magnet part 12a, a second partition wall 12c, and the second polarity portion of the fourth magnet part 12b at the same time in the optical axis direction.

Any one portion of the fifth coil unit 230-3 may be overlapped with the N pole and the S pole of the third magnet 130-3 in the optical axis direction.

The first magnet 130-1 and the second magnet 130-2 may have the same shape, but are not limited thereto. For example, the first magnet 130-1 and the second magnet 130-2 may have the same length, width, and height, but are not limited thereto.

In addition, the third coil unit 230-1 and the fourth coil unit 230-2 may have the same shape, but are not limited thereto. For example, the third coil unit 230-1 and the fourth coil unit 230-2 may have the same length, width, and height, but are not limited thereto.

Referring to FIGS. 12 to 14, the length, width, and height of each of the first to third magnets 130-1 to 130-3, the dummies 135a and 135b, the sensing coil 180, and the third to fifth coil units 230-1 to 230-3 will be described.

Here, the length of each of the first to third magnets 130-1 to 130-3, the dummies 135a and 135b, the sensing coil 180, and the third to fifth coil units 230-1 to 230-3 may be the length in the lengthwise direction thereof, respectively.

In addition, the width of each of the first to third magnets 130-1 to 130-3, the dummies 135a and 135b, the sensing coil 180, and the third to fifth coil units 230-1 to 230-3 may be the width in the widthwise direction thereof, respectively. Here, the widthwise direction may be perpendicular to the lengthwise direction, and it may be the direction in which the length of each of the components 130-1 to 130-3, 135a, 135b, 180, and 230-1 to 230-3 is shorter. In addition, the width of each of the components 130-1 to 130-3, 135a, 135b, 180, and 230-1 to 230-3 may be expressed by replacing it with the "thickness" of each component.

The height of each of the first to third magnets 130-1 to 131-3, the dummies 135a and 135b, the sensing coil 180, and the third to fifth coil units 230-1 to 230-3 may be the length in the optical axis direction thereof, respectively.

For example, the length of each of the components 130-1 to 130-3, 135a, 135b, 180, and 230-1 to 230-3 may be the length in the horizontal direction of the first surface of each of the components 130-1 to 130-3, 135a, 135b, 180, and 230-1 to 230-3 facing the bobbin 110.

In addition, for example, the width of each of the components 130-1 to 130-3, 135a, 135b, 180, and 2304 to 230-3 may be the distance from a first surface of each of the components 130-1 to 130-3, 135a, 135b, 180, and 230-1 to 230-3 facing the bobbin 110 to a second surface which is the surface opposite to the first surface.

In addition, the height of each of the components 130-1 to 130-3, 135a, 135b, 180, and 230-1 to 230-3 may be the length in the longitudinal direction of the first surface of each of the components 130-1 to 130-3, 135a, 135b, 180, and 230-1 to 230-3 facing the bobbin 110. Or, for example, the height of each of the components 130-1 to 130-3, 135a, 135b, 180, and 230-1 to 230-3 may be the distance from a lower surface of each of the components 130-1 to 130-3, 135a, 135b, 180, and 2304 to 230-3 to an upper surface thereof.

The length L1 of the first magnet 130-1 may be smaller than the length M1 of the third coil unit 2304 (L1<M1), but is not limited thereto, and in another embodiment, both may be identical to each other.

The width W1 of the first magnet 130-1 may be smaller than the width K1 of the third coil unit 230-1 (W1<K1), but is not limited thereto, and in another embodiment, both may be identical to each other.

In addition, the length of the second magnet 130-2 may be smaller than the length of the fourth coil unit 230-2. The width of the second magnet 130-2 may be smaller than the width of the fourth coil unit 230-2.

The length L2 of the third magnet 130-3 may be smaller than the length M2 of the fifth coil unit 230-3 (L2<M2), but is not limited thereto, and in another embodiment, both may be identical to each other.

The width W2 of the third magnet 130-3 may be smaller than the width K2 of the fifth coil unit 230-3 (W2<K2), but is not limited thereto, and in another embodiment, both may be identical to each other.

The length M2 of the fifth coil unit 230-3 may be greater than the length M1 of the third coil unit 2304 and/or the length of the fourth coil unit 230-2 (M2>M1), but is not limited thereto, and in another embodiment, both may be identical to each other.

The length L2 of the third magnet 130-3 may be greater than the length L1 of the first magnet 130-1 and/or the length of the second magnet 130-2 (L2>L1), but is not limited thereto, and in another embodiment, both may be identical to each other.

In the embodiment, since M2>M1 and L2>L1, the first electromagnetic force generated by the fifth coil unit 230-3 and the third magnet 130-3 may be greater than any of the second electromagnetic force generated by the third coil unit 230-1 and the first magnet 130-1 and the third electromagnetic force generated by the fourth coil unit 230-2 and the second magnet 130-2. Due to this, the present embodiment can reduce the difference between the first electromagnetic force in the Y-axis direction and the sum of the second and third electromagnetic forces in the X-axis direction, and can reduce the difference between the driving force in the X-axis direction against the OIS moving part and the driving force in the Y-axis direction against the OIS moving part, thereby enhancing the reliability of the OIS operation.

In addition, the width K2 of the fifth coil unit 230-3 may be greater than the width K1 of the third coil unit 230-1 and/or the width of the fourth coil unit 230-2. (K2>K1), but is not limited thereto, and in another embodiment, both may be identical to each other.

The width W2 of the third magnet 130-3 may be greater than the width W1 of the first magnet 130-1 and/or the width of the second magnet 130-2 (W2>W1), but is not limited thereto, and in another embodiment, both may be identical to each other.

Since W2>W1, the embodiment can reduce the difference between the first electromagnetic force in the Y-axis direction and the sum of the second and third electromagnetic forces in the X-axis direction, and the difference between the driving force in the X-axis direction against the OIS moving part and the driving force in the Y-axis direction against the OIS moving part can be reduced, thereby enhancing the reliability of OIS operation.

The height H2 of the third magnet 130-3 may be smaller than the height H1 of the first magnet 130-1, and/or the height of the second magnet 130-2 (H2<H1), is not limited thereto, and in another embodiment, both may be identical to each other, and in another embodiment, the former may be greater than the latter.

Since H2<H1, the embodiment may reduce the weight of the lens driving device 100, thereby reducing power consumption for AF driving and/or OIS driving.

The length L3 of each of the first and second dummies 135a and 135b may be smaller than the length L2 of each of the first to third magnets 130-1 to 130-3 (L3<L2), but is not limited thereto, and in another embodiment, the former may be the same as or greater than the latter.

The width W3 of each of the first and second dummies 135a and 135b may be smaller than the width of each of the first to third magnets 130-1 to 130-3 (W3<W1, W2), but is not limited thereto, and in another embodiment, the former may be the same as or greater than the latter.

A height H3 of each of the first and second dummies 135a and 135b may be smaller than the height H1 of each of the first and second magnets 130-1 and 130-2, and may be greater than the height H2 of the third magnet 130-3 (H2<H3<H1), but is not limited thereto. In another embodiment, the height of each of the first and second dummies 135a and 135b may be equal to or greater than the height H1 of each of the first and second magnets 130-1 and 130-2. In another embodiment, the height of each of the first and second dummies 135a and 135b may be less than or equal to the height H2 of the third magnet 130-3.

The length M3 of the sensing coil 180 may be smaller than the lengths M1 and M2 of each of the third to fifth coil units 230-1 to 230-3 (M3<M1, M2), but is not limited thereto, and in other embodiments, the former may be the same as or greater than the latter.

The width K3 of the sensing coil 180 may be smaller than the width K2 of the fifth coil unit 230-3 (K3<K2). The width K3 of the sensing coil 180 may be the same as or smaller than the width K1 of each of the third and fourth coil units 2304 and 230-2, but is not limited thereto, and in another embodiment, the former may be larger than the latter.

The length (or height) in the optical axis direction of the sensing coil 180 may be greater than a length (or height) in the optical axis direction of each of the third to fifth coil units. Due to this, it is possible to increase the strength of the magnetic field of the sensing coil 180, and the sensitivity of the first position sensor 170 may be enhanced. In another embodiment, the length (or height) of the sensing coil 180 in the optical axis direction may be the same as the length (or height) of each of the third to fifth coil units in the optical axis direction.

In addition, a first separation distance between the first magnet 130-1 and the third coil unit 2304 in the optical axis direction, and a second separation distance between the second magnet 130-2 and the fourth coil unit 230-2 in the optical axis direction; and a third separation distance between the third magnet 130-3 and the fifth coil unit 230-3 in the optical axis direction may be the same as each other, but are not limited thereto.

In another embodiment, the third separation distance may be smaller than the first separation distance and/or the second separation distance. And since the third separation distance is smaller than the first separation distance and/or the second separation distance, when compared with the case where the first to third separation distances are all the same, in another embodiment, the difference between the electromagnetic force generated in the Y-axis direction and the electromagnetic force generated in the X-axis direction may be further reduced.

At the initial position of the OIS moving part, the first position sensor 170 may be overlapped with the sensing coil 180 in the optical axis direction. The first position sensor 170 may not be overlapped with the dummy member 135 in the optical axis direction, but is not limited thereto, and in another embodiment, at least a portion of the first position sensor 170 may be overlapped with the dummy member 135 in the optical axis direction.

Here, the initial position of the OIS moving part may be the initial position of the OIS moving part supported by the support member 220 and the elastic members 150 and 160 in a state in which a driving signal is not provided to the second coil 230. In addition, the initial position of the OIS moving part may be a position where the OIS moving part is placed when gravity acts in the direction from the bobbin 110 to the base 210, or conversely, when gravity acts in the direction from the base 210 to the bobbin 110.

At the initial position of the OIS moving part, each of the first to third magnets 130-1 to 130-3 may be overlapped with any corresponding one among the third to fifth coil units 230-1 to 230-3 in the optical axis direction.

The first sensor 240a may be overlapped with the first magnet 130-1 in the optical axis direction, and the second sensor 240b may be overlapped with the third magnet 130-3 in the optical axis direction.

In addition, in FIGS. 13 and 14, the first sensor 240a overlaps the third coil unit 2304 in the optical axis direction, and the second sensor 240b overlaps the fifth coil unit 230-3 in the optical axis direction, but is not limited thereto, and in another embodiment, the first sensor may not be overlapped with the third coil unit in the optical axis direction, and the second sensor may not be overlapped with the fifth coil unit in the optical axis direction.

Referring to FIG. 14, the first position sensor 170 may be located within the region of the sensing coil 180. For example, the first position sensor 170 may be disposed below the sensing coil 180, the first sensor 240a may be disposed below the first magnet 130-1, and the second sensor 240b may be disposed below the third magnet 130-3.

In order to enhance the sensitivity of the first position sensor 170, a sensing element (or a sensing region) of the first position sensor 170 may be overlapped with the sensing coil 180 in the optical axis direction.

At the initial position of the OIS moving part, the sensing element of the first position sensor 170 may be overlapped with the sensing coil 180 in the optical axis direction.

The first position sensor 170 is disposed on the fixed part (for example, the circuit board 250 and the base 210), since the sensing coil 180 is disposed in the OIS moving part (for example, bobbin 110), when the OIS moving part moves in the direction perpendicular to the optical axis against the fixed part, alignment or relative positional relationship in the optical axis direction between the sensing coil 180 and the first position sensor 170 may be changed, and as a result, the sensitivity of the first position sensor 170 may decrease or the sensitivity of the first position sensor 170 may be affected.

Within the stroke range of the OIS moving part in the direction perpendicular to the optical axis, the sensing element of the first position sensor 170 and at least a portion of the sensing coil 180 may maintain an overlapping state in the optical axis direction.

For example, at least a portion of the sensing coil 180 may be disposed between the first dummy 35A and the second dummy 35B, but is not limited thereto.

The AF moving part and the OIS moving part of the lens driving device 100 may be supported by the elastic part. For example, the elastic part may comprise at least one of an upper elastic member 150, a lower elastic member 160, and a support member 220.

For example, the elastic part may comprise a first elastic part elastically supporting the AF moving part against the housing 140, and a second elastic part elastically supporting the OIS moving part against the fixed part.

For example, the first elastic part may comprise an upper elastic member 150 and a lower elastic member 160, and the second elastic part may comprise a support member 220.

The OIS moving part supported by the first and second elastic parts against the fixed part may be sagged or moved in the direction of gravity under the influence of gravity.

In general, when the AF position sensor is placed in an OIS moving part (for example, housing or bobbin), since the AF position sensor can detect the displacement of the AF moving part in the optical axis direction through feedback operation, the sagging of the AF moving part due to the effect of gravity can be automatically corrected or compensated.

However, since the AF position sensor disposed in the OIS moving part cannot detect the displacement in the optical axis direction of the OIS moving part against the fixed part, the sagging or movement of the OIS moving part due to the effect of gravity cannot be automatically corrected or compensated by the AF position sensor.

In the embodiment, since the first position sensor 170 is disposed in the fixed part (for example, the circuit board 250 and the base 210), it is possible to automatically compensate or correct the movement (or deflection) of the AF moving part caused by the movement (or deflection) of the OIS moving part due to the effect of gravity, and due to this, it is possible to perform accurate AF driving, thereby enhancing the reliability of the AF operation.

Figure 15A:
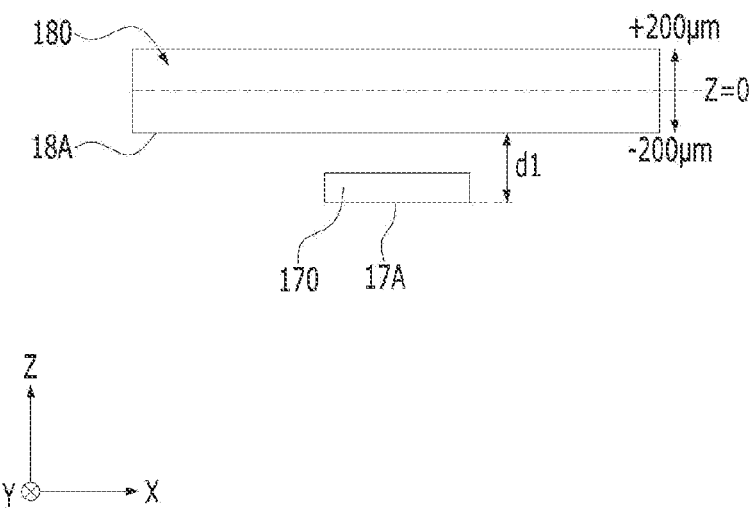
FIG. 15a shows an disposement of a sensing coil and a first position sensor for simulation.
Figure 15B:
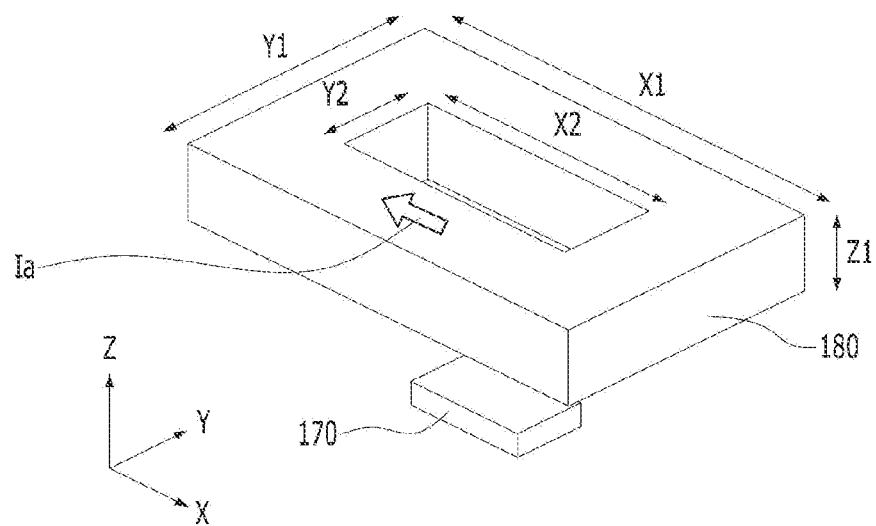
FIG. 15b shows a change in the position of the sensing coil of FIG. 115a according to the movement of the AF moving part in the optical axis direction.

FIG. 15a shows an disposement of a sensing coil 180 and a first position sensor 170 for simulation. FIG. 15b shows a change in the position of the sensing coil 180 of FIG. 15a according to the movement of the AF moving part in the optical axis direction, and FIG. 15c illustrates a change in the strength of a magnetic field of the sensing coil 180 detected by a first position sensor 170 according to a change in the position of the sensing coil 180 of FIG. 15b.

Figure 15C:
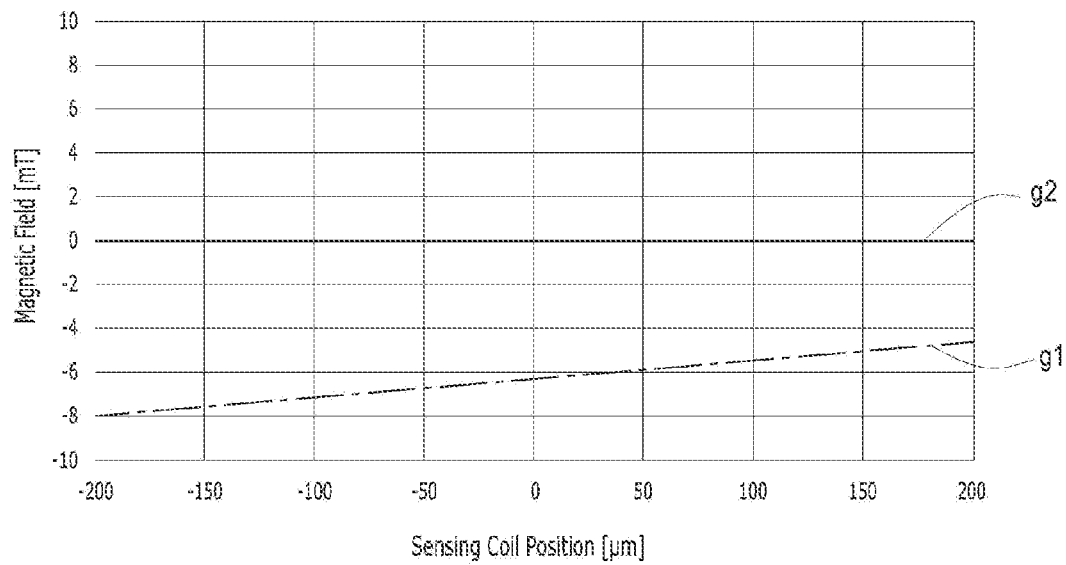
FIG. 15c illustrates a change in the strength of a magnetic field of the sensing coil detected by a first position sensor according to a change in the position of the sensing coil of FIG. 15b.

Referring to FIGS. 15a to 15c, the shape of the outer circumferential surface of the sensing coil 180 as viewed from above may be a rectangle, but is not limited thereto. The length X1 of the outer circumferential surface of the sensing coil 180 may be 3.29 [mm], the width Y1 of the outer circumferential surface of the sensing coil 180 may be 2.05 [mm], the length X2 of the inner circumferential surface of the sensing coil 180 may be 1.93 [mm], the width Y2 of the inner circumferential surface of the sensing coil 180 may be 0.74 [mm], and the length Z1 of the sensing coil 180 in the optical axis direction may be 0.54 [mm]. In addition, the driving signal Ia provided to the sensing coil 180 may be 100 [mA]. In addition, the separation distance d1 from the lower surface 17A of the first position sensor 170 to the lower surface 18A of the sensing coil 180 may be 0.43 [mm].

At the initial position of the AF moving part (for example, a position where Z=0), the forward stroke of the AF moving part may be 200 [μm], and the rear stroke of the AF moving part may be 200 [∥m].

In FIG. 15c, the X-axis represents the displacement (or position) of the sensing coil 180 in the optical axis direction, and the Y-axis represents the change in the strength of the magnetic field of the sensing coil 180 detected by the first position sensor 170. g1 represents the change in the intensity of the magnetic field in the optical axis direction of the sensing coil 180 detected by the first position sensor 170, and g2 represents a change in the strength of the magnetic field in a direction perpendicular to the optical axis of the sensing coil 180 detected by the first position sensor 170.

As illustrated in g1, the change in the magnetic field in the optical axis direction detected by the first position sensor 170 according to the displacement in the optical axis direction of the AF moving part may be within the range of −4.6 [mT] to −8.2 [mT], and g1 may be a linear graph.

The output of the first position sensor 170 may be proportional to the strength of the magnetic field of the sensing coil 180 sensed by the first position sensor 170, and the control units 830 and 780 of the camera module 200 or the terminal 200A may detect the displacement of the AF moving part in the optical axis direction using the output of the first position sensor 170.

The present embodiment comprises the three magnets 130-1 to 130-3 and three OIS coil units 230-1 to 230-3 corresponding thereto in order to reduce magnetic field interference between magnets comprised in adjacent lens driving devices in a dual or more camera module.

The two magnets 130-1 and 130-2 among the three magnets 130-1 to 130-3 perform AF operation in the optical axis direction by interaction with the first and second coil units 120-1 and 120-2, and at the same time, may perform the OIS operation in the X-axis direction perpendicular to the optical axis by interaction with the third and fourth coil units 230-1 and 230-2.

The other magnet 130-3 among the three magnets 130-1 to 130-3 may perform only the OIS operation in the Y-axis direction perpendicular to the optical axis by interaction with the fifth coil unit 230-3.

By disposing the dummy member 135 on the opposite side of the third magnet 130-3, the present embodiment can prevent oscillation due to weight eccentricity during OSI operation.

In general, the electromagnetic force in the X-axis direction due to the interaction between one magnet and one coil unit is smaller than the electromagnetic force in the Y-axis direction due to the interaction between the two magnets and the two coil units. In addition, the difference between the electromagnetic force in the X-axis direction and the electromagnetic force in the Y-axis direction may cause a malfunction of OIS driving.

In order to reduce the difference between the electromagnetic force generated in the X-axis direction and the electromagnetic force generated in the Y-axis direction, the present embodiment can be configured as follows.

In addition, the number of turns of the coil in the fifth coil unit 230-3 (hereinafter referred to as the "first number of turns") may be larger than the number of turns of the coil in the third coil unit 2304 (hereinafter referred to as the "second number of turns") or/and the number of turns of the coil in the fourth coil unit 230-2 (hereinafter referred to as the "third number of turns"), and accordingly, the difference between the electromagnetic force generated in the X-axis direction and the electromagnetic force generated in the Y-axis direction can be reduced.

In addition, for example, the second number of turns and the third number of turns may be the same, but is not limited thereto. In another embodiment, the first number of turns and the second number of turns (or the third number of turns) may be the same.

In addition, the length L2 of the third magnet 130-3 may be greater than the length L1 of the first magnet 130-1 and/or the length of the second magnet 130-2, the length M2 of the fifth coil unit 230-3 may be greater than the length M1 of the third coil unit 230-1 and/or the length of the fourth coil unit 230-2, and accordingly, the difference between the electromagnetic force generated in the X-axis direction and the electromagnetic force generated in the Y-axis direction can be reduced.

Figure 16:
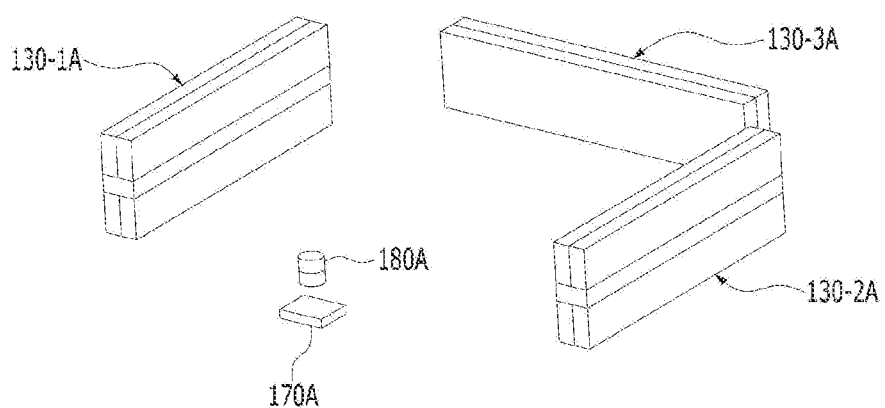
FIG. 16 shows another embodiment of a lens driving device.

FIG. 16 shows another embodiment of a lens driving device. Referring to FIG. 16, in another embodiment, the sensing coil 180 of the lens driving device 100 may be replaced with a sensing magnet 180A.

For example, a sensing magnet 180A may be disposed on the bobbin 110 instead of the sensing coil 180. For example, the sensing magnet 180A may be coupled to the protruding part 116 of the bobbin 110. For example, the protruding part 116 of the bobbin 110 may have a groove in which the sensing magnet 180A is seated or disposed.

The shape of the sensing magnet 180A may be a cylindrical shape or a polyhedral shape, but is not limited thereto.

For example, the sensing magnet 180A may have a cylindrical shape in which a length in an optical axis direction is longer than a length in a direction perpendicular to the optical axis, but is not limited thereto.

For example, the cross-sectional shape of the sensing magnet 180 cut in a direction perpendicular to the optical axis may be a circular, oval, or polygonal (for example, triangular or rectangular) shape, but is not limited thereto.

The lens driving device 100 according to the above-described embodiment may be implemented in various fields, for example, as a camera module or an optical apparatus, or may be used in a camera module or an optical apparatus.

For example, the lens driving device 100 according to the present embodiment may be comprised in optical apparatuses being used for forming an image of an object in space by using the characteristics of light such as reflection, refraction, absorption, interference, and diffraction, or increasing the visual acuity of the eyes, or recording the image by the lens and reproducing thereof, or optical measurement, image propagation or transmission, or the like. For example, the optical apparatus according to the present embodiment may comprise a smartphone and a portable terminal equipped with a camera.

Figure 17:
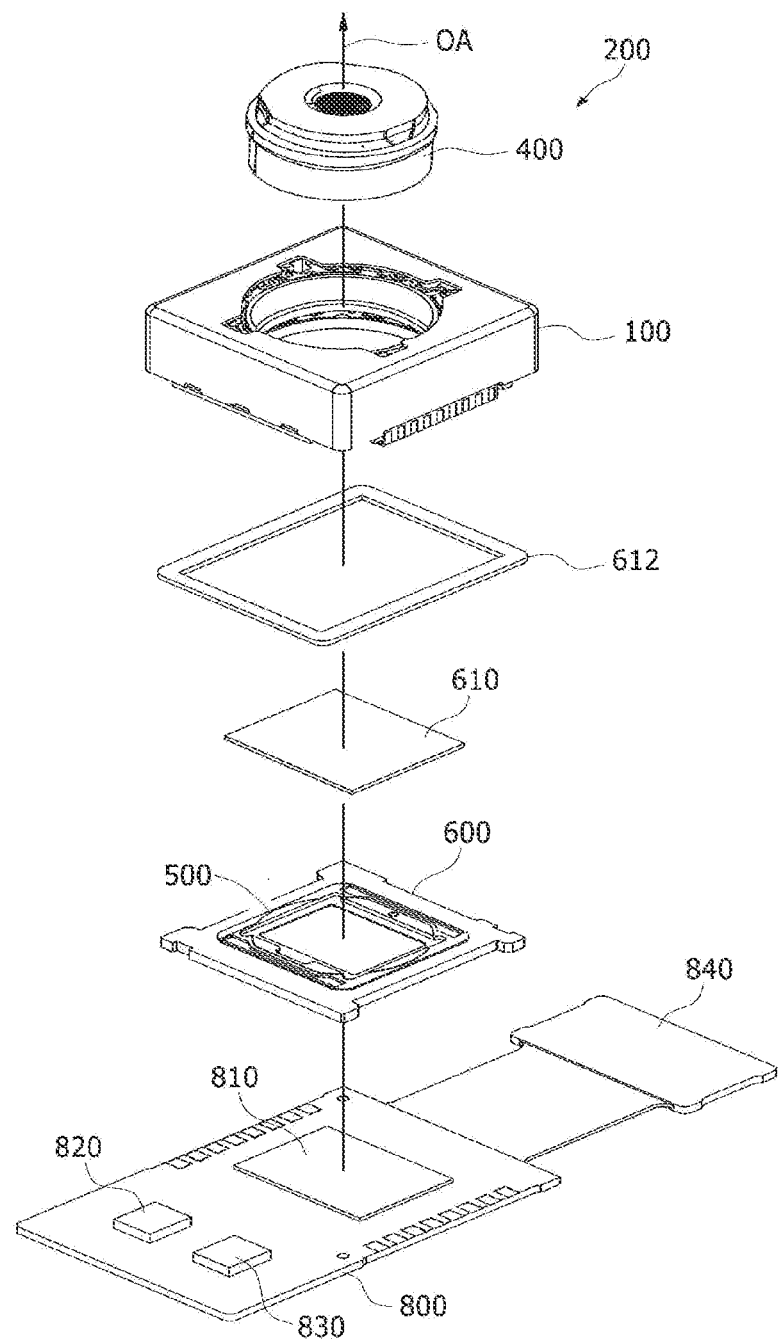
FIG. 17 is an exploded perspective view of a camera module according to a first embodiment of the present invention.

FIG. 17 is an exploded perspective view of a camera module 200 according to a first embodiment of the present invention.

Referring to FIG. 17, the camera module 200 may comprise a lens or lens barrel 400, a lens driving device 100, an adhesive member 612, a filter 610, a first holder 600, and a second holder 800, an image sensor 810, a motion sensor 820, a control unit 830, and a connector 840.

The lens or lens barrel 400 may be mounted on the bobbin 110 of the lens driving device 100.

The first holder 600 may be disposed under the base 210 of the lens driving device 100. The filter 610 is mounted on the first holder 600, and the first holder 600 may comprise a protruding part 500 on which the filter 610 is mounted.

The adhesive member 612 may couple or attach the base 210 of the lens driving device 100 to the first holder 600. The adhesive member 612 may serve to prevent foreign substances from being introduced into the lens driving device 100 in addition to the aforementioned bonding role.

For example, the adhesive member 612 may be an epoxy, a thermosetting adhesive, or an ultraviolet curable adhesive.

The filter 610 may serve to block light of a specific frequency band in light passing through the lens barrel 400 from being incident on the image sensor 810. The filter 610 may be an infrared cut filter, but is not limited thereto. At this time, the filter 610 may be disposed to be parallel to the x-y plane.

An opening may be formed in a portion of the first holder 600 on which the filter 610 is mounted so that light passing through the filter 610 may be incident on the image sensor 810.

The second holder 800 may be disposed below the first holder 600, and the image sensor 810 may be mounted in the second holder 600. The image sensor 810 is a portion on which the light passing through the filter 610 is incident to form an image comprised in the light.

The second holder 800 may be provided with various circuits, devices, control units, etc. to convert an image formed on the image sensor 810 into an electrical signal and transmit it to an external device.

The second holder 800 may be implemented as a circuit board on which an image sensor may be mounted, a circuit pattern may be formed, and various elements may be coupled thereto.

The image sensor 810 may receive an image comprised in light incident through the lens driving device 100 and convert the received image into an electrical signal.

The filter 610 and the image sensor 810 may be spaced apart to face each other in a first direction.

The motion sensor 820 may be mounted on the second holder 800 and may be electrically connected to the control unit 830 through a circuit pattern provided on the second holder 800.

The motion sensor 820 outputs rotational angular velocity information according to the movement of the camera module 200. The motion sensor 820 may be implemented as a 2-axis or 3-axis gyro sensor or an angular velocity sensor.

The control unit 830 is mounted or disposed on the second holder 800. The second holder 800 may be electrically connected to the lens driving device 100. For example, the second holder 800 may be electrically connected to the circuit board 250 of the lens driving device 100.

For example, a driving signal may be provided to the first position sensor 170 and the second position sensor 240 through the second holder 800, and an output signal of the first position sensor 170 and an output signal of the second position sensor 240 may be transmitted to the second holder 800. For example, an output signal of the first position sensor 170 and an output signal of the second position sensor 240 may be received by the control unit 830.

The connector 840 is electrically connected to the second holder 800 and may comprise a port for being electrically connected to an external device.

Figure 18:
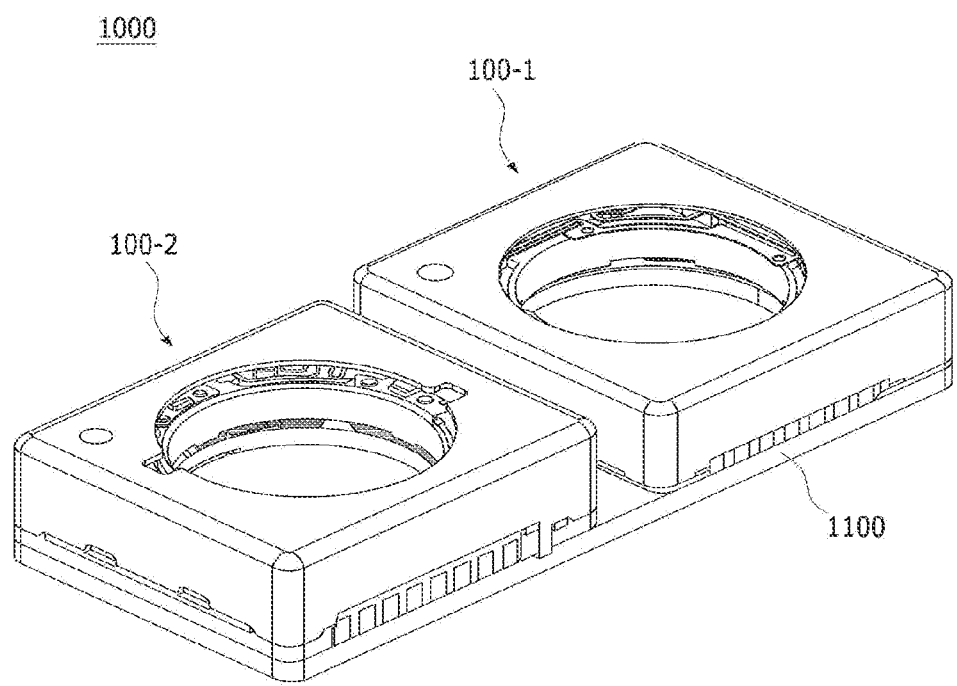
FIG. 18 is a perspective view of a camera module according to another embodiment.

FIG. 18 is a perspective view of a camera module 1000 according to another embodiment.

Referring to FIG. 18, the camera module 1000 may be a dual camera module comprising a first lens driving device 100-1 and a second lens driving device 100-2.

Each of the first lens driving device 100-1 and the second lens driving device 100-2 may be either a lens driving device for auto focus (AF) or a lens driving device for optical image stabilizer (OIS).

A lens driving device for AF refers to a device capable of performing only an autofocus function, and a lens driving device for OIS refers to a device capable of performing an autofocus function and an optical image stabilizer (OIS) function.

For example, the first lens driving device 100-1 may be the embodiment 100 illustrated in FIG. 1, and the second lens driving device 100-2 may be the embodiment 100 illustrated in FIG. 1 or a lens driving device for AF.

The camera module 1000 may further comprise a circuit board 1100 for mounting the first lens driving device 100-1 and the second lens driving device 100-2. In FIG. 18, the first lens driving device 100-1 and the second lens driving device 100-2 are disposed side by side on one circuit board 1100, but are not limited thereto. In another embodiment, the circuit board 1100 may comprise a first circuit board and a second circuit board separated from each other, the first lens driving device may be disposed on the first circuit board, and the second lens driving device may be disposed on the second circuit board.

By disposing the dummy member 135 of the first lens driving device 100-1 adjacent to the second lens driving device 100-2, the magnetic field decrease between the first to third magnets 130-1 to 130-3 of the first lens driving device 100-1 and a magnet comprised in the second lens driving device 100-2 can be reduced, and accordingly, reliability of AF driving, and/or reliability of OIS driving of each of the first lens driving device 100-1 and the second lens driving device 100-2 may be secured.

When the lens driving devices comprised in the dual or more camera modules are provided with a sensing magnet corresponding to the AF position sensor, a malfunction may occur in the function of the camera module such as AF operation or OIS operation due to the influence of the magnetic field of the sensing magnet, and due to this, the resolution of the camera module may be reduced.

Figure 19A:
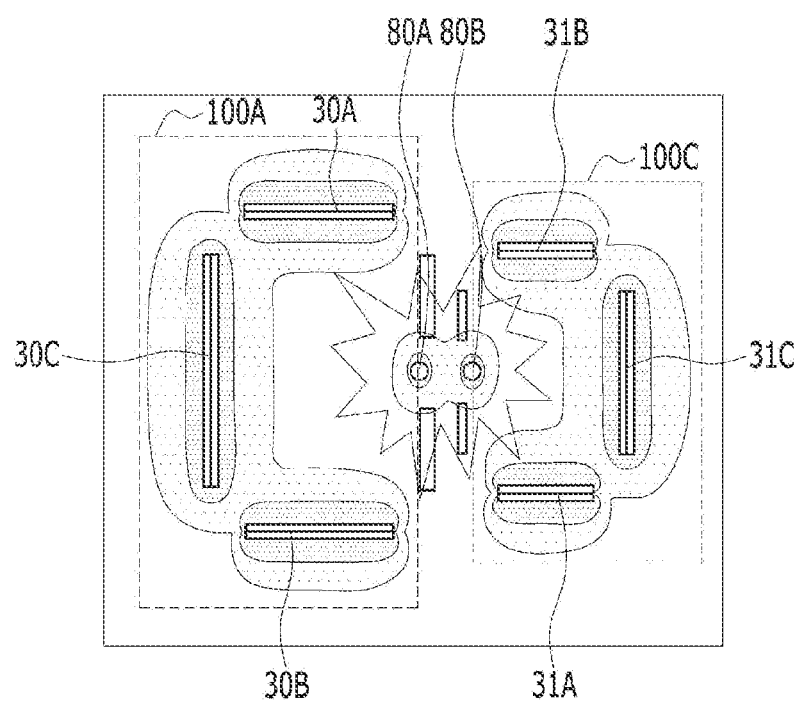
FIG. 19a shows an embodiment of the dual camera module of FIG. 18.

FIG. 19a shows an embodiment of the dual camera module of FIG. 18. In addition, FIG. 19a shows the magnetic fields of the magnets 30A, 30B, 30C, 31A, 31B, and 31C and the sensing magnets 80A and 80B.

The dual camera module of FIG. 19a may comprise a first lens driving device 100A and a second lens driving device 100C.

The first lens driving device 100A may comprise three driving magnets 30A, 30B, and 30C and one sensing magnet 80A.

For example, each of the first and second lens driving devices 100A and 100C may be any one of the lens driving device 100 according to the embodiment of FIG. 1, the lens driving device of FIG. 16 (or the lens driving device 100-2 of FIG. 20b), or the third lens driving device.

For each embodiment, the description of the lens driving device 100 according to the embodiment of FIG. 1 or the lens driving device of FIG. 16 (or the lens driving device 100-2 of FIG. 20b) may be applied.

That is, the driving magnets 30A, 30B, and 30C may correspond to the magnets 130-1 to 130-3 of the embodiments of FIGS. 1 and 16, and for the sensing magnets 80A and 80B the description of the sensing magnet 180A may be applied.

Figure 20A:
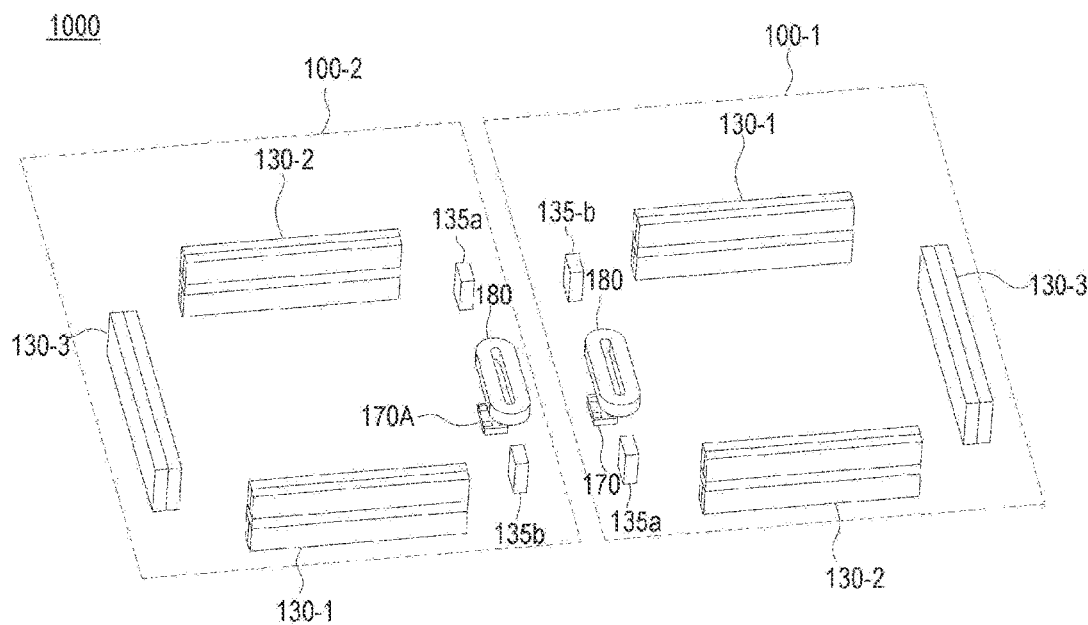
FIG. 20a shows yet another embodiment of the dual camera module of FIG. 18.
Figure 20B:
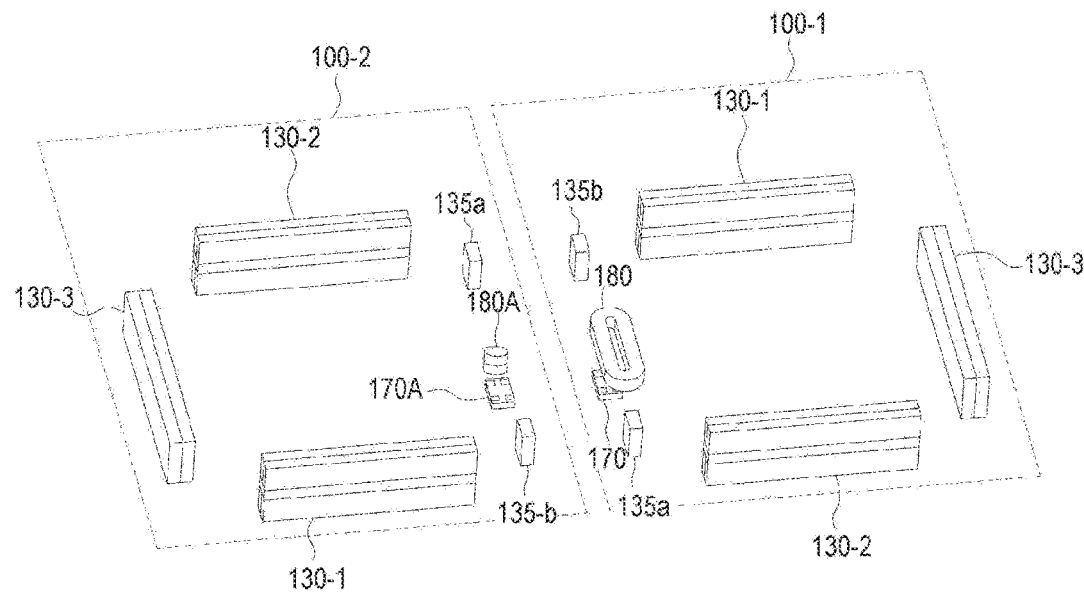
FIG. 20b shows yet another embodiment of the dual camera module of FIG. 18.

For example, the third lens driving device may be an embodiment in which the first position sensor 170A is disposed in the housing 140 instead of the base 210 in the lens driving device 100-2 of FIG. 20b.

In order to reduce magnetic field interference between the driving magnets 30A to 30B and 31A to 31C of the first and second lens driving devices 100A and 100C, as shown in FIG. 19a, the driving magnets 30A to 30B, 31A to 31C and sensing magnets 80A and 80B may be disposed.

Figure 19B:
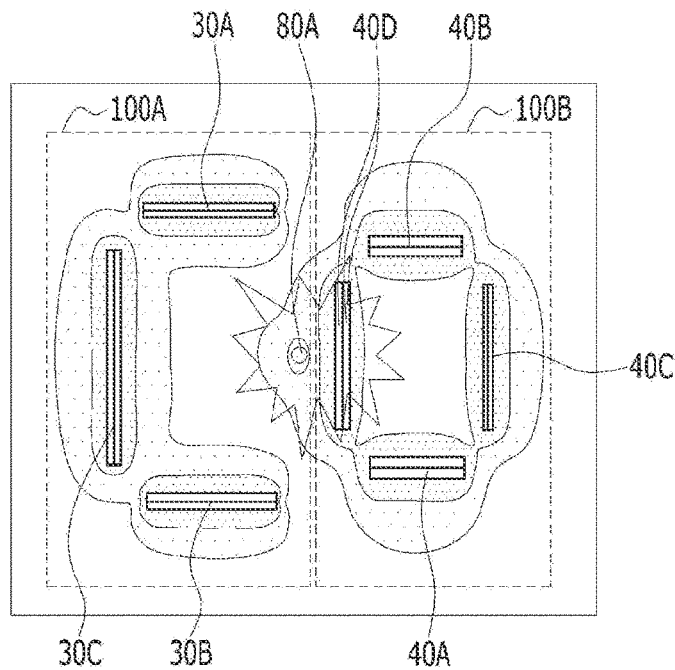
FIG. 19b shows another embodiment of the dual camera module of FIG. 18.

FIG. 19b shows another embodiment of the dual camera module of FIG. 18. In addition, FIG. 19b shows magnetic fields of the magnets 30A, 30B, 30C, 40A, 40B, 40C, and 40D and the sensing magnets 80A and 80B.

The dual camera module of FIG. 19b may comprise a first lens driving device 100A and a second lens driving device 100B. The first lens driving device may be expressed by replacing it with the "first camera module", and the second lens driving device may be expressed by replacing it with the "second camera module".

The first lens driving device 100A may be the same as described above, and the second lens driving device 100B may comprise four driving magnets 40A, 40B, 40C, and 40D.

FIG. 20a shows yet another embodiment of the dual camera module 1000 of FIG. 18.

Referring to FIG. 20a, each of a first lens driving device 100-1 and a second lens driving device 100-2 may be a lens driving device 100 according to the embodiment of FIG. 1.

A fourth side portion of the first housing of the first lens driving device 100-1 in which the dummy members 135a and 135b are disposed, and a fourth side portion of the second housing of the second lens driving device 100-2 in which the dummy members 135a and 135b are disposed, may be disposed adjacent to each other.

In addition, when viewed from the top, the first dummy members 135a and 135b of the first lens driving device 100-1 may be disposed between the third magnet 130-3 of the first lens driving device 100-1 and the second dummy members 135a and 135b of the second lens driving device 100-2.

The fourth side portion 141-4 of the first housing of the first lens driving device 100-1 and the fourth side portion 141-4 of the second housing of the second lens driving device 100-2 may be disposed adjacent to each other.

For example, the fourth side portion of the first housing and the fourth side portion of the second housing may be disposed parallel to each other, but is not limited thereto.

The first dummy members 135a and 135b of the first lens driving device 100-1 and the second dummy members 135a and 135b of the second lens driving device 100-2 may be disposed adjacent to each other.

The first bobbin of the first lens driving device 100-1 and the second bobbin of the second lens driving device 100-2 may be disposed to be spaced apart from each other.

The first magnet 130-1 of the first lens driving device 100-1 may be disposed on a first side of the first bobbin, and may be spaced apart from the first side of the first bobbin or disposed adjacent to the first side of the first bobbin.

For example, the first magnet 130-1 of the first lens driving device 100-1 may be disposed between the first bobbin (for example, the first side of the first bobbin) and the first housing. For example, the first magnet 130-1 may be disposed in the first housing to correspond to the first side of the first bobbin.

The second magnet 130-2 of the first lens driving device 100-1 may be disposed on a second side of the first bobbin facing the first side of the first bobbin, and may be disposed spaced apart from the second side of the first bobbin or adjacent to the second side of the first bobbin.

For example, the second magnet 130-2 of the first lens driving device 100-1 may be disposed between the first bobbin (for example, the second side of the first bobbin) and the first housing. For example, the second magnet 130-2 may be disposed in the first housing to correspond to the second side of the first bobbin.

The third magnet 130-3 of the first lens driving device 100-1 may be disposed on a third side of the first bobbin adjacent to the first side of the first bobbin, and may be disposed spaced apart from the third side of the first bobbin or adjacent to the third side of the first bobbin.

For example, the third magnet 130-3 may be disposed between the first bobbin (for example, the third side of the first bobbin) and the first housing. For example, the third magnet 130-3 may be disposed in the first housing to correspond to the third side of the first bobbin.

The first magnet 130-1 of the second lens driving device 100-2 may be disposed on a first side of the second bobbin, and may be disposed spaced apart from the first side of the second bobbin or adjacent to the first side of the second bobbin.

For example, the first magnet 130-1 of the second lens driving device 100-2 may be disposed between the second bobbin (for example, the first side of the second bobbin) and the second housing. For example, the first magnet 130-1 of the second lens driving device 100-2 may be disposed in the second housing to correspond to the first side of the second bobbin.

The second magnet 130-2 of the second lens driving device 100-2 may be disposed on a second side of the second bobbin facing the first side of the second bobbin, and may be disposed spaced apart from the second side of the second bobbin or adjacent to the second side of the second bobbin.

For example, the second magnet 130-2 of the second lens driving device 100-2 may be disposed between the second bobbin (for example, the second side of the second bobbin) and the second housing. For example, the second magnet 130-2 of the second lens driving device 100-2 may be disposed in the second housing to correspond to the second side of the second bobbin.

The third magnet 130-3 of the second lens driving device 100-2 may be disposed on a third side of the second bobbin adjacent to the first side of the second bobbin, and may be disposed spaced apart from the third side of the second bobbin or adjacent to the third side of the second bobbin.

For example, the third magnet 130-3 of the second lens driving device 100-2 may be disposed between the second bobbin (for example, the third side of the second bobbin) and the second housing. For example, the third magnet 130-3 of the second lens driving device 100-2 may be disposed in the second housing to correspond to the third side of the second bobbin.

The first dummy members 135a and 135b of the first lens driving device 100-1 may be disposed on a fourth side of the first bobbin facing the third side of the first bobbin, and may be disposed spaced apart from the fourth side of the first bobbin or adjacent to the fourth side of the first bobbin.

The second dummy members 135a and 135b of the second lens driving device 100-2 may be disposed on a fourth side of the second bobbin opposite to a third side of the second bobbin, and may be disposed spaced apart from the fourth side of the second bobbin or adjacent to the fourth side of the second bobbin.

The first dummy members 135a and 135b of the first lens driving device 100-1 and the second dummy members 135a and 135b of the second lens driving device 100-2 may be disposed to be overlapped with each other in a direction directing from the third magnet 130-3 of the first lens driving device 100-1 toward the third magnet 130-3 of the second lens driving device 100-2.

Or, when viewed from the top, the dummy members 135a and 135b of the first and second lens driving devices 100-1 and 100-2 may be disposed to be overlapped with each other in the direction directing from the first bobbin (for example, the fourth side) toward the second bobbin (for example, the fourth side).

In addition, the first position sensor 170 of the first lens driving device 110-1 and the first position sensor 170A of the second lens driving device 100-2 may be disposed in regions adjacent to each other of the first base of the first lens driving device 110-1 and the second base of the second lens driving device 100-2.

At this time, the regions adjacent to each other of the first and second bases may correspond to fourth side portions of the first and second housings (or fourth sides of the first and second bobbins).

The sensing coil 180 (hereinafter, referred to as a "first sensing coil") of the first lens driving device 110-1 may be disposed on any side portion (or side surface) of the first bobbin corresponding to or facing the fourth side portion of the first housing, for example, on the fourth side of the first bobbin.

The sensing coil 180 (hereinafter referred to as a "second sensing coil") of the second lens driving device 110-2 may be disposed on any side portion (or side surface) of the second bobbin corresponding to or opposite to the fourth side portion of the second housing, for example, the fourth side of the second bobbin.

The first sensing coil and the second sensing coil may be disposed adjacent to each other.

The first sensing coil may be disposed on a fourth side of the first bobbin facing the third side of the first bobbin, and the second sensing coil may be disposed on a fourth side of the second bobbin facing the third side of the second bobbin.

The first sensing coil and the second sensing coil may be disposed to overlap each other in a direction directing from the third magnet 130-3 of the first lens driving device 100-1 toward the third magnet 130-3 of the second lens driving device 100-2.

Or, when viewed from the top, the first and second sensing coils may be disposed to be overlapped with each other in the direction directing from the first bobbin (for example, the fourth side) toward the second bobbin (for example, the fourth side).

Since the embodiment of FIG. 20a comprises the sensing coil 180 instead of the sensing magnets 80A and 80B of FIG. 19a, the influence of magnetic field interference between the adjacent sensing magnets of FIG. 19a can be reduced, and accordingly, an error in AF operation due to magnetic field interference can be prevented.

Referring to FIGS. 20a, and 1 to 15c, the camera module 1000 may comprise a first camera module 100-1 and a second camera module 100-2.

The first camera module 100-1 comprises: a first bobbin 110 of 100-1; a first AF coil 120 of 100-1 disposed on the first bobbin 110 of 100-1; a first magnet 130 of 100-1 corresponding to the first AF coil 120 of 100-1; a first sensing coil 180 of 100-1 disposed on the first bobbin 110 of 100-1; and first position sensor 170 corresponding to the first sensing coil 180 of 100-1.

The second camera module 100-2 may comprise: a second bobbin 110 of 100-2 spaced apart from the first bobbin 110 of 100-2; a second AF coil 120 of 100-2 disposed on the second bobbin; a second magnet 130 of 100-2 corresponding to the second AF coil 120 of 100-2; a second sensing coil 180 of 100-2 disposed on the second bobbin 110 of 100-2; and a second position sensor 170A corresponding to the second sensing coil 180 of 100-2.

The first sensing coil 180 of 100-1 and the second sensing coil 180 of 100-2 may be disposed on the side portions facing each other and adjacent to the first bobbin 110 of 100-1 and the second bobbin 110 of 100-2.

Or, the camera module 1000 may comprise a first camera module 100-1 and a second camera module 100-2.

The first camera module 100-1 may comprise: a first cover 300 of 100-1; a first housing 140 of 100-1 disposed in the first cover 300 of 100-1; a first bobbin 110 of 100-1 disposed inside the first housing 140 of 100-1; a first AF coil 120 of 100-1 disposed on the first bobbin 110 of 100-1; a first magnet 130 of 100-1 disposed in the first housing 140 of 100-1 and corresponding to the first AF coil 120 of 100-1; a first sensing coil 180 of 100-1 disposed on the first bobbin 110 of 100-1; a first base 210 of 100-1 disposed below the first housing 140 of 100-1; and a first position sensor 170 disposed on the first base 210 of 100-1 and corresponding to the first sensing coil 180 of 100-1.

The second camera module 100-2 may comprise: a second cover 300 of 100-2; a second housing 140 of 100-2 disposed in the second cover 300 of 100-2; a second bobbin 110 of 100-2 disposed inside the second housing 140 of 100-2; a second AF coil 120 of 100-2 disposed on the second bobbin 110 of 100-2; a second magnet 130 of 100-2 disposed in the second housing 140 of 100-2 and corresponding to the second AF coil 120 of 100-2; a second sensing coil 180 of 100-2 disposed on the second bobbin 110 of 100-2; a second base 210 of 100-2 disposed below the second housing 140 of 100-2; and a second position sensor 170A of 100-2 disposed on the second base 210 of 100-2 and corresponding to the second sensing coil 180 of 100-2.

The first sensing coil 180 of 100-1 and the second sensing coil 180 of 100-2 may be disposed on the side portions facing each other and adjacent to the first bobbin 110 of 100-1 and the second bobbin 110 of 100-2.

The first sensing coil 180 of 100-1 and the first position sensor 170 of 100-1 may be overlapped with each other in the optical axis direction, and the second sensing coil 180 of 100-2 and the second position sensor 170 of 100-2 may be overlapped with each other in the optical axis direction.

The first cover 300 of 100-1 may comprise a first upper plate, a first-first side plate being extended from the first upper plate and adjacent to the second cover 300 of 100-2, and a first-second side plate located facing the first-first side plate; and the second cover 300 of 100-2 may comprise a second upper plate, a second-first side plate being extended from the second upper plate and facing the first-first side plate, and a second-second side plate located opposite to the second-first side plate.

The first sensing coil 180 of 100-1 is more adjacent to the first-first side plate than the first-second side plate, and the second sensing coil 180 of 100-2 may be more adjacent to the second-first side plate rather than the second-second side plate.

The first cover 300 of 100-1 may comprise a first-third side plate disposed between the first-first side plate and the first-second side plate and facing each other and a first-fourth side plate.

The second cover 300 of 100-2 may comprise a second-third side plate positioned between the second-first side plate and the second-second side plate and facing each other and a second-fourth side plate.

The first magnet 130 of 100-1 may comprise a first-first magnet 130-1 of 100-1 corresponding to the first-third side plate, a first-second magnet 130-2 of 100-1 corresponding to the first-fourth side plate, and a first-third magnet corresponding to a first-second side plate 130-3 of 100-1.

The second magnet 130 of 100-2 may comprise a second-first magnet 130-1 of 100-2 corresponding to the second-third side plate, a second-second magnet 130-2 of 100-2 corresponding to the second-fourth side plate, and a second-third magnet corresponding to a second-second side plate 130-3 of 100-2.

The first dummy members 135a and 135b of 100-1 may be disposed in any one side portion of the first housing 140 of 100-1 corresponding to the first-first side plate (for example, a fourth side portion 141-4 of 100-1), and the second dummy members 135a and 135b of 100-2 may be disposed in any one side portion of the second housing 140 of 100-2 corresponding to the second-first side plate (for example, a fourth side portion 141-4 of 100-2).

The fourth side portion 141-4 of 100-1 of the first housing 140 of 100-1 and the fourth side portion 141-4 of 100-4 of the second housing 140 of 100-2) may be disposed to face each other.

The first sensing coil 180 of 100-1 and the second sensing coil 180 of 100-2 may be disposed between the first-third magnet 130-3 of 100-1 and the second-third magnet 130-3 of 100-2.

The camera module may comprise a second-first coil 230 of 100-1 being overlapped with the first magnet 130 of 100-1 in the optical axis direction, a second-second coil 230 of 100-2 being overlapped with the second magnet 130 of 100-2 in the optical axis direction, a first circuit board electrically connected to the first position sensor 170 of 100-1, and a second circuit board electrically connected to the second position sensor 170 of 100-2.

FIG. 20b shows yet another embodiment of the dual camera module 1000 of FIG. 18.

Referring to FIG. 20b, the first lens driving device 100-1 may be the lens driving device 100 according to the embodiment of FIG. 1, and the second lens driving device 100-2 may be a lens driving device according to the embodiment of FIG. 16.

In FIG. 20b, the sensing coil 180 of the first lens driving device 100-1 and the sensing magnet 180A of the second lens driving device 100-2 may be disposed adjacent to each other. Since the effect of magnetic field interference is not large between the sensing coil 180 and the sensing magnet 180A, the embodiment may prevent an AF operation error due to the magnetic field interference.

In another dual camera module according to another embodiment, the second lens driving device 100-2 may be substituted for the first lens driving device 100-1 in FIG. 20b, and at this time, sensing magnets of the first and second lens driving devices may be adjacent to each other, and may be disposed to face each other as illustrated in FIG. 19a.

Referring to FIGS. 20b, and 1 to 15c, the camera module 1000 may comprise a first camera module 100-1 and a second camera module 100-2.

The first camera module 100-1 may comprise a first bobbin 110 of 100-1, a first AF coil 120 of 100-1 disposed on the first bobbin 110 of 100-1, a first magnet 130 of 100-1 corresponding to the first AF coil 120 of 100-1, a first sensing coil 180 of 100-1 disposed on the first bobbin 110 of 100-1, and a first position sensor 170 corresponding to the first sensing coil 180 of 100-1.

The second camera module 100-2 may comprise a second bobbin 110 of 100-2, a second AF coil 120 of 100-2 disposed on the second bobbin 110 of 100-2, a second magnet 130 of 100-2 corresponding to the second AF coil 120 of 100-2, a sensing magnet 180A of 100-2 disposed on the second bobbin 110 of 100-2, and a second position sensor 170A corresponding to the sensing magnet 180A.

The first sensing coil 180 of 100-1 and the sensing magnet 180A may be disposed on side portions of the first bobbin 110 of 100-1 and the second bobbin 110 of 100-2 that face each other and are adjacent to each other.

Or, the camera module 1000 may comprise a first camera module 100-1 and a second camera module 100-2.

The first camera module 100-1 may comprise: a first cover 300 of 100-1; a first housing 140 of 100-1 disposed in the first cover 300 of 100-1; a first bobbin 110 of 100-1 disposed in the first housing 140 of 100-1; a first AF coil 120 of 100-1 disposed on the first bobbin 110 of 100-1; a first magnet 130 of 100-1 disposed in the first housing 140 of 100-1 and corresponding to the first AF coil 120 of 100-1; a first sensing coil 180 of 100-1 disposed on the first bobbin 110 of 100-1; a first base 210 of 100-1 disposed below the first housing 140 of 100-1; and a first position sensor 170 disposed on the first base 210 of 100-1 and corresponding to the first sensing coil 180 of 100-1.

The second camera module 100-2 may comprise: a second cover 300 of 100-2; a second housing 140 of 100-2 disposed in the second cover 300 of 100-2; a second bobbin 110 of 100-2 disposed in the second housing 140 of 100-2; a second AF coil 120 of 100-2 disposed on the second bobbin 110 of 100-2; a second magnet 130 of 100-2 disposed in the second housing 140 of 100-2 and corresponding to the second AF coil 120 of 100-2; a sensing magnet 180A of 100-2 disposed on the second bobbin 110 of 100-2; a second base 210 of 100-2 disposed below the second housing 140 of 100-2; and a second position sensor 170A disposed on the second base 210 of 100-2 and corresponding to the sensing magnet 180A.

The first sensing coil 180 of 100-1 and the first position sensor 170 of 100-1 may be overlapped with each other in the optical axis direction, and the sensing magnet 180A and the second position sensor 170 of 100-2 may be overlapped with each other in the optical axis direction.

The first cover 300 of 100-1 may comprise a first upper plate and the first-first side plate being extended from the first upper plate and adjacent to the second cover 300 of 100-2 and a first-second side plate positioned opposite the first-first side plate; and the second cover 300 of 100-2 may comprise a second upper plate and a second-first side plate being extended from the second upper plate and facing the first-first side plate and a second-second side plate positioned opposite to the second-first side plate.

The first sensing coil 180 of 100-1 is more adjacent to the first-first side plate than the first-second side plate, and the sensing magnet 180A may be more adjacent to the second-first side plate than the second-second side plate.

As for the disposement of the first-first to first-fourth side plates of the first cover 300 of 100-1 and the second-first to second-fourth side plates of the second cover 300 of 100-2, the first-first to first-third magnets 130-1 to 130-3 of 100-1; the disposement of the second-first to second-third magnets 130-1 to 130-3 of 100-2; and the disposement of the first and second dummy members 135a, 135b of 100-1, 100-2, the description of FIG. 20a may be applied or applied mutatis mutandis.

The first sensing coil 180 of 100-1 and the sensing magnet 180A may be disposed between the first-third magnet 130-3 of 100-1 and the second-third magnet 130-3 of 100-2.

Figure 20C:
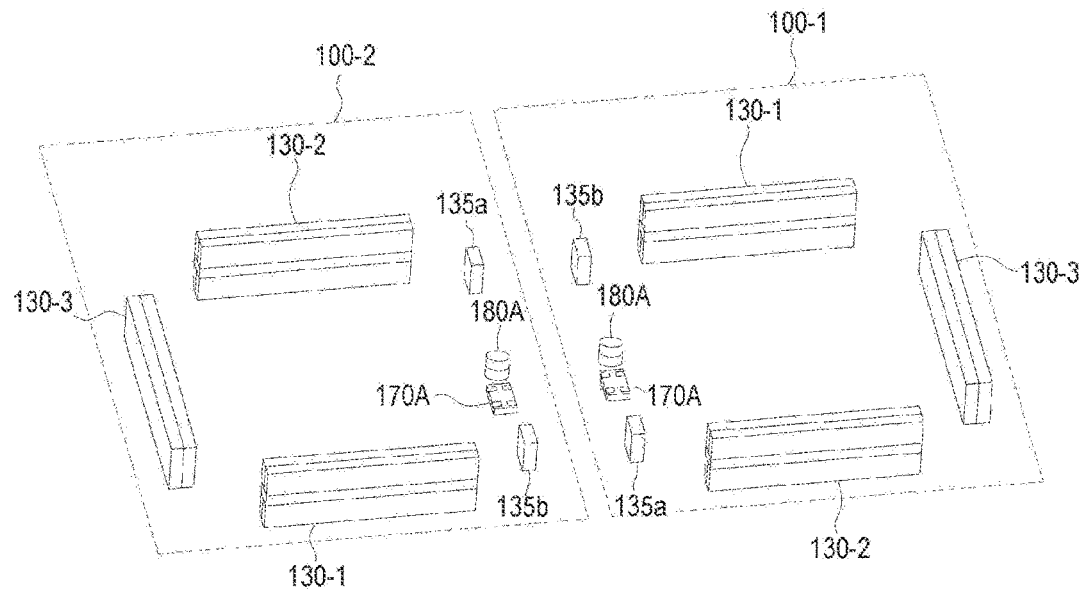
FIG. 20c shows yet another embodiment of the dual camera module of FIG. 18.

FIG. 20c shows yet another embodiment of the dual camera module 1000 of FIG. 18.

Referring to FIG. 20c, a first lens driving device 100-1 and a second lens driving device 100-2 may be lens driving devices according to the embodiment of FIG. 16.

In FIG. 20c, the sensing magnet 180A of the first lens driving device 100-1 and the sensing magnet 180A of the second lens driving device 100-2 may be disposed adjacent to each other.

As for the disposement of the first sensing magnet 180A of 100-1 and the second sensing magnet 180A of 100-2 in FIG. 20c, the disposement relationship of the first and second sensing coils in FIG. 20a may be applied or applied mutatis mutandis.

Figure 21:
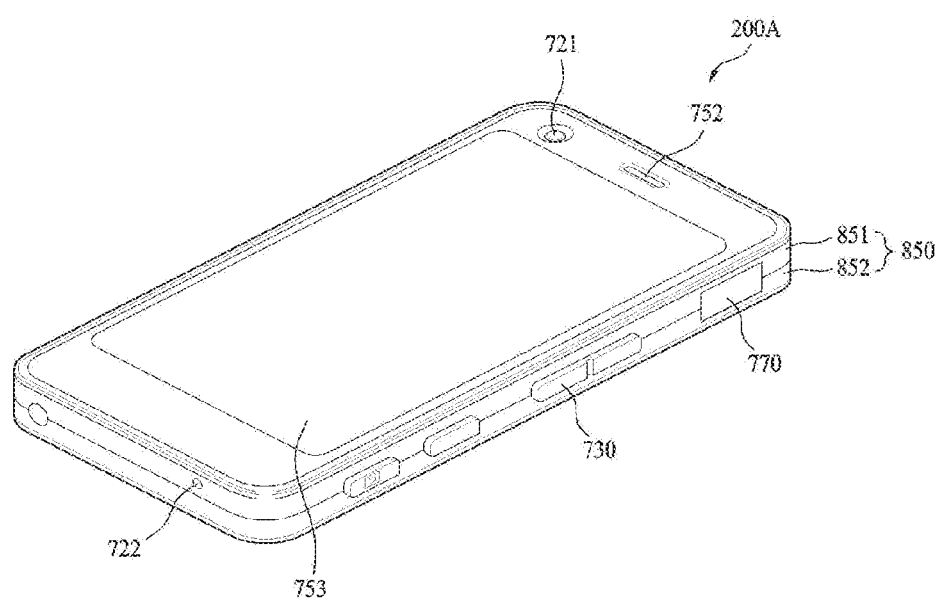
FIG. 21 is a perspective view of a portable terminal according to a first embodiment of the present invention.
Figure 22:
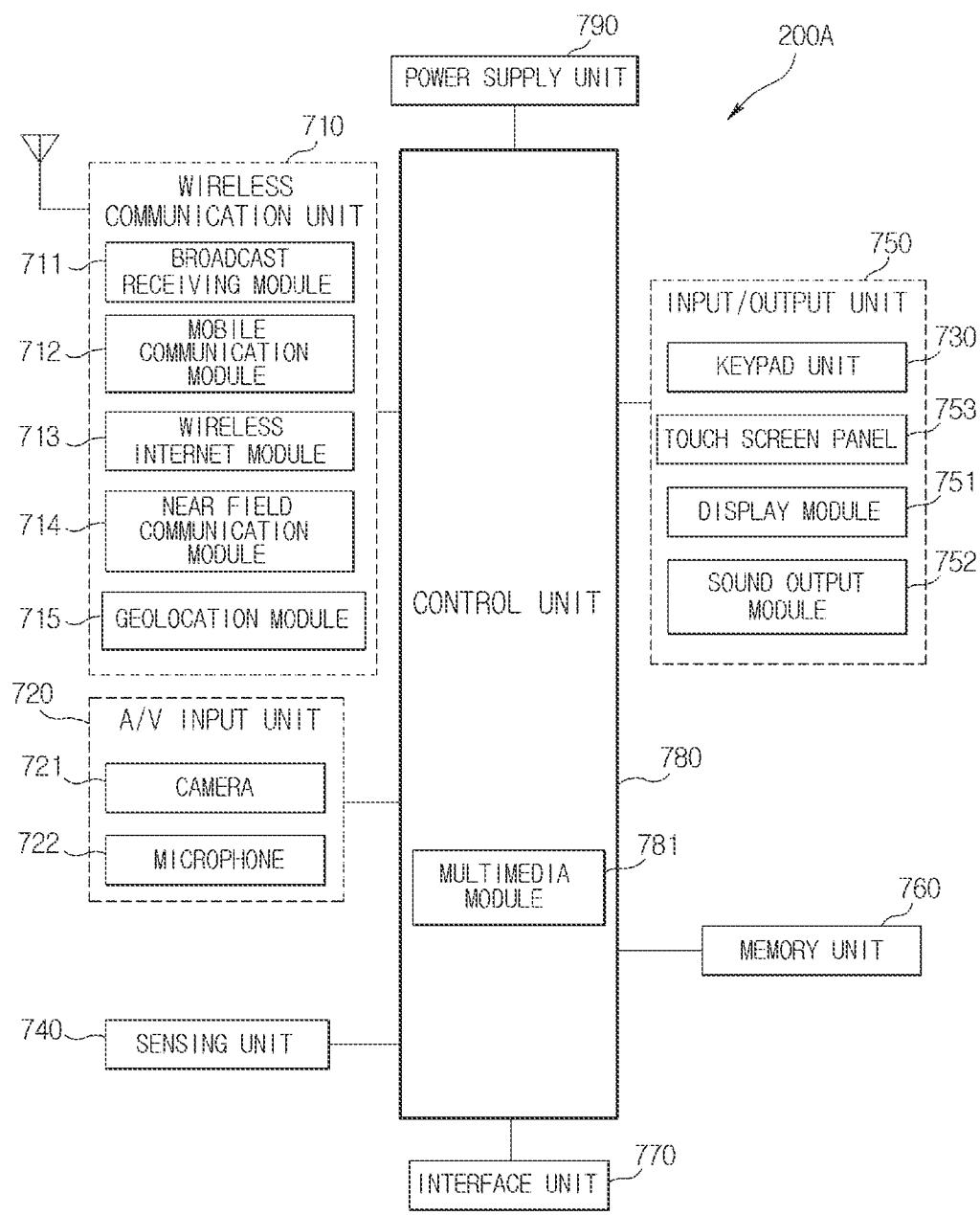
FIG. 22 is a block diagram of a portable terminal illustrated in FIG. 21.

FIG. 21 is a perspective view of a portable terminal 200A according to a first embodiment of the present invention, and FIG. 22 is a block diagram of a portable terminal 200A illustrated in FIG. 21.

Referring to FIGS. 21 and 22, the portable terminal 200A (hereinafter referred to as "terminal") may comprise a body 850, a wireless communication unit 710, an A/V input unit 720, a sensing unit 740, an input/output unit 750, a memory unit 760, an interface unit 770, a control unit 780, and a power supply unit 790.

The body 850 shown in FIG. 21 is in the form of a bar, but is not limited thereto, and may be of various structures, such as a slide type, a folder type, a swing type, a swivel type, in which two or more sub-bodies are coupled to be movable relative to each other.

The body 850 may comprise a case (casing, housing, cover, and the like) forming an outer appearance. For example, the body 850 may be divided into a front case 851 and a rear case 852. Various electronic components of the terminal may be embedded in a space formed between the front case 851 and the rear case 852.

The wireless communication unit 710 may be configured to comprise one or more modules enabling wireless communication between the terminal 200A and the wireless communication system, or between the terminal 200A and the network in which the terminal 200A is located. For example, the wireless communication unit 710 may be configured to comprise a broadcast receiving module 711, a mobile communication module 712, a wireless internet module 713, a near field communication module 714, and a geolocation module 715.

An audio/video (A/V) input unit 720 is for inputting an audio signal or a video signal, and may comprise a camera 721, a microphone 722, and the like.

The camera 721 may comprise the camera modules 200 and 1000 according to the embodiment illustrated in FIG. 17 or FIG. 18.

The sensing unit 740 may generate a sensing signal for controlling the operation of the terminal 200A by detecting the current state of the terminal 200A, such as the opening/closing state of the terminal 200A, the position of the terminal 200A, the presence or absence of user contact, the orientation of the terminal 200A, acceleration/deceleration of the terminal 200A, and the like. For example, when the terminal 200A is in the form of a slide phone, it is possible to sense whether the slide phone is opened or closed. In addition, it is responsible for sensing functions related to whether the power supply unit 790 is supplied with power, whether the interface unit 770 is coupled to an external device, and the like.

The input/output unit 750 is for generating input or output in relation to the sense of sight, hearing, or touch. The input/output unit 750 may generate input data for operation control of the terminal 200A, and in addition, may display information processed by the terminal 200A.

The input/output unit 750 may comprise a keypad unit 730, a display module 751, a sound output module 752, and a touch screen panel 753. The keypad unit 730 may generate input data in response to a keypad input.

The display module 751 may comprise a plurality of pixels whose color changes according to an electrical signal. For example, the display module 751 may comprise at least one among a liquid crystal display, a thin film transistor-liquid crystal display, an organic light-emitting diode, a flexible display, and a 3D display.

The sound output module 752 may output audio data received from the wireless communication unit 710 in a call signal reception, a call mode, a recording mode, a voice recognition mode, or a broadcast reception mode, and the like, or may output audio data stored in the memory unit 760.

The touch screen panel 753 may convert a change in capacitance generated due to a user's touch on a specific area of the touch screen into an electrical input signal.

The memory unit 760 may store a program for processing and control of the control unit 780, and input/output data (for example, phone book, message, audio, still image, photo, video, and the like) may be temporarily stored. For example, the memory unit 760 may store an image photographed by the camera 721, for example, a photo, or a video.

The interface unit 770 serves as a passage for connecting to an external device connected to the terminal 200A. The interface unit 770 receives data from an external device, receives power and transmits it to each component inside the terminal 200A, or transmits data inside the terminal 200A to an external device. For example, the interface unit 770 may comprise a wired/wireless headset port, an external charger port, a wired/wireless data port, a memory card port, a port for connecting a device having an identification module, and an audio input/output (I/O) port, video input/output (I/O) port, an earphone port, and the like.

The control unit 780 may control the overall operation of the terminal 200A. For example, the control unit 780 may perform related control and processing for voice call, data communication, video call, and the like.

The control unit 780 may comprise a multimedia module 781 for playing multimedia. The multimedia module 781 may be implemented in the control unit 780 or may be implemented separately from the control unit 780.

The control unit 780 may perform a pattern recognition process capable of recognizing a handwriting input or a drawing input performed on the touch screen as characters and images, respectively.

The power supply unit 790 may receive external power or internal power under the control of the control unit 780 to supply power required for operation of each component.

The lens driving device according to the first embodiment of the present invention may comprise the sensing structure of the second embodiment of the present invention. In more detail, the lens driving device according to the first embodiment of the present invention may comprise a sensing coil 2180 and a position sensor 2170 according to the second embodiment of the present invention. The lens driving device according to the first embodiment of the present invention may comprise a substrate 3600 and a lower elastic part material 3520 according to the third embodiment of the present invention.

Figure 23:
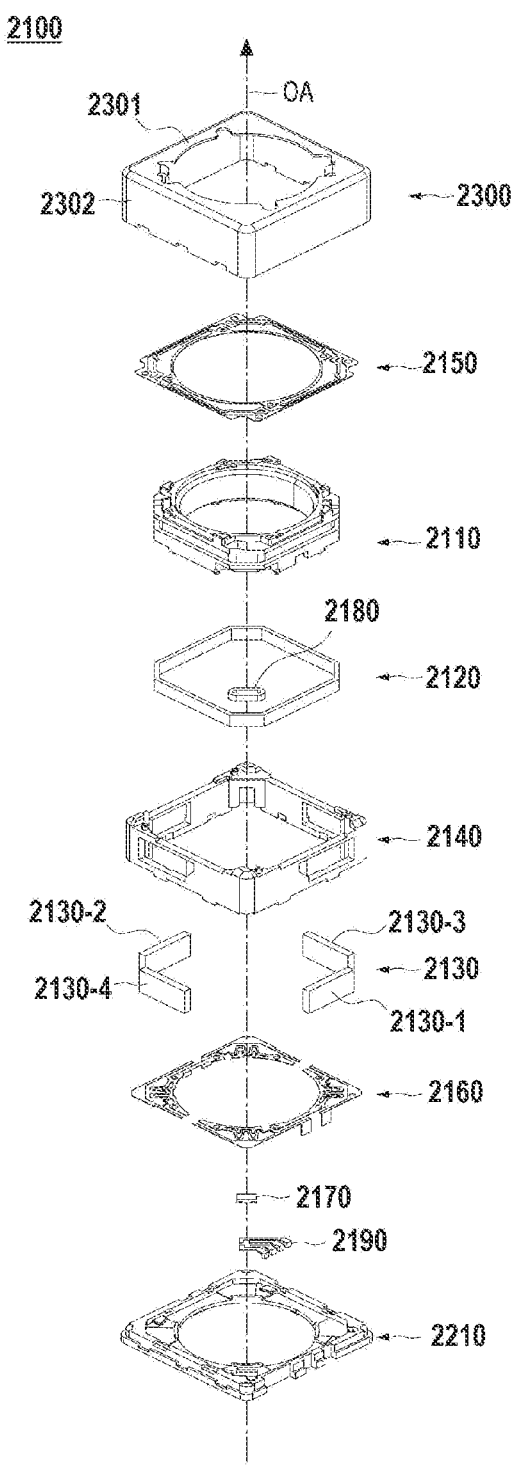
FIG. 23 is an exploded view of a lens driving device according to a second embodiment of the present invention.
Figure 24:
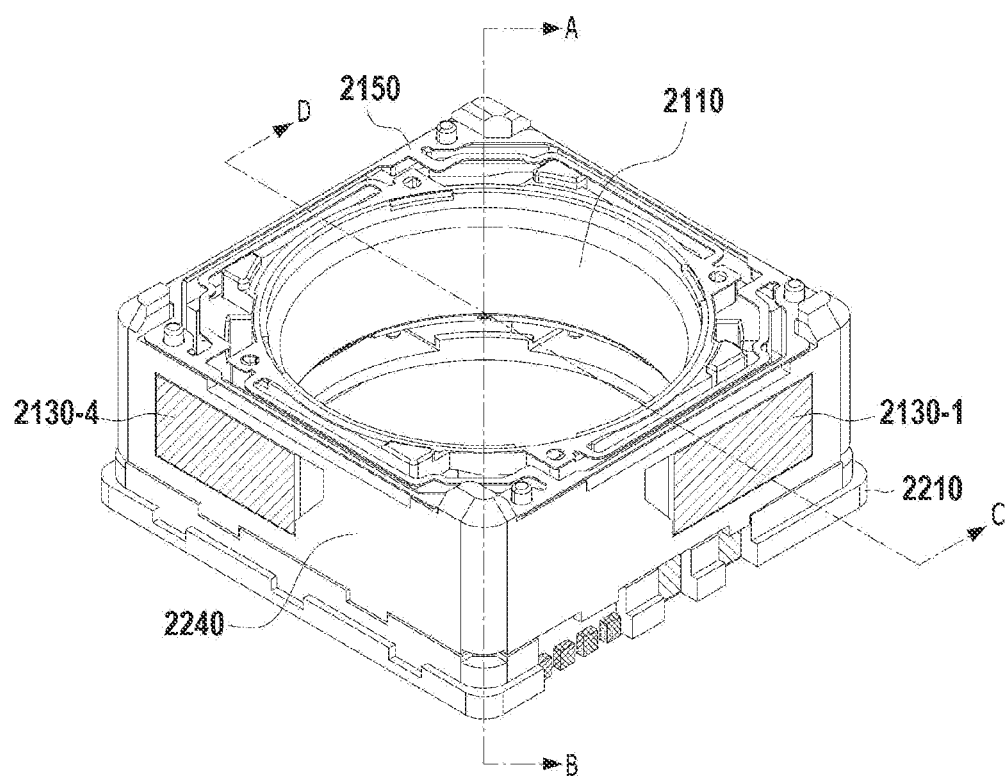
FIG. 24 is a perspective view of a lens driving device excluding the cover member.

FIG. 23 is an exploded view of a lens driving device 2100 according to a second embodiment of the present invention, and FIG. 24 is a perspective view of a lens driving device 2100 excluding the cover member 2300.

Referring to FIGS. 23 and 24, the lens driving device 2100 may comprise a bobbin 2110, a coil 2120, a sensing coil 2180, a magnet 2130, a housing 2140, and a position sensor 2170.

The lens driving device 2100 may further comprise a terminal part 2190 electrically connected to the position sensor 2170.

The lens driving device 2100 may further comprise at least one of an upper elastic member 2150, a lower elastic member 2160, and a base 2210.

In addition, the lens driving device 2100 may further comprise a balancing coil (not shown) for attenuating the weight of the sensing coil 2180 or the influence of a magnetic field.

In addition, the lens driving device 2100 may further comprise a cover or a cover member 2300.

Since the embodiment provides a magnetic field for detecting the position of an AF moving part using a sensing coil or a driving coil instead of a sensing magnet, interference between the sensing magnet and the magnetic field can be prevented.

First, the bobbin 2110 will be described.

The bobbin 2110 is disposed on the inner side of the housing 2140, and the coil 2120 and the magnet 2130 may move in the optical axis OA direction or a first direction (for example, the Z-axis direction) by electromagnetic interaction between the coil 2120 and the magnet 2130.

Figure 25A:
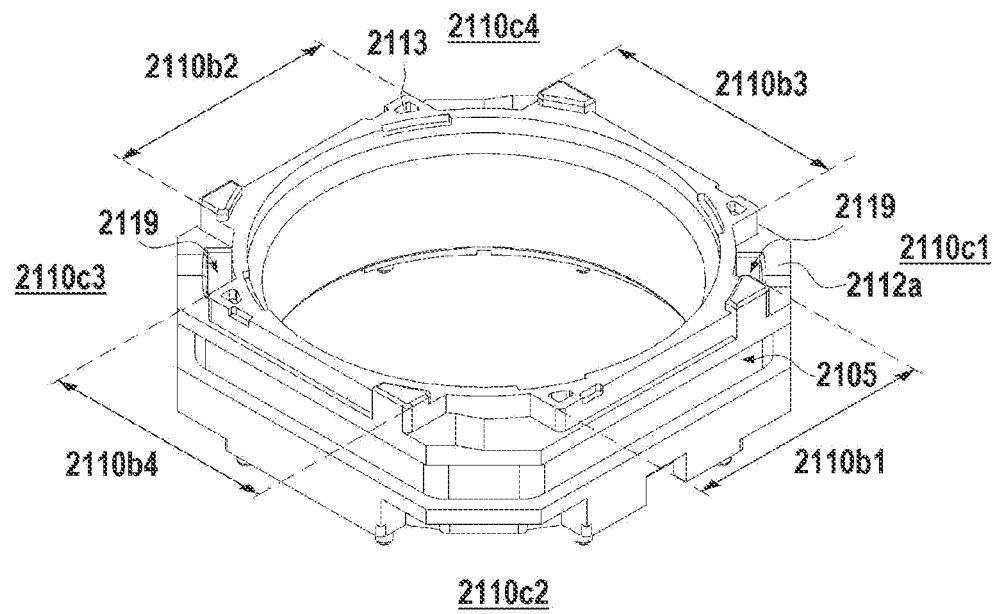
FIG. 25a is a first perspective view of a bobbin.
Figure 25B:
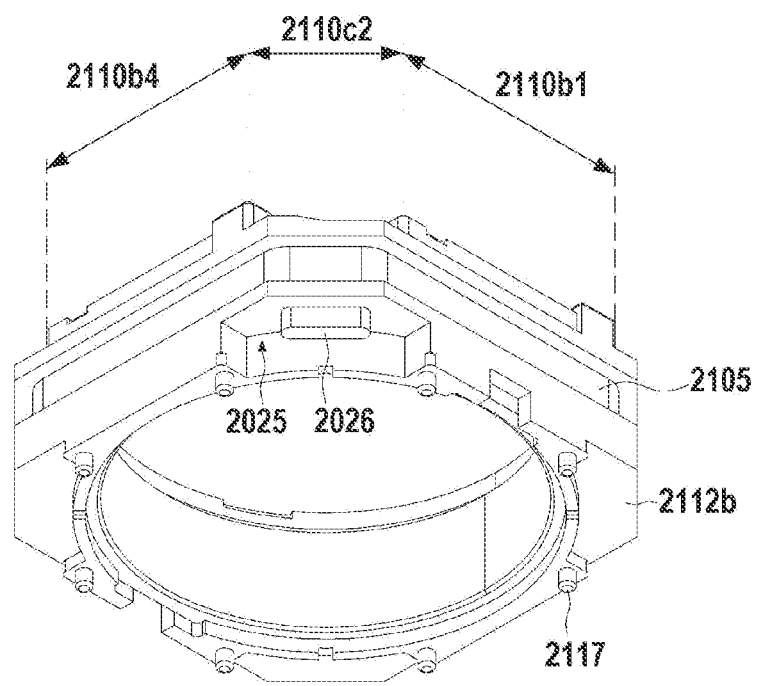
FIG. 25b is a second perspective view of a bobbin.
Figure 25C:
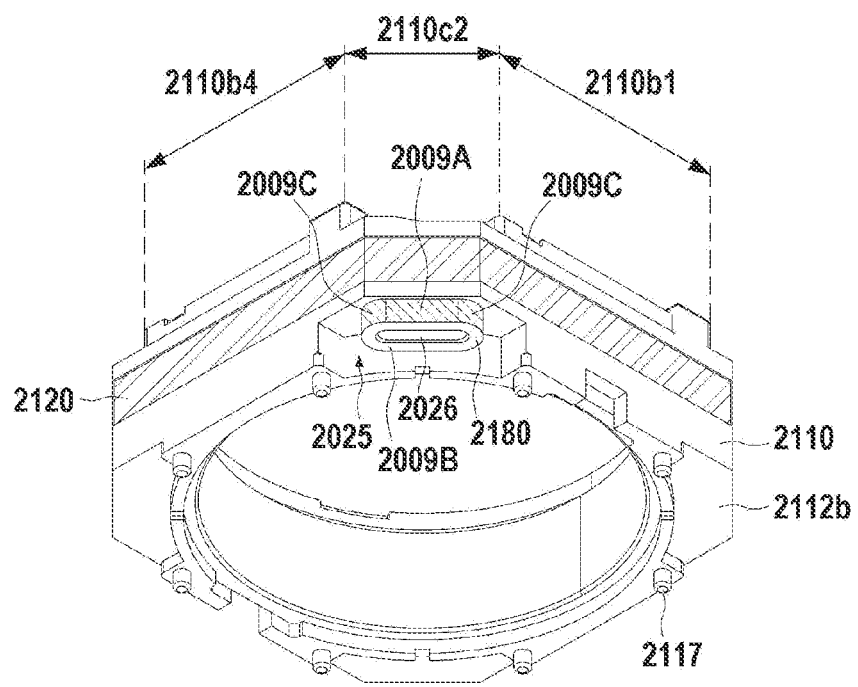
FIG. 25c is an assembled perspective view of the bobbin and the coil.

FIG. 25a is a first perspective view of a bobbin 2110, FIG. 25b is a second perspective view of a bobbin 2110, and FIG. 25c is an assembled perspective view of the bobbin 2110 and the coil 2120.

Referring to FIGS. 25a to 25c, the bobbin 2110 may have an opening or a hollow for mounting a lens or a lens barrel. For example, the opening of the bobbin 2110 may be in the form of a through hole penetrating the bobbin 2110, and the opening of the bobbin 2110 may have a circular shape, an elliptical shape, or a polygonal shape, but is not limited thereto. For example, the opening of the bobbin 2110 may be in the form of a hole penetrating through the bobbin 2110 in the optical axis direction.

A lens may be directly mounted to the opening of the bobbin 2110, but it is not limited thereto, and in another embodiment, a lens barrel to which at least one lens is mounted or coupled may be coupled or mounted to the opening of the bobbin 2110. The lens or the lens barrel may be coupled to an inner circumferential surface of the bobbin 2110 in various ways. For example, a screw thread for coupling with a lens or a lens module may be formed on an inner side surface of the bobbin 2110, but in another embodiment, the screw thread may not be formed.

The bobbin 2110 may comprise a plurality of side portions 2110b1 to 2110b4 and 2110c1 to 2110c4 spaced apart from one another, and the plurality of side portions 2110b1 to 2110b4 and 2110c1 to 2110c4 may be connected to one another.

For example, the bobbin 2110 may comprise side portions 2110b1 to 2110b4 corresponding to the side portions 2141-1 to 2141-4 of the housing 2140 and corner portions 2110c1 to 2110c4 (or corners) corresponding to the corner portions 2142-1 to 2142-4 of the housing 2140.

At least one seating groove 2105 in which the coil 2120 is disposed, mounted, or seated may be provided on the outer side surface of the bobbin 2110.

For example, the seating groove 2105 may be formed on outer side surfaces of the side portions 2110b1 to 2110b4 and 2110c1 to 2110c4 of the bobbin 2110. The seating groove 2105 may have a structure recessed from the outer side surfaces of the side portions 2110b1 to 2110b4 and 2110c1 to 2110c4 of the bobbin 2110, and may have a shape matching the shape of the coil 2120.

For example, the coil 2120 may be directly wound or wound around the groove 2105 of the bobbin 2110 to rotate clockwise or counterclockwise with respect to the optical axis OA.

The shape and number of grooves 2105 of the bobbin 2110 may correspond to the shape and number of coils disposed on an outer side surface of the bobbin 2110. In another embodiment, the bobbin 2110 may not have a groove for seating the coil, and the coil 2120 may be directly wound on an outer side surface of the bobbin 2110 without a groove or may be wound and fixed.

A groove 2106 for passing a line of sight (for example, one end) or a vertical line (for example, the other end) of the coil 2120 may be formed at a lower end of the outer side surface of the bobbin 2110.

A first escape groove 2122a for avoiding spatial interference with the first frame connection part 2153 of the upper elastic member 2150 may be provided on an upper surface of the bobbin 2110, and a second escape groove 2122b for avoiding spatial interference with the second frame connection part 2163 of the lower elastic member 2150 may be provided on a lower surface of the bobbin 2110. For example, the first and second escape grooves 2122a and 122b may be formed in a corner portion of the bobbin 2110, but it is not limited thereto, and in another embodiment, the first and second escape grooves 2122a and 122b may be formed in a side portion of the bobbin 2110.

Although not illustrated in FIGS. 25a to 25c, the bobbin 2110 may comprise a first stopper being protruded from an upper surface and a second stopper being protruded from a lower surface. When the bobbin 2110 moves in a first direction for the auto-focusing function, the first and second stoppers of the bobbin 2110 may prevent the upper surface of the bobbin 2110 from directly colliding with the inner side of the upper plate of the cover member 2300 even if the bobbin 2110 moves beyond the prescribed range due to external impact, and the like, and may prevent the lower surface of the bobbin 2110 from directly colliding with the base 2210.

A first coupling part 2113 for coupling and fixing to the upper elastic member 2150 may be provided on an upper surface, an upper portion, or an upper end of the bobbin 2110; and a second coupling part 2117 for coupling and fixing to the lower elastic member 2160 may be provided on a lower surface of the bobbin 2110.

For example, in FIGS. 25a to 25c, the first coupling part 2113 of the bobbin 2110 has a groove shape, and the second coupling part 2117 may have a protrusion shape, but is not limited thereto, and in another embodiment, each of the first and second coupling parts of the bobbin 2110 may have a groove, a flat surface, or a protrusion shape.

A screw thread for coupling with a lens or a lens barrel may be provided on an inner circumferential surface of the bobbin 2110. In a state in which the bobbin 2110 is fixed by a jig or the like, a screw line can be formed on an inner circumferential surface of the bobbin 2110, and a groove 2119 for fixing a jig may be provided on an upper surface of the bobbin 2110.

The bobbin 2110 may comprise a groove portion 2025 into which the sensing coil 2180 is seated, disposed, or inserted.

The groove portion 2025 may be formed on a lower portion, a lower surface, or a lower end of the bobbin 2110.

The groove portion 2025 may be recessed from a lower surface of the bobbin 2110. For example, the groove portion 2025 may be formed in any one of the corner portions of the bobbin 2110.

For example, the groove portion 2025 may be formed at a lower portion the second corner portion 2110c2 of the bobbin 2110. The groove portion 2025 may comprise at least one opening. For example, the groove portion 2025 may comprise a first opening opened toward the base 2210. In addition, the groove portion 2025 may comprise at least one second opening that is open toward an outer side surface of the bobbin 2110.

In addition, the bobbin 2110 may comprise at least one protrusion 2026 to be coupled to the sensing coil 2180.

For example, the protrusion 2026 may be disposed in the groove portion 2025. For example, the protrusion 2026 may be protruded downward from an upper surface of the groove portion 2025 or in a direction toward the position sensor 2170 (or the base 2210).

For mounting the balancing coil, the bobbin 2110 may further comprise a separate groove portion positioned at an opposite side of the groove portion 2025.

Next, the coil 2120 will be described.

The coil 2120 may be disposed on the bobbin 2110, coupled to or connected to the bobbin 2110, or supported by the bobbin 2110.

For example, the coil 2120 may be disposed on an outer side surface of the bobbin 2110.

The coil 2120 may be disposed to surround the outer side surface of the bobbin 2110 to rotate clockwise or counterclockwise centered about the optical axis. For example, the coil 2120 may be disposed or wound in the groove 2105 provided on the outer side surface of the bobbin 2110.

For example, the coil 2120 may have a closed curve or a ring shape having a central hole.

In another embodiment, the coil 2120 may be implemented in the form of a coil ring wound in a clockwise or counterclockwise direction about an axis perpendicular to the optical axis, and the number of coil rings may be the same as the number of magnets 2130, but is not limited thereto.

The coil 2120 electromagnetically interact with the magnet 2130 disposed in the housing 2140. In order to generate electromagnetic force by interaction with the magnet 2130, power may be provided or a driving signal may be applied to the coil 2120.

The power or driving signal provided to the coil 2120 may be a DC signal or an AC signal, or may comprise a DC signal and an AC signal, and may be in the form of voltage or current.

When a driving signal (for example, driving current) is supplied to the coil 2120, an electromagnetic force may be formed through electromagnetic interaction between the coil 2120 and the magnet 2130, and the bobbin 2110 supported by the upper and lower elastic members 2150 and 2160 may be moved in the optical axis OA direction by the generated electromagnetic force.

As the driving signal being provided to the coil 2120 is controlled, the movement of the bobbin 2110 in a first direction may be controlled, and thus the auto-focusing function may be performed.

At the initial position of the AF moving part, the bobbin 2110 may be moved in the upper or lower direction (for example, the Z-axis direction), and this is called bidirectional driving of the AF moving part. Or, at the initial position of the AF moving part, the bobbin 2110 may be moved in an upward direction, and this is called unidirectional driving of the AF moving part.

The AF moving part may comprise a bobbin 2110 and components coupled to the bobbin 2110. For example, the AF moving part may comprise a bobbin 2110, a coil 2120, and a sensing coil 2180. In addition, the AF moving part may further comprise a lens being mounted on the bobbin 2110.

And the initial position of the AF moving part is the initial position of the AF moving part in the state that power is not applied to the coil 2120, or it may be a position at which the AF moving part is placed as the upper and lower elastic members 2150 and are elastically deformed only by the weight of the AF moving part.

In addition to this, the initial position of the bobbin 2110 may be a position at which the AF moving part is placed when gravity acts in the direction from the bobbin 2110 to the base 2210, or conversely, when gravity acts in the direction from the base 2210 toward the bobbin 2110.

At the initial position of the AF moving part, the coil 2120 may be perpendicular to the optical axis, and may face or overlap with the magnet 2130 in a direction from the optical axis toward the coil 2120.

The coil 2120 may be electrically connected to at least one of the upper or lower elastic members 2150 and 2160. A driving signal may be applied to the coil 2120 through at least one of the upper or lower elastic members 2150 and 2160. For example, a driving signal may be provided to the coil 2120 through the two elastic members 2160-1 and 2160-2 of the lower elastic member 2160.

The sensing coil 2180 may be spaced apart from the coil 2120 and disposed below the coil 2120.

The sensing coil 2180 may be overlapped with a portion of the coil 2120 in the optical axis direction. In another embodiment, the sensing coil 2180 may not be overlapped with the coil 2120 in the optical axis direction.

In addition, the embodiment may comprise a balancing coil (not shown) disposed on the bobbin 2110A to be positioned on the opposite side of the sensing coil 2180 to balance the weight with the sensing coil 2180. The balancing sensing coil may be for offsetting the magnetic field effect of the sensing coil 2180 and balancing weight with the sensing coil 2180, and due to this, an accurate AF operation may be performed.

For example, the balancing coil may have the same weight as the sensing coil 2180 and both may have the same shape, but is not limited thereto, and in other embodiments, both may have different shapes.

In addition, for example, the sensing coil 2180 may be disposed on any one side portion and/or corner portion of the bobbin 2110. The sensing coil 2180 may be disposed in the groove portion 2025 of the bobbin 2110, and may be coupled to the protrusion 2026 or wound around the protrusion 2026.

The sensing coil 2180 may provide a magnetic field for the position sensor 2170 for detection, and in order to generate such a magnetic field, a driving signal or power may be provided to the sensing coil 2180. The driving signal provided to the sensing coil 2180 may comprise at least one of a direct current signal and an alternating current signal. In addition, the driving signal may be in the form of current or voltage.

The sensing coil 2180 may comprise at least one of a circular shape, an elliptical shape, and a closed curve shape. For example, the sensing coil 2180 may be in the form of a coil ring wound around an optical axis or an axis parallel to the optical axis.

For example, the sensing coil 2180 may have a ring shape comprising a central hole, and the central hole may be parallel to the optical axis. Or, the central hole of the sensing coil 2180 may face the groove portion 2025 (or the protrusion 2026) of the bobbin 2110, and may be coupled to the protrusion 2026.

For example, the diameter (for example, maximum diameter) of the central hole of the sensing coil 2180 may be smaller than the diameter (for example, minimum diameter) of the ring of the coil 2120.

For example, the sensing coil 2180 may comprise a first portion 2009A, a second portion 2009B disposed below the first portion 2009A, and a third portion 2009C connecting the first portion 2009A and the second portion 2009B.

The third part 2009C of the sensing coil 2180 may comprise a first connection portion connecting one end of the first portion 2009A and one end of the second portion 2009B to each other and a second connection portion connecting the other end of the first portion and the other end of the second portion.

For example, each of the first portion 2009A and the second portion 2009B of the sensing coil 2180 may have a "straight line shape, and the third portion 2009C of the sensing coil 2180 may have a curved shape or a bent shape.

Due to the interaction between the coil 2120 and the magnet 2130, the sensing coil 2180 may move together with the bobbin 2110 in the optical axis OA direction, the position sensor 2170 may detect the strength of the magnetic field of the sensing coil 2180 moving in the optical axis direction, and an output signal according to the sensed result may be outputted.

For example, the strength or magnetic force of the magnetic field of the sensing coil 2180 detected by the position sensor 2170 may be changed according to the displacement of the bobbin 2110 in the optical axis direction, the position sensor 2170 may output an output signal proportional to the strength of the detected magnetic field, and a displacement of the bobbin 2110 in the optical axis direction may be detected using an output signal of the position sensor 2170.

For example, the control unit 2410 of the camera module or the control unit 2780 of the terminal may detect the displacement of the bobbin 2110A in the optical axis direction based on the output signal outputted from the position sensor 2170.

At least a portion of the sensing coil 2180 disposed in the groove portion 2025 of the bobbin 2110 may be exposed from the bobbin 2110 through the first and second openings of the bobbin 2110A.

For example, at least a portion of the lower portion or lower surface of the sensing coil 2180 may be exposed from the bobbin 2110, and may face or overlap with the position sensor 2170 in the optical axis direction.

For example, at least one of the first portion 2009A and the second portion 2009B of the sensing coil 2180 may be overlapped with the position sensor 2170 in the optical axis direction. Or, at least a portion of the central hole of the sensing coil 2180 may be overlapped with the position sensor 2170 in the optical axis direction.

Next, the housing 2140 will be described.

The housing 2140 accommodates at least a portion of the bobbin 2110 on the inner side, and supports the magnet 2130.

Figure 26A:
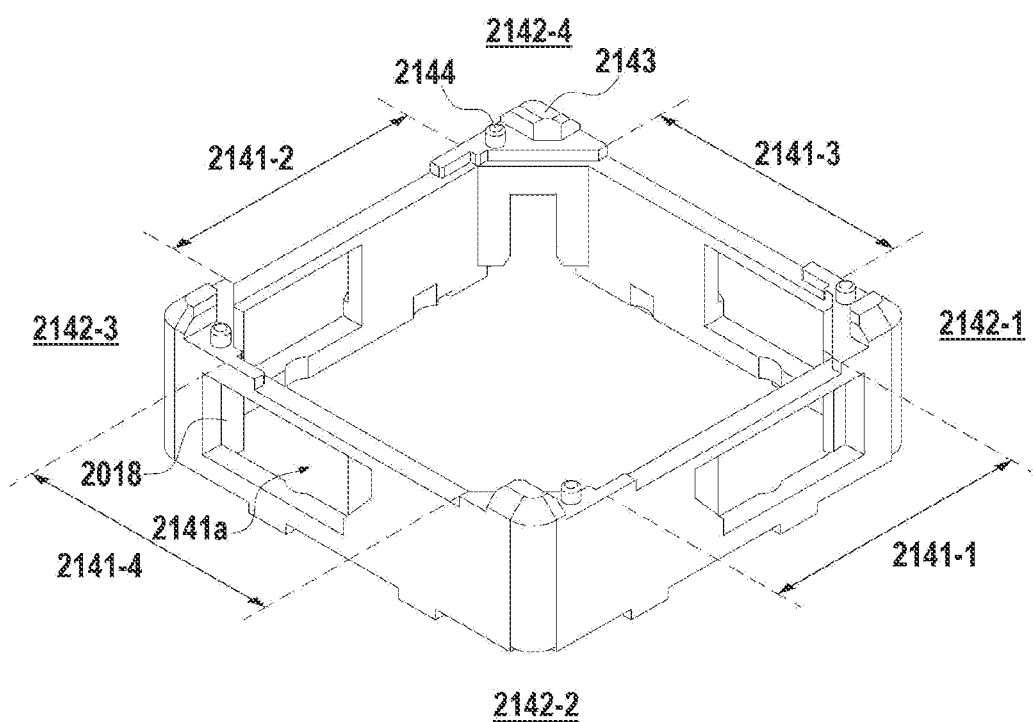
FIG. 26a is a perspective view of a housing.
Figure 26B:
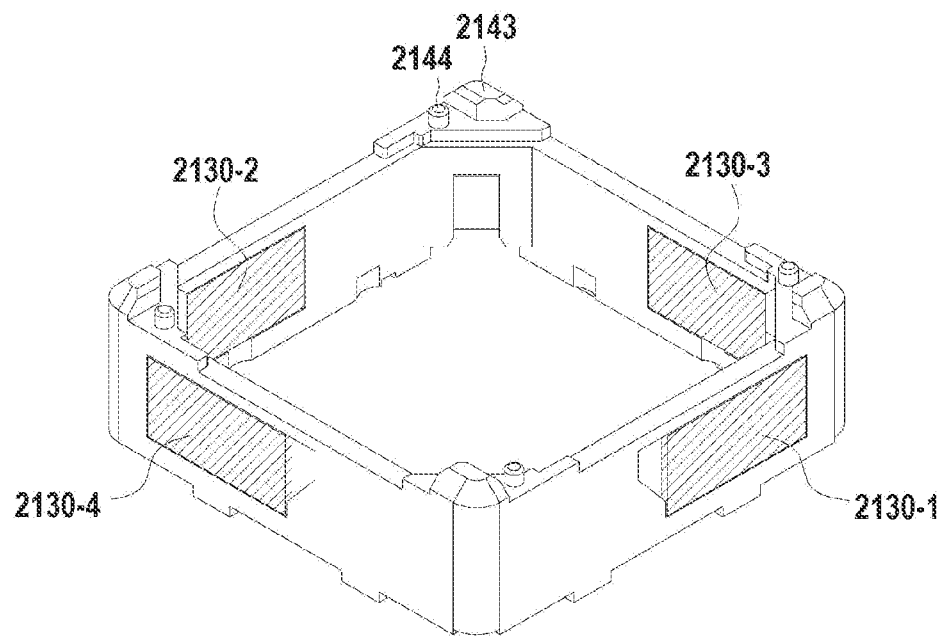
FIG. 26b is a first perspective view of a housing and a magnet.
Figure 26C:
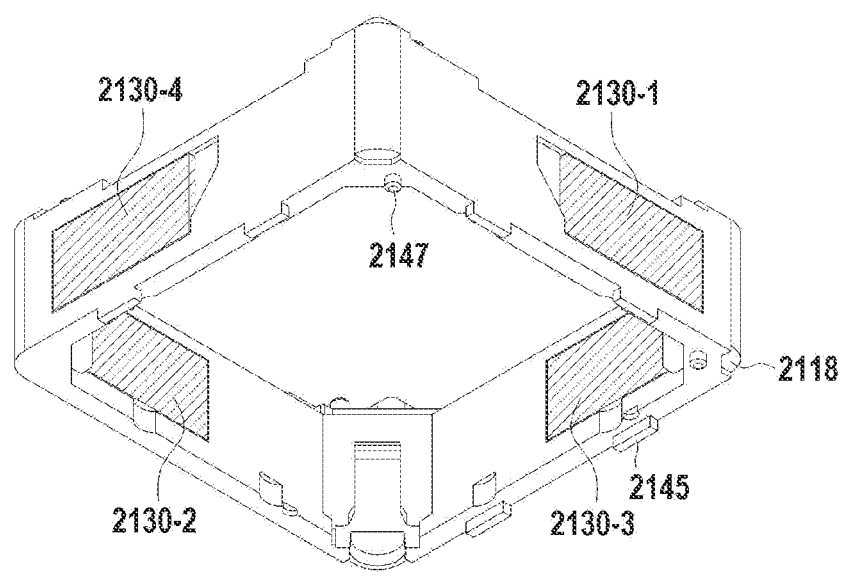
FIG. 26c is a second perspective view of a housing and a magnet.

FIG. 26a is a perspective view of a housing 2140, FIG. 26b is a first perspective view of a housing 2140 and a magnet 2130, and FIG. 26c is a second perspective view of a housing 2140 and a magnet 2130.

Referring to FIGS. 26a to 26c, the housing 2140 may be disposed on an inner side of the cover member 2300, and may be disposed between the cover member 2300 and the bobbin 2110. The housing 2140 may accommodate the bobbin 2110 on an inner side. The outer side surface of the housing 2140 may be spaced apart from the inner surface of the side plate 2302 of the cover member 2300, but is not limited thereto, and in other embodiments, both may be in contact with each other.

The housing 2140 may have an opening or a hollow column shape comprising a hollow.

For example, the housing 2140 may have a polygonal (for example, square, or octagonal) or circular opening, and the opening of the housing 2140 may be in the form of a through hole penetrating through the housing 2140 in the optical axis direction.

The housing 2140 may comprise a plurality of side portions 2141-1 to 2141-4 and a plurality of corner portions 2142-1 to 2142-4. Here, "side portions" may be expressed by replacing "first side portions", and corner portions may be expressed by replacing "second side portions". In addition, corner portions may be expressed by replacing it with "column portions".

For example, the housing 2140 may comprise first to fourth side portions 2141-1 to 2141-4 and first to fourth corner portions 2142-1 to 2142-4.

For example, the side portions 2141-1 to 2141-4 of the housing 2140 may be a portion corresponding to the sides of the housing 2140, and the corner portions 2142-1 to 2142-4 of the housing 2140 may be portions corresponding to the corners of the housing 2140.

For example, the inner side surface of each of the corner portions 2142-1 to 2142-4 of the housing 2140 may be flat, chamfered, or curved.

The first to fourth side portions 2141-1 to 2141-4 may be spaced apart from each other. Each of the corner portions 2142-1 to 2142-4 of the housing 2140 can be placed or located between two adjacent side portions 2141-1 and 2141-3, 2141-1 and 2141-4, 2141-4 and 2141-2, and 2141-2 and 2141-3, and may connect the side portions 2141-1 to 2141-4 to one another.

For example, the corner portions 2142-1 to 2142-4 may be located at a corner or an edge of the housing 2140. For example, the number of side portions of the housing 2140 is four, and the number of corner portions is four, but is not limited thereto.

Each of the side portions 2141-1 to 2141-4 of the housing 2140 may be disposed parallel to a corresponding one of the side plates of the cover member 2300.

A horizontal length of each of the side portions 2141-1 to 2141-4 of the housing 2140 may be greater than a horizontal length of each of the corner portions 2142-1 to 2142-4, but is not limited thereto.

The first side portion 2141-1 and the second side portion 2141-2 of the housing 2140 may be located opposite to each other, and the third side portion 2141-3 and the fourth side portion 2141-4 may be located opposite to each other. Each of the third side portion 2141-3 and the fourth side portion 2141-4 of the housing 2140 may be positioned between the first side portion 2141-1 and the second side portion 2141-2.

In order to prevent a direct collision of the upper plate 2301 with the inner side surface of the cover member 2300, a stopper 2143 may be provided on an upper portion, an upper end, or an upper surface of the housing 2140.

For example, a stopper 2143 may be provided on an upper surface (for example, first surface 251a) of each of the corner portions 2142-1 to 2142-1 of the housing 2140, but is not limited thereto.

For example, in order to prevent the lower surface of the housing 2140 from colliding with the base 2210, the housing 2140 may further comprise a stopper (not shown) being protruded from the lower surface.

At least one first coupling part 2144 coupled to a first outer side frame 2152 of the upper elastic member 2150 may be provided on an upper portion, an upper end, or an upper surface of the housing 2140. In addition, at least one second coupling part 2147 coupled to and fixed to a second outer side frame 2162 of the lower elastic member 2160 may be provided on a lower portion, a lower end, or a lower surface of the housing 2140.

In FIGS. 26a to 26c, each of the first coupling part 2144 and the second coupling part 2147 of the housing 2140 may have a protrusion shape, but is not limited thereto, and in another embodiment, each of the first and second coupling parts of the housing 2140 may be any one of a flat surface, a groove, or a protrusion.

The hole 2152a of the first coupling part 2144 of the housing 2140 and the first outer side frame 2152 of the upper elastic member 2150 may be coupled to each other using heat fusion or an adhesive, and the second coupling part 2147 of the housing 2140 and the hole 2162a of the second outer side frame 2162 of the lower elastic member 2160 may be coupled to each other.

At least one of the side portions 2141-1 to 2141-4 of the housing 2140 may be provided with a seating portion 2141a in which a magnet 2130 may be disposed or installed.

The seating portion 2141a in FIG. 26a may be in the form of an opening or a through hole penetrating the side portions 2141-1 to 2141-4 of the housing 2140, but is not limited thereto, and in another embodiment, it may be in the form of a groove or concave groove.

The housing 2140 may comprise a support portion 2018 adjacent the seating portion 2141a to support the edge of the first surface of the magnet 2130 facing the coil 2120.

The support portion 2018 may be located adjacent to an inner side surface of the housing 2140, and may have a shape being protruded in a horizontal direction with respect to the side surface of the seating portion 2141a. In addition, for example, the support portion 2018 may comprise a tapered portion or an inclined surface. In another embodiment, the housing 2140 may not comprise the support portion 2018.

For example, the magnet 2130 may be attached or fixed to the seating portion 2141a by means of an adhesive.

For example, a first groove 2118 may be provided in a lower portion, a lower surface, or a lower end of the corner portions of the housing 2140, and first grooves 2218 corresponding to the first grooves 2118 of the housing 2140 may be provided at corners of the upper surface of the base 2210. An adhesive (not shown) such as silicone or epoxy may be disposed between the first groove 2118 of the housing 2140 and the second groove 2218 of the base 2210, and accordingly, the housing 2140 and the base 2210 may be coupled to each other.

In another embodiment, a protruding part being protruded from an upper surface of the base 2210 may be provided instead of the second groove 2218 of the base 2210.

Next, the magnet 2130 will be described.

The magnet 2130 may be disposed in the housing 2140. For example, the magnet 2130 may be disposed between the bobbin 2110 and the housing 2140.

The magnet 2130 may comprise a plurality of magnets or magnet units 2130-1 to 2130-4.

For example, the magnet 2130 may comprise the first to fourth magnets 2130-1 to 2130-4, but is not limited thereto. In another embodiment, the number of magnet units may be two or more, for example, the magnet may comprise two magnet units disposed on two side portions positioned opposite to each other of the housing 2140.

The magnet units 2130-1 to 2130-4 may be disposed on the side portions 2141-1 to 2141-4 of the housing 2140.

For example, each of the first to fourth magnet units 2130-1 to 2130-4 may be disposed in any one of the corresponding seating portion 2141a among the first to fourth side portions 2141-1 to 2141-4 of the housing 2140.

The first magnet unit 2130-1 and the third magnet unit 2130-3 may be located adjacent to the first corner portion 2142-1 of the housing 2140, and the second magnet unit 2130-2 and the fourth magnet unit 2130-4 may be positioned adjacent to the third corner portion 2142-3 facing the first corner portion 2142-1 in a diagonal direction.

For example, a portion of the first magnet unit 2130-1 and a portion of the third magnet unit 2130-3 may be disposed to be extended to the first corner portion 2141-1 of the housing 2140, and a portion of the second magnet 2130-2 and a portion of the fourth magnet 2130-4 may be disposed to be extended to the third corner portion 2141-3 of the housing 2140.

For example, the first magnet unit 2130-1 may be disposed more adjacent to the first corner portion 2142-1 than the second corner portion 2142-2, the second magnet unit 2130-2 may be disposed more adjacent to the third corner portion 2142-3 than the fourth corner portion 2142-4, the third magnet unit 2130-3 may be disposed more adjacent to the first corner portion 2142-1 than the fourth corner portion 2142-4, and the fourth magnet unit 2130-4 may be more adjacent to the third corner portion 2142-3 than the second corner portion 2142-2.

In another embodiment, each of the magnet units may be disposed to be positioned at the same distance from both side corner portions of the housing 2140.

At the initial position of the AF moving part (for example, the bobbin 2110), the magnet 2130 may be disposed in the side portions 2141-1 to 2141-4 of the housing 2140 to correspond to or to face the coil 2120.

Each of the magnet units 2130-1 to 2130-4 may have a shape corresponding to an outer side surface of the side portions 2141-1 to 2141-4 of the housing 2140, for example, as a whole polyhedron (for example, a rectangular parallelepiped) shape, but is not limited thereto.

Each of the magnet units 2130-1 to 2130-4 may be a single-pole magnetized magnet or a two-pole magnet having two different polarities and a boundary surface naturally formed between the different polarities.

For example, each of the magnet units 2130-1 to 2130-4 is a single-pole magnetized magnet disposed in a way that a first surface facing the coil 2120 is an N pole, and a second surface opposite to the first surface is an S pole, but is not limited thereto, and the N pole and the S pole may be switched.

In another embodiment, in order to improve electromagnetic force, each of the magnet units 2130-1 to 2130-4 may be a 4-pole magnet comprising two N poles and two S poles or a bipolar magnetized magnet. At this time, each of the magnet units 2130-1 to 2130-4 may be implemented with ferrite, alnico, a rare earth magnet, or the like, but is not limited thereto.

When the magnet units 2130-1 to 2130-4 are bipolar magnetized, each of the magnet units 2130-1 to 2130-4 may comprise a first magnet part, a second magnet part, and a partition wall disposed between the first magnet part and the second magnet part.

The first magnet part may comprise an N pole, an S pole, and a first boundary surface between the N pole and the S pole. At this time, the first boundary surface may comprise a section having little polarity as a portion having substantially no magnetism, and it may be a naturally occurring part to form a magnet consisting of one N pole and one S pole.

The second magnet part may comprise an N pole, an S pole, and a second boundary surface between the N pole and the S pole. At this time, the second boundary surface may comprise a section having little polarity as a portion having substantially no magnetism, and it may be a naturally occurring part to form a magnet consisting of one N pole and one S pole.

The partition wall separates or isolates the first magnet part and the second magnet part, and is a part that does not substantially have magnetism and may be a part having little polarity. For example, the partition wall may be a non-magnetic material, air, or the like. For example, the partition wall may be expressed as a "neutral zone" or a "neutral region".

The partition wall is a part artificially formed when the first and second magnet parts are magnetized, and the width of the partition wall may be greater than the width of each of the first boundary surface and the second boundary surface. Here, the width of the partition wall may be the length of the partition wall in a direction directing from the first magnet part toward the second magnet part.

Next, the upper elastic member 2150, the lower elastic member 2160, the base 2210, the position sensor 2170, and the terminal 2180 will be described.

Figure 27:
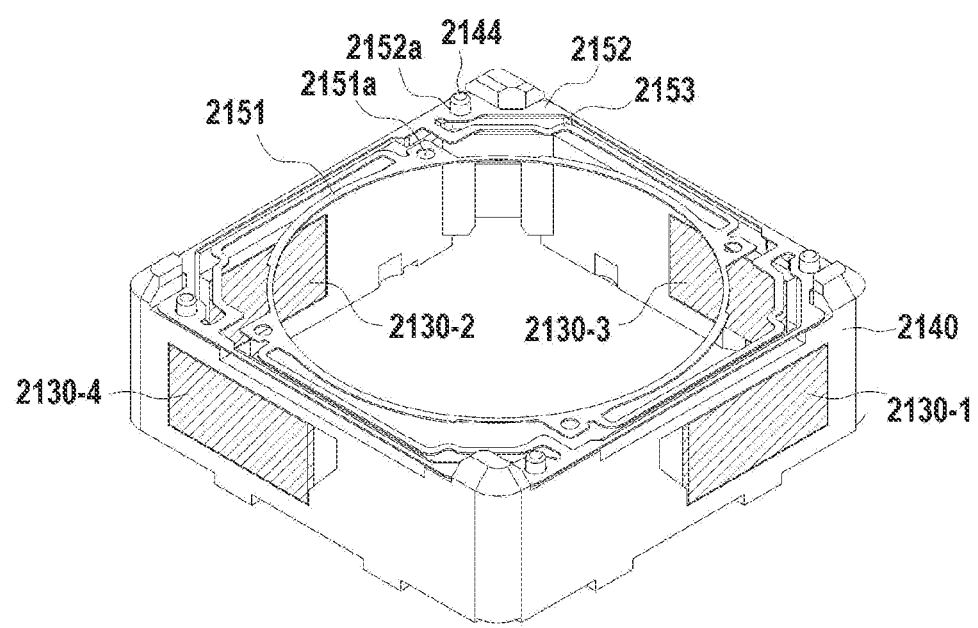
FIG. 27 is a perspective view of a housing, a magnet, and an upper elastic member.
Figure 28:
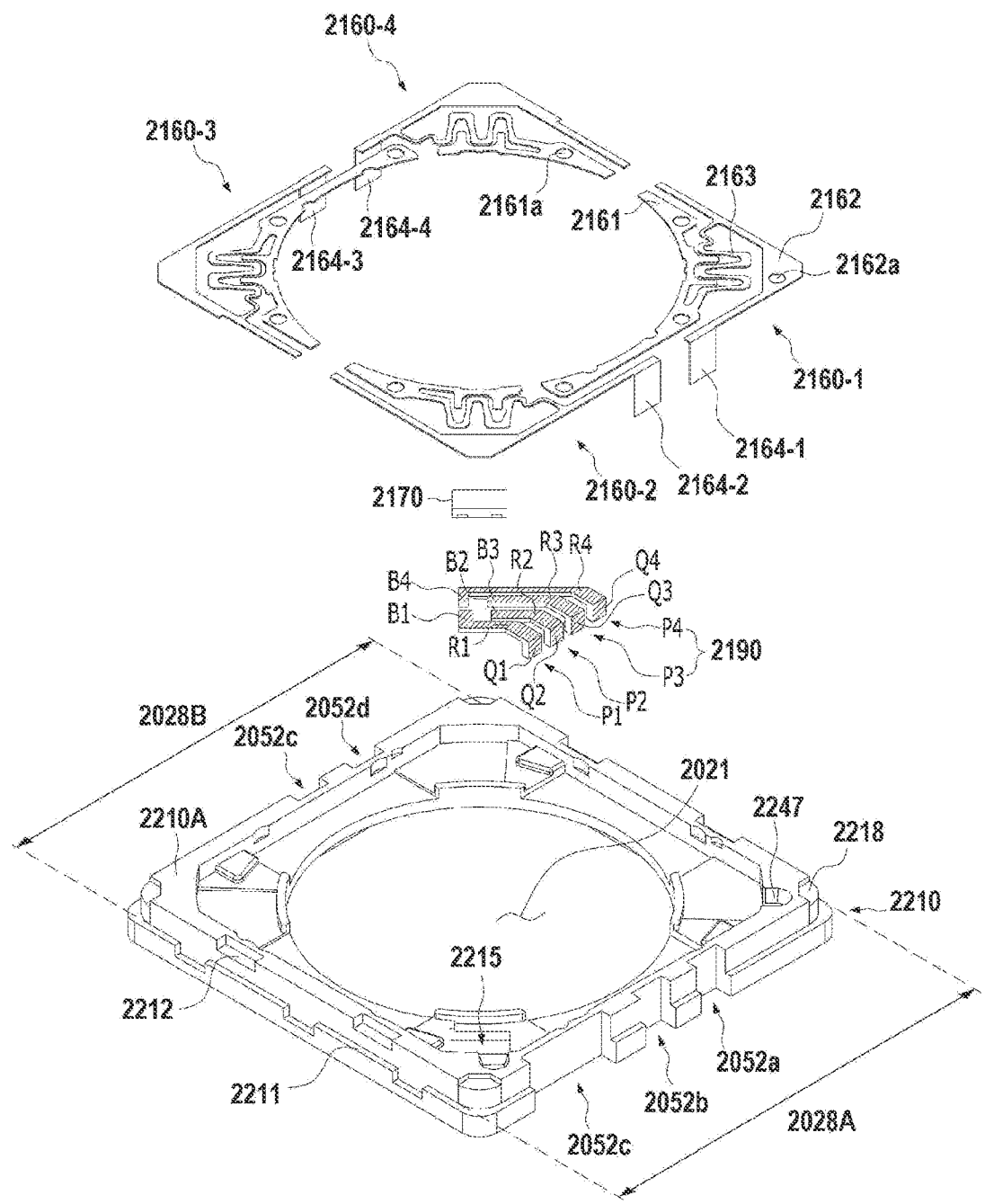
FIG. 28 is an exploded perspective view of a lower elastic member, a position sensor, a terminal part, and a base.
Figure 29:
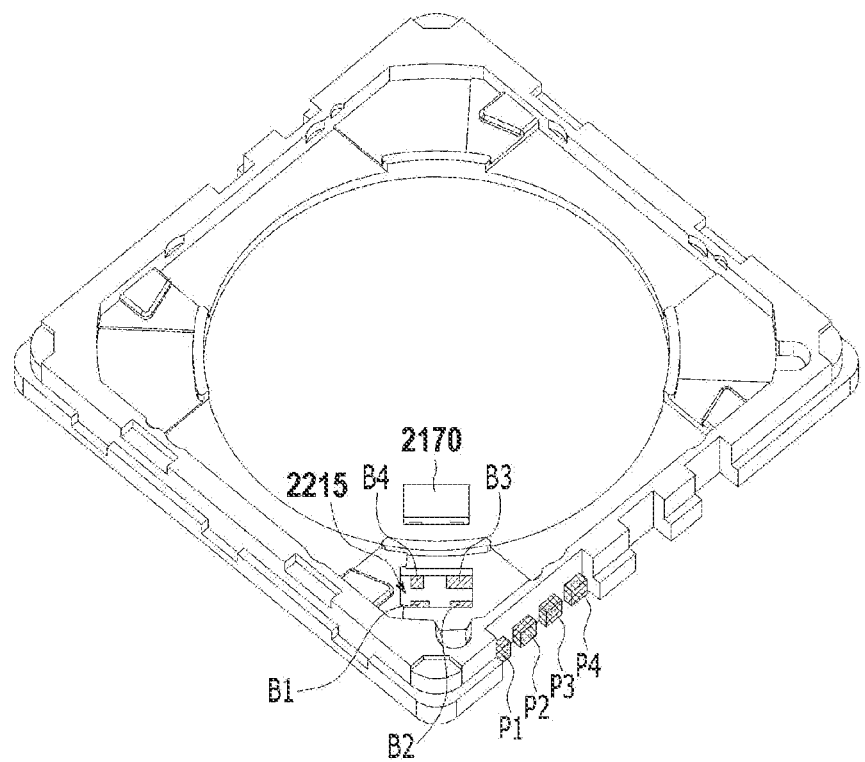
FIG. 29 is a perspective view of a base to which a position sensor and a terminal part are coupled.
Figure 30:
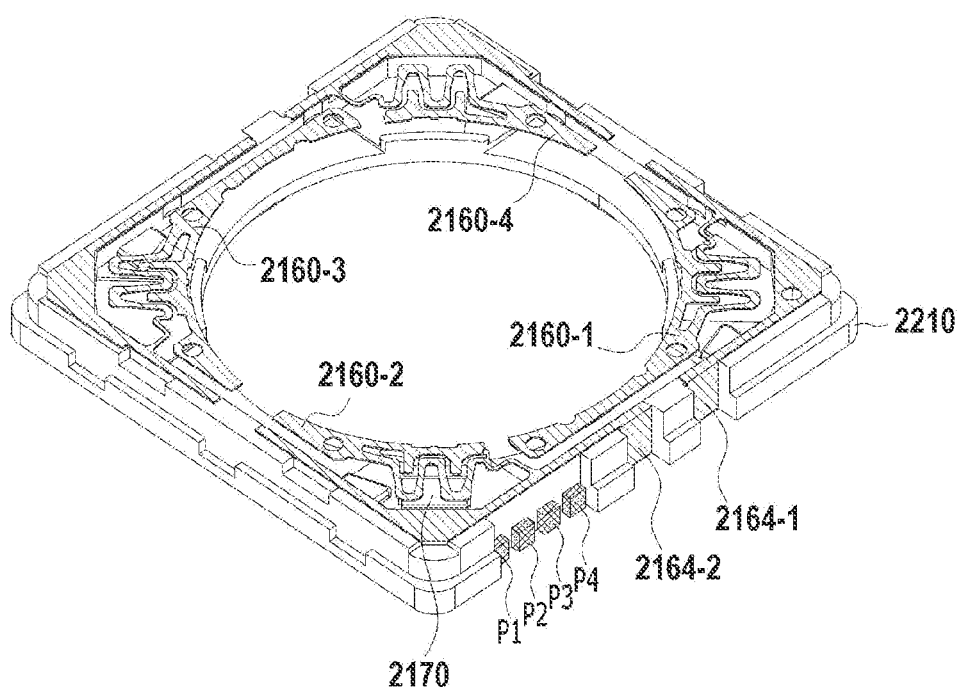
FIG. 30 is a combined perspective view of a lower elastic member, a terminal part, and a base.
Figure 31:
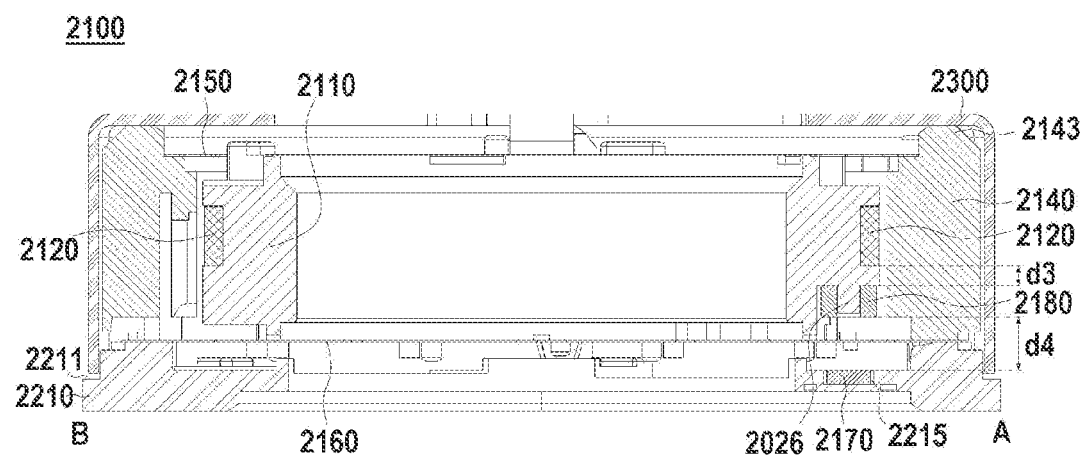
FIG. 31 is a cross-sectional view of a lens driving device in a direction AB of FIG. 24.
Figure 32:
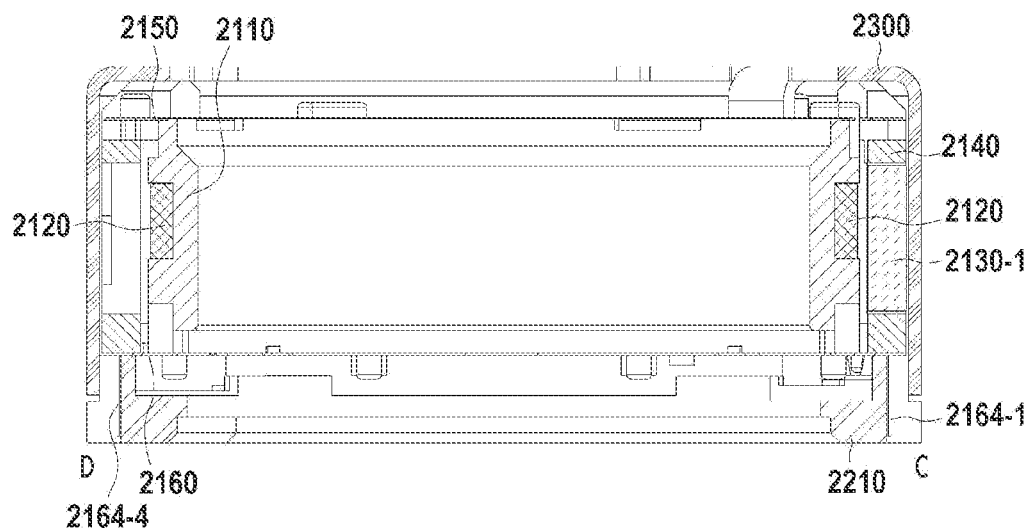
FIG. 32 is a cross-sectional view of a lens driving device in the CD direction of FIG. 24.

FIG. 27 is a perspective view of a housing 2140, a magnet 2130, and an upper elastic member 2150, FIG. 28 is an exploded perspective view of a lower elastic member 2160, a position sensor 2170, a terminal part 2190, and a base, FIG. 29 is a perspective view of a base 2210 to which a position sensor 2170 and a terminal part 2190 are coupled, FIG. 30 is a combined perspective view of a lower elastic member 2160, a terminal part 2190, and a base 2210, FIG. 31 is a cross-sectional view of a lens driving device 2100 in a direction AB of FIG. 24, and FIG. 32 is a cross-sectional view of a lens driving device 2100 in the CD direction of FIG. 24.

Referring to FIGS. 27 to 32, the upper elastic member 2150 and the lower elastic member 2160 may constitute an elastic member, the elastic member may be coupled to the bobbin 2110 and the housing 2140, and the elastic member may elastically support the bobbin 2110 against the housing 2140.

The upper elastic member 2150 may be coupled to an upper portion, an upper surface, or an upper end of the bobbin 2110 and an upper portion, an upper surface, or an upper end of the housing 2140. The lower elastic member 2160 may be coupled to a lower portion, a lower surface, or a lower end of the bobbin 2110 and a lower portion, a lower surface, or a lower end of the housing 2140. In the upper elastic member and the lower elastic member, the elastic member may be replaced with an "elastic unit", a "spring", or an "elastic body".

In FIG. 27, the upper elastic member 2150 may have a single structure without being separated into a plurality, but is not limited thereto, and in another embodiment, the upper elastic member 2150 may comprise a plurality of elastic units spaced apart from one another.

The upper elastic member 2150 may further comprise a first inner side frame 2151 coupled to the bobbin 2110, a first outer side frame 2152 coupled to the housing 2140, and a first frame connection part 2153 connecting the first inner side frame 2151 and the first outer side frame 2152. At this time, the inner side frame can be expressed by replacing it with an "inner side part", the outer side frame may be expressed by replacing it with an "outer side portion", and the frame connection part may be expressed by replacing it with a "connection part".

A hole 2151a for coupling with the first coupling part 2113 of the bobbin 2110 may be provided in the first inner side frame 2151 of the upper elastic member 2150, and a hole 2152a for coupling with the first coupling part 2144 of the housing 2140 may be provided in the first outer side frame 2152.

The lower elastic member 2160 may comprise two or more divided or separated elastic members, and may be coupled to the bobbin 2110. For example, elastic members may be expressed as "lower elastic members", "elastic units" or "springs".

For example, the lower elastic member 2160 may comprise first to fourth elastic members 2160-1 to 2160-4 that are spaced apart from one another, and the first to fourth elastic members 2160-1 to 2160-4 may be electrically separated from one another.

At least one among the first to fourth elastic members 21604 to 2160-4 may comprise a second inner side frame 2161 coupled to a lower portion of the bobbin 2110, a second outer side frame 2162 coupled to a lower portion of the housing 2140, and a second frame connection part 2163 connecting the second inner side frame 2161 and the second outer side frame 2162.

Each of the coil 2120 and the sensing coil 2180 may be electrically connected to at least one of the upper elastic member 2150 and the lower elastic member 2160.

For example, the coil 2120 may be electrically connected to the first and second elastic members 2160-1 and 2160-2. For example, one end (or the first end portion) of the coil 2120 by soldering or a conductive member may be coupled to the first elastic member 2160-1, and the other end (or second end portion) of the second coil 2120 may be coupled to the second elastic member 2160-2.

In addition, for example, the sensing coil 2180 may be electrically connected to the third and fourth elastic members 2160-3 and 2160-4 of the lower elastic member 2160.

For example, by soldering or a conductive member, one end of the sensing coil 2180 may be coupled to the second inner side frame 2161 of the third elastic member 2160-3, and the other end of the sensing coil 2180 may be coupled to the second inner side frame 2161 of the fourth elastic member 2160-4. A driving signal or power may be provided to the sensing coil 2180 through the third and fourth terminals 2164-3 and 2164-4 of the third and fourth elastic members 2160-3 and 2160-4.

A hole 2161a for coupling with the second coupling part 2117 of the bobbin 2110 may be provided in the second inner side frame 2161, and a hole 2162a for coupling with the second coupling part 2147 of the housing 2140 may be provided in the second outer side frame 2162.

In another embodiment, the lower elastic member may be implemented as one elastic unit integrally formed, and the coil 2120 may be electrically connected to two among the plurality of upper elastic members according to another embodiment.

Each of the first frame connection part 2153 of the upper elastic member 2150 and the second frame connection part 2163 of the lower elastic member 2160 is formed to be bent or curved (or curved line) at least once or more to form a pattern having a predetermined shape. The movement of rising and/or lowering in a first direction of the bobbin 2110 may be flexibly (or elastically) supported through the position change and micro-deformation of the first and second frame connection parts 2153 and 2163.

The upper elastic member 2150 and the lower elastic member 2160 may be formed of a leaf spring, but are not limited thereto, and may be implemented as a coil spring or the like.

In order to absorb and buffer the vibration of the bobbin 2110, the lens driving device 2100 may further comprise a first damper (not shown) disposed between the upper elastic member 2150 and the bobbin 2110 (or the housing 2140).

For example, a first damper (not shown) may be disposed in a space between the first frame connection part 2153 of the upper elastic member 2150 and the bobbin 2110.

In addition, for example, the lens driving device 2100 may be further provided with a second damper (not shown) disposed between the second frame connection part 2163 of the lower elastic member 2160 and the bobbin 2110 (or the housing 2140).

In addition, for example, a damper (not shown) may be disposed between an inner side surface of the housing 2140 and an outer circumferential surface of the bobbin 2110. For example, the damper may be silicone in a gel form, but is not limited thereto.

The first elastic member 2160-1 may comprise a first terminal 2164-1 connected to the outer side surface of the second outer side frame 2162 of the first elastic member 21604 and being bent and extended in a direction directing from the second outer side frame 2162 of the first elastic member 21604 toward the base 2210.

In addition, the second elastic member 2160-2 may comprise a second terminal 2164-2 connected to an outer side surface of the second outer side frame 2162 of the second elastic member 2160-2 and being bent and extended in a direction directing from the second outer side frame 2162 of the second elastic member 2160-2 toward the base 2210.

In addition, the third elastic member 2160-3 may comprise a third terminal 2164-3 connected to an outer side surface of the second outer side frame 2162 of the third elastic member 2160-3 and being bent and extended in a direction directing from the second outer side frame 2162 of the third elastic member 2160-3 toward the base 2210.

In addition, the fourth elastic member 2160-4 may comprise a fourth terminal 2164-4 connected to an outer side surface of the second outer side frame 2162 of the fourth elastic member 2160-4 and being bent and extended in a direction directing from the second outer side frame 2162 of the fourth elastic member 2160-4 toward the base 2210.

For example, the first terminal 2164-1 of the first elastic member 2160-1 may be extended from the second outer side frame 2162 of the first elastic member 2160-1 toward the first outer side surface 2028A of the base 2210.

In addition, for example, the second terminal 2164-2 of the second elastic member 2160-2 may be extended from the second outer side frame 2162 of the second elastic member 2160-2 toward the first outer side surface 2028A of the base 2210.

In addition, for example, the third terminal 2164-3 of the third elastic member 2160-3 may be extended from the second outer side frame 2162 of the third elastic member 2160-3 toward the second outer side surface 2028B of the base 2210.

In addition, for example, the fourth terminal 2164-4 of the fourth elastic member 2160-4 may be extended from the second outer side frame 2162 of the fourth elastic member 2160-4 toward the second outer side surface 2028B of the base 2210. The second outer side surface 2028B of the base 2210 may be positioned opposite the first outer side surface 2028A of the base 2210.

For example, the first to fourth terminals 2164-1 to 2164-4 of the first to fourth elastic members 2160-1 to 2160-4 may be disposed spaced apart from each other.

For example, the first and second terminals 2164-1 and 2164-2 of the first and second elastic members 2160-1 and 2160-2 may be disposed, seated, or inserted in the first and second recessed portions 2052a and 2052b provided on the first outer side surface 2028A of the base 2210. In addition, the third and fourth terminals 2164-3 and 2164-4 of the third and fourth elastic members 2160-3 and 2160-4 may be disposed, seated, or inserted in the third and fourth recessed portions 2052c and 2052d provided on the second outer side surface 2028B of the base 2210. Here, the recessed portion may be expressed by replacing it with a "groove".

The first to fourth terminals 2164-1 to 2164-4 of the first to fourth elastic members 2160-1 to 2160-4 may be exposed from the base 2210, and the first to fourth terminals 2164-1 to 2164-4 may be electrically isolated from one another.

For example, the inner side surfaces of the terminals 2164-1 to 2164-4 disposed in the recessed portions 2052a to 2052d of the base 2210 may be in contact with one surface (for example, bottom surface) of the recessed portions 2052a to 2052d, and the outer side surface of the terminals 2164-1 and 2164-4 may be exposed from the outer side surface (for example, 2028A and 2028B) of the base 2210. The outer side surfaces of the terminals 2164-1 to 2164-4 may be opposite surfaces of the inner side surfaces of the terminals 2164-1 to 2164-4.

For example, the lower ends of each of the first to fourth terminals 2164-1 to 2164-4 may be exposed from a lower surface of the base 2210, but is not limited thereto, and in another embodiment, the lower ends of each of the first to fourth terminals 2164-1 to 2164-4 may not be exposed to a lower surface of the base 2210.

The depth of the recessed portions 2052a to 2052d may be greater than the thickness of the terminals 2164-1 to 2164-4, and the outer side surfaces of the terminals 2164-1 to 2164-4 disposed in the recessed portions 2052a to 2052d may not be protruded out of the recessed portions 2252a to 2052d.

If the solder bonded to the first to fourth terminals 2164-1 to 2164-4 is protruded out of an outer side surface of the base 2210, contact or collision between the solder bonded to the first to fourth terminals 2164-1 to 2164-4 and the cover member 2300 may occur, and this may cause an electrical short or disconnection. In the embodiment, the depth of the recessed portions 2052a to 2052d can be sufficiently secured so that the solder bonded to the terminals 2164-1 to 2164-4 may not be protruded out of an outer side surface (for example, 2028A and 2028B) of the base 2210, and due to this, the embodiment can prevent the above-described electrical short circuit or disconnection.

In another embodiment, the outer side surfaces of the terminals 2164-1 to 2164-4 may be protruded out of the recessed portions 2052a to 2052d.

For example, the first to fourth terminals 2164-1 to 2164-4 may be electrically connected to external wirings or external devices by a conductive adhesive member (for example, soldering).

For example, the first and second terminals 2164-1 and 2164-2 may receive power or a driving signal from the outside so as to provide it to the coil 2120, and the first and second terminals 2164-1 and 2164-2 of the first and second elastic members 2160-1 and 2160-2 may be electrically connected to the coil 2120.

In FIG. 28, the first terminal 2164-1 is integrally formed with the first elastic member 2160-1, the second terminal 2164-2 is integrally formed with the second elastic member 2160-2, the third terminal 2164-3 is integrally formed with the third elastic member 2160-3, and the fourth terminal 2164-4 is integrally formed with the fourth elastic member 2160-4, but is not limited thereto.

In another embodiment, at least one of the first to fourth terminals may be disposed on an outer side surface (for example, 2028A and 2028B) of the base 2210 in a configuration separate from at least one of the first to fourth elastic members, and the corresponding elastic member and the terminal may be coupled or connected to one another by a conductive adhesive (for example, solder).

For example, each of the first to fourth terminals may be configured separately from each of the first to fourth elastic members, and each of the first to fourth terminals may be connected to a corresponding one of the first to fourth elastic members by means of a conductive adhesive (for example, solder).

The base 2210 is disposed below the bobbin 2110 (or housing 2140). For example, the base 2210 may be disposed under the lower elastic member 2160.

For example, the base 2210 may be coupled to the housing 2140, and may form an accommodating space for the bobbin 2110 and the housing 2140 together with the cover member 2300.

The base 2210 may have an opening 2021 of the bobbin 2110, and/or an opening 2021 corresponding to the opening of the housing 2140, and it may have a shape that matches or corresponds to the cover member 2300, for example, a rectangular shape. For example, the opening 2021 of the base 2210 may be in the form of a through hole penetrating the base 2210 in the optical axis direction.

A seating portion (not shown) in which the filter 2610 of the camera module 2200 is installed may be formed on a lower surface of the base 2210.

The base 2210 may comprise a seating groove 2215 for disposing, seating, or accommodating the position sensor 2170. For example, the seating groove 2215 may be a shape being recessed from the upper surface of the base 2210.

The base 2210 may comprise side portions corresponding to or opposite to the side portions 2141-1 to 2141-4 of the housing 2140 in the optical axis direction and corner portions corresponding to or opposite to the corner portions 2142-1 to 2142-4 of the housing 2140 in the optical axis direction.

For example, the seating groove 2215 may be provided in any one corner portion of the base 2210. For example, it may be formed between any one corner of the base 2210 of the seating groove 2215 and the opening 2021 of the base 2210.

For example, the first and second recessed portions 2052a and 2052b may be formed on an outer side surface of the first side portion of the base 2210, and the third and fourth recessed portions 2052c and 2052d may be formed on an outer side surface of the second side portion of the base 2210. The second side portion of the base 2210 may be located at the opposite side of the first side portion of the base 2210.

When the cover member 2300 is adhesively fixed, the base 2210 may comprise a step 2211 at a lower end of an outer side surface of the base 2210 to which the adhesive may be applied. At this time, the step 2211 may guide the cover member 2300 coupled to an upper side, and may face the lower end of the side plate 2302 of the cover member 2300. An adhesive member and/or a sealing member may be disposed or applied between the lower end of the side plate 2302 of the cover member 2300 and the step 2211 of the base 2210.

In addition, the upper surface 2210A of the base 2210 may be provided with a groove 2247 in which the second coupling part 2147 of the protrusion-shaped housing 2140 is seated, inserted, or coupled. The groove 2247 may correspond to or face the second coupling part 2147 of the housing 2140 in the optical axis direction.

At least one protrusion or protruding part 2145 may be formed on a lower portion or a lower surface of the housing 2140, and a protrusion of the housing 2140 or a groove 2212 corresponding to the protruding part 2145 may be provided in a side portion of the base 2210. For example, the protrusion of the housing 2140 or the protruding part 2145 may be coupled to the groove 2212 of the base 2210.

The terminal part 2190 may be disposed on the base 2210 and may be electrically connected to the position sensor 2170. The terminal part 2190 may comprise a plurality of terminals P1 to P4. The plurality of terminals P1 to P4 may be spaced apart from one another.

The base 2210 may be formed of an injection-molded material.

For example, at least a portion of each of the first to fourth terminals P1 to P4 of the terminal part 2190 may be located inside the base 2210 by an insert injection process. In this sense, each of the first to fourth terminals P1 to P4 may be referred to as an "insert terminal".

For example, the first to fourth terminals P1 to P4 of the terminal part 2190 may be disposed inside the base 2210. For example, for electrical connection with the position sensor 2170, at least a portion (or one end) B1 to B4 of each of the first to fourth terminals P1 to P4 may be exposed from the seating groove 2215 of the base 2210.

In addition, for example, in order to electrically connect with external wirings or external devices through solder or conductive adhesive, at least another part (or the other end) of each of the first to fourth terminals P1 to P4 may be exposed toward an outer side surface (for example, 28A) of the base 2210.

For example, a third recessed portion 2052c may be formed on the first outer side surface 2028A of the base 2210, and at least another part (or the other end) of each of the first to fourth terminals P1 to P4 may be disposed inside the third recessed portion 2052c of the base 2210. For example, at least another part (or the other end) of each of the first to fourth terminals P1 to P4 may not be protruded from the third recessed portion 2052c of the base 2210, and as a result, as described in the first and second recessed portions 2052a and 2052b, an electrical short circuit or disconnection can be prevented.

Each of the first to fourth terminals P1 to P4 may comprise first portions B1 to B4 electrically connected to the position sensor 2170, second portions Q1 to Q4 exposed to the first outer side surface 2028A of the base 2210, and third portions R1 to R4 connecting the first portions B1 to B4 and the second portions Q1 to Q4.

At least one third portions R1 to R4 of the first to fourth terminals P1 to P4 may comprise a bent or curved portion. For example, the third portions R1 to R4 may comprise portions bent at least once. In another embodiment, the third portions R1 to R4 may have a straight line shape without comprising a bent portion.

The position sensor 2170 is disposed below the sensing coil 2180.

The position sensor 2170 may be disposed on the base 2210.

For example, the position sensor 2170 may be disposed inside the seating groove 2215 of the base 2210. The position sensor 2170 may be disposed on the second portions B1 to B4 of the terminals P1 to P4 of the terminal part 2190 exposed by the seating groove 2215.

For example, the position sensor 2170 may be coupled to the second portions B1 to B4 of the terminals P1 to P4 of the terminal part 2190 exposed by the seating groove 2215 by soldering or conductive adhesive.

In addition, for example, the position sensor 2170 may be electrically connected to the second portions B1 to B4 of the terminals P1 to P4 of the terminal part 2190.

The position sensor 2170 may be an "AF position sensor". The position sensor 2170 may be overlapped with a portion of the coil 2120 in the optical axis direction. In another embodiment, the position sensor 2170 may not be overlapped with a portion of the coil 2120 in the optical axis direction.

A driving signal 2120 may be provided to the coil 2120, and the AF moving part (for example, the bobbin 2110 and the coil 2120) may be moved in the optical axis direction by the electromagnetic force due to the interaction between the coil 2120 and the magnet 2130 to which the driving signal is provided. The coil 2120 to which the driving signal is provided may generate a magnetic field.

The position sensor 2170 may detect the strength of the magnetic field of the coil 2120 moving in the optical axis direction, and may output an output signal according to the detected result.

For example, the strength or magnetic force of the magnetic field of the coil 2120 detected by the position sensor 2170 may be changed according to the displacement of the bobbin 2110 in the optical axis direction, and the position sensor 2170 may output an output signal proportional to the strength of the detected magnetic field. The control units 2410 and 2780 of the camera module or optical apparatus may detect the displacement of the bobbin 2110 in the optical axis direction by using the output signal of the position sensor 2170.

The position sensor 2170 may be implemented as a Hall sensor alone or in the form of a driver IC (integrated circuit) comprising the Hall sensor.

In addition, since the position sensor 2170 is disposed on the base 2210, when compared with the case where the position sensor 2170 is placed in an OIS moving part (for example, housing), since the separation distance between the position sensor 2170 and the coil 2120 can be increased, and therefore, the position sensor 2170 may be implemented as a highly sensitive Hall sensor or a tunnel magnetoresistance (TMR) sensor.

In an embodiment implemented with a Hall sensor alone or a TMR sensor, the position sensor 2170 may comprise two input terminals and two output terminals. At this time, the position sensor 2170 detects the magnetic field generated in the coil 2120, and an output voltage that is an analog signal may be outputted through two output terminals.

The two input terminals of the position sensor 2170 may be electrically connected to the first and second terminals (for example, P1 and P2) of the terminal part 2190, and a driving signal may be provided to the position sensor 2170 through these P1 and P2.

In addition, the two output terminals of the position sensor 2170 may be electrically connected to the third and fourth terminals (for example, P3 and P4) of the terminal part 2190, and an output signal of the position sensor 2170 may be outputted through these (for example, P3 and P4).

For example, in an embodiment implemented in the form of a driver IC (integrated circuit) comprising a Hall sensor, the position sensor 2170 may comprise: first and second terminals for receiving power; third and fourth terminals for transmitting and receiving a clock signal for data communication and a data signal and fifth and sixth terminals for providing a direct drive signal to the coil 2120. At this time, each of the first to fourth terminals of the position sensor 2170 may be electrically connected to any one of the first to fourth terminals of the terminal part 2190, and the fifth and sixth terminals of the position sensor 2170 may be electrically connected to the coil 2120. For example, the fifth and sixth terminals of the position sensor 2170 may be electrically connected to the first and second elastic members 2160-1 and 2160-2; the first and second elastic members may be electrically connected to the coil; and in this case, the first and second terminals 2164-1 and 2164-2 of the first and second elastic members 21604 and 2160-2 may be omitted.

Next, the cover member 2300 will be described.

The cover member 2300 may accommodate an AF moving part, a housing 2140, a magnet 2130, an upper elastic member 2150, a lower elastic member 2160, a position sensor 2170, a terminal part 2190, a base 2210 in the accommodation space formed together with the base 2210.

The cover member 2300 has an open lower portion, and may have a box shape comprising an upper plate 2310 and side plates 2302, and a lower portion of the cover member 2300 may be coupled to an upper portion of the base 2210. The shape of the upper plate of the cover member 2300 may be a polygon, for example, a quadrangle or an octagon.

The cover member 2300 may have an opening in an upper plate 2301 for exposing a lens (not shown) coupled to the bobbin 2110 to external light. The material of the cover member 2300 may be a non-magnetic material such as SUS in order to prevent sticking to the magnet 2130. The cover member 2300 may be formed of a metal plate, but is not limited thereto, and may be formed of plastic.

Figure 33A:
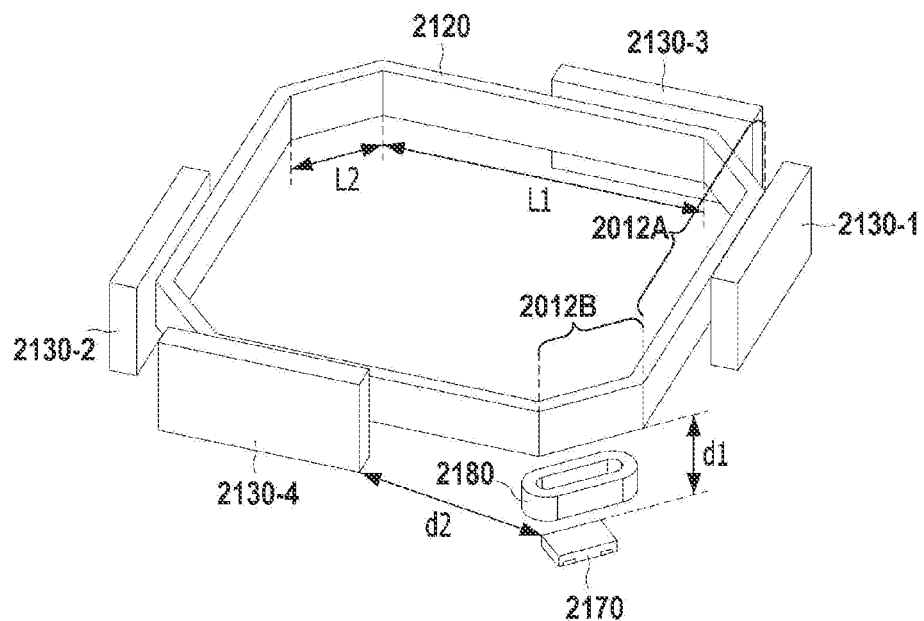
FIG. 33a shows the disposement of a coil, magnet units, a sensing coil, and a position sensor.
Figure 33B:
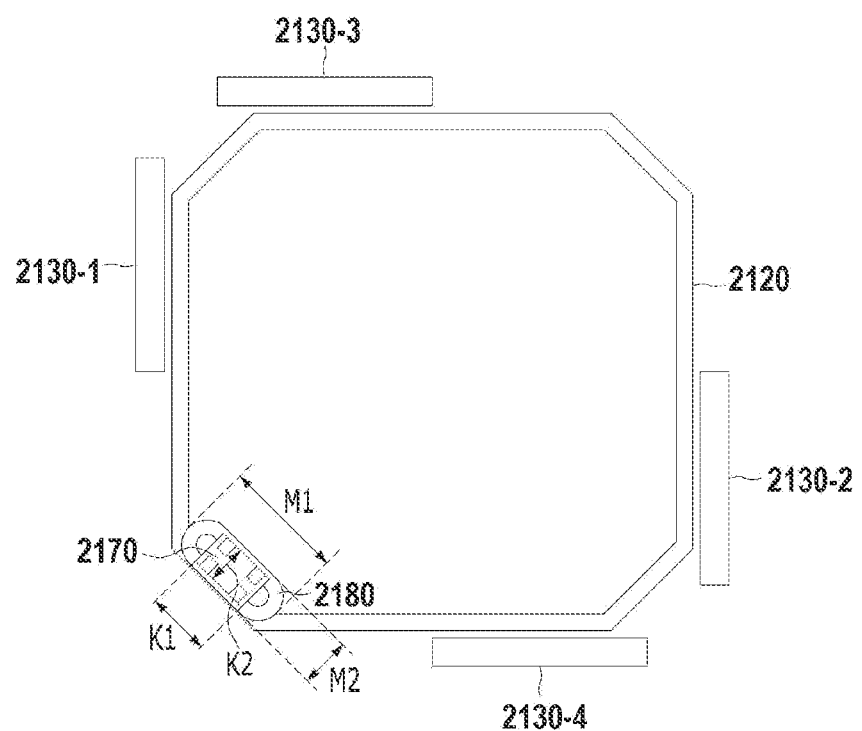

FIG. 33a shows the disposement of a coil 2120, magnet units (2130-1 to 2130-4), a sensing coil 2180, and a position sensor 2170, and FIG. 33b shows a bottom view of FIG. 33a.

Referring to FIGS. 33a and 33b, the coil 2120 may comprise first portions 2012A disposed on the side portions 2110b1 to 2110b4 of the bobbin 2110, and second portions 2012B disposed on the corner portions 2110c1 to 2110c4 of the bobbin 2110.

For example, the horizontal length L1 of the first portion 2012A may be greater than the horizontal length L2 of the second portion 2012B.

The sensing coil 2180 may be disposed below the coil 2120, and the position sensor 2170 may be disposed below the sensing coil 2180.

For example, the sensing coil 2180 and the position sensor 2170 may be overlapped with any one of the second parts 2012B of the coil 2120 in the optical axis direction.

The sensing coil 2180 may be disposed more adjacently to the second corner portion 2142-2 or the fourth corner portion 2142-4 of the housing 2140 than the first corner portion 2142-1 and the second corner portion 2142-2 of the housing 2140. This is because the influence of the interaction between the sensing coil 2180 and the magnet units 2130-1 to 2130-4 is reduced by increasing the separation distance between the sensing coil 2180 and the magnet units 2130-1 to 2130-4, so that AF driving is not affected by the interaction between the coil 2120 and the magnet units 2130-1 to 2130-4.

In addition, the position sensor 2170 may be disposed more adjacently to the second corner portion 2142-2 or the fourth corner portion 2142-4 of the housing 2140 than the first corner portion 2142-1 and the second corner portion 2142-2 of the housing 2140. This is to increase the reliability of the output value of the position sensor 2170 by allowing the position sensor 2170 to be less affected by the magnetic field of the magnet units 2130-1 to 2130-4 and detect the strength of the magnetic field of the coil 2120.

For example, the shortest distance d1 between the coil 2120 and the position sensor 2170 may be smaller than the shortest distance d2 between the position sensor 2170 and the adjacent magnet units (for example, 2130-1 and 2130-4) and the position sensor 2170 (d1<d2). This is to reduce the influence of magnetic field interference of magnets (for example, 2130-1 and 2130-4) and to increase the sensing sensitivity of the position sensor 2170 to the magnetic field of the sensing coil 2180. In another embodiment, it may be d1≥d2.

Referring to FIGS. 31 and 33a, the shortest distance d3 between the sensing coil 2180 and the coil 2120 may be smaller than the shortest distance d4 between the sensing coil 2180 and the position sensor 2170 (d3<d4), but is not limited thereto. In another embodiment, in order to improve the sensitivity of the position sensor 2170 to the magnetic field of the sensing coil 2180, it may be d4<d3. In another embodiment, it may be d3=d4.

Referring to the bottom view of FIG. 33b, when viewed from above (or from below), the position sensor 2170 may be located within the region of the sensing coil 2180. In order to improve the sensitivity of the position sensor 2170, a sensing element (or a sensing region) of the position sensor 2170 may be overlapped with the sensing coil 2180 in the optical axis direction.

For example, the length K1 of the position sensor 2170 in the horizontal direction may be smaller than the length M1 of the sensing coil 2180 in the horizontal direction (K1<M1). In addition, for example, the length K2 of the position sensor 2170 in the longitudinal direction may be smaller than the length M2 of the sensing coil 2180 in the longitudinal direction (K2<M2).

In another embodiment, the length of the position sensor in the horizontal direction may be greater than or equal to the length of the sensing coil in the horizontal direction. In addition, in another embodiment, the length of the position sensor in the longitudinal direction may be greater than or equal to the length of the sensing coil in the longitudinal direction.

In another embodiment, when viewed from above (or from below), the position sensor may comprise a portion that does not overlap with the sensing coil 2180 in the optical axis direction. For example, when viewed from above (or from below), a portion of the position sensor may be disposed to be protruded out of the area of the sensing coil.

In another embodiment, when viewed from above (or below), at least a portion of the sensing coil (or/and the position sensor) may be disposed on the outer side of the coil 2120. For example, all, some, or most of the sensing coil (or/and the position sensor) may be disposed on the outer side of the coil 2120.

Figure 34:
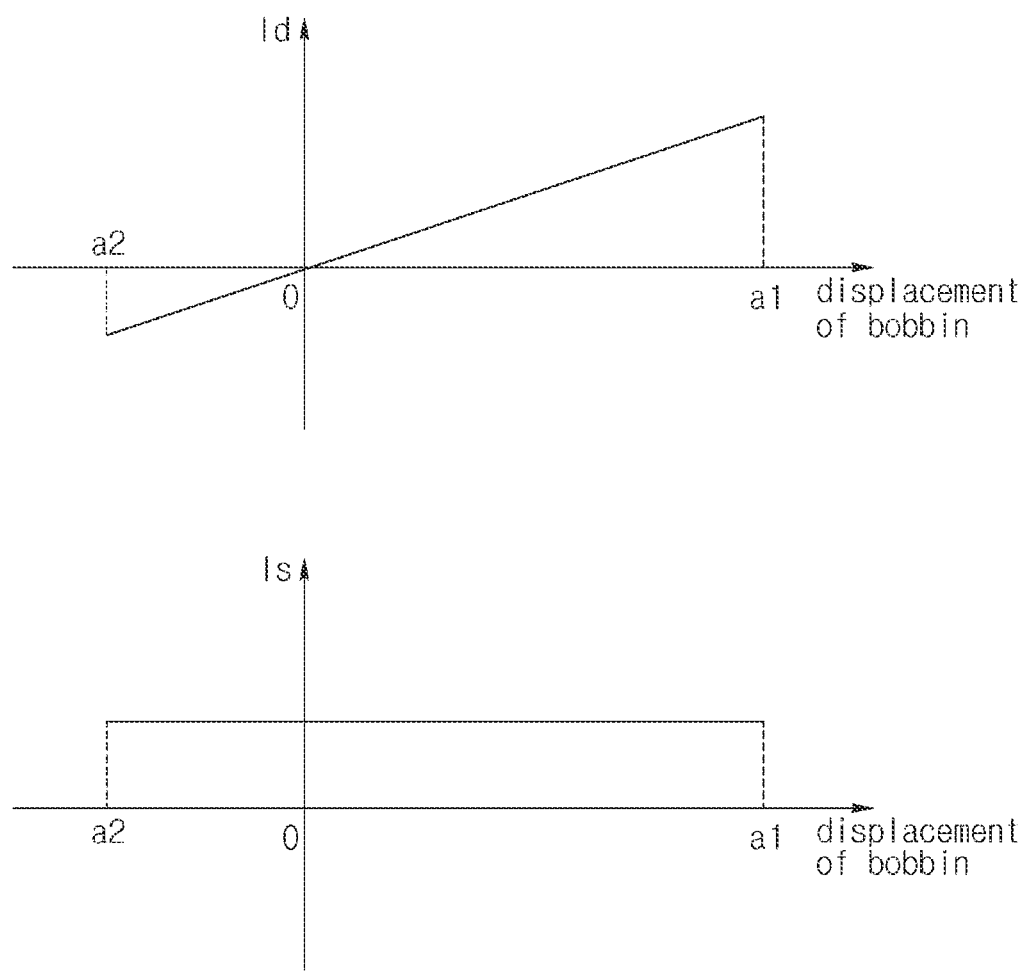
FIG. 34 shows the relationship between the displacement of a bobbin, a first driving signal being applied to a coil, and a second driving signal being applied to a sensing coil.

FIG. 34 shows the relationship between the displacement of the bobbin 2110, the first driving signal Id applied to the coil 2120, and the second driving signal Is applied to the sensing coil 2180. a1 may be the highest position or macro position of the bobbin 2110, and a2 may be a lowest position or an infinity position of the bobbin 2110. The X-axis of FIG. 34 may be a displacement of the bobbin or a stroke of the bobbin.

Referring to FIG. 34, the relationship between the magnitude of the first driving signal Id and the displacement (or stroke of the bobbin) of the bobbin 2110 in order to move the bobbin 2110 may be a linear straight line having a constant slope. Or, in another embodiment, the relationship between the two may be non-linear.

For example, as the displacement of the bobbin changes, the first driving signal Id may be a signal that increases or decreases.

On the other hand, the magnitude of the second driving signal Is may have a constant value even if the displacement or position of the bobbin 2110 is changed in order to generate a magnetic field having a predetermined strength. For example, the second driving signal Is may be provided with a signal having a predetermined constant value regardless of the displacement of the bobbin 2110.

Figure 35A:
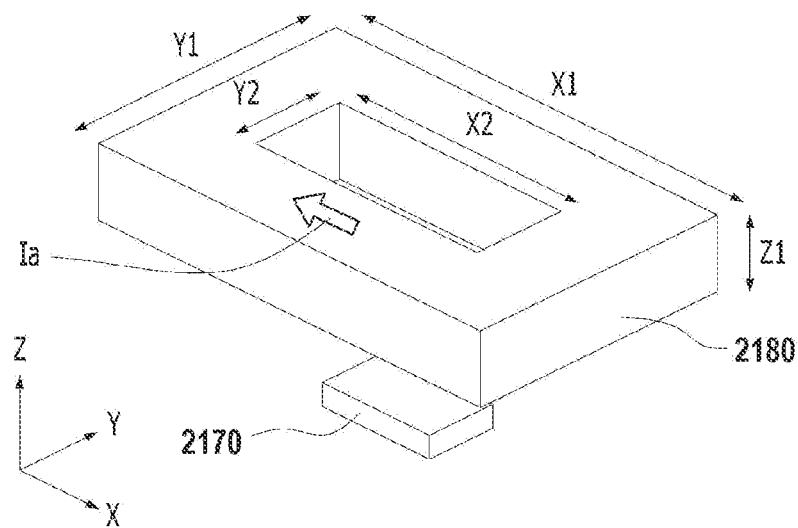
FIG. 35a shows the disposement of a sensing coil and a position sensor for simulation.
Figure 35B:
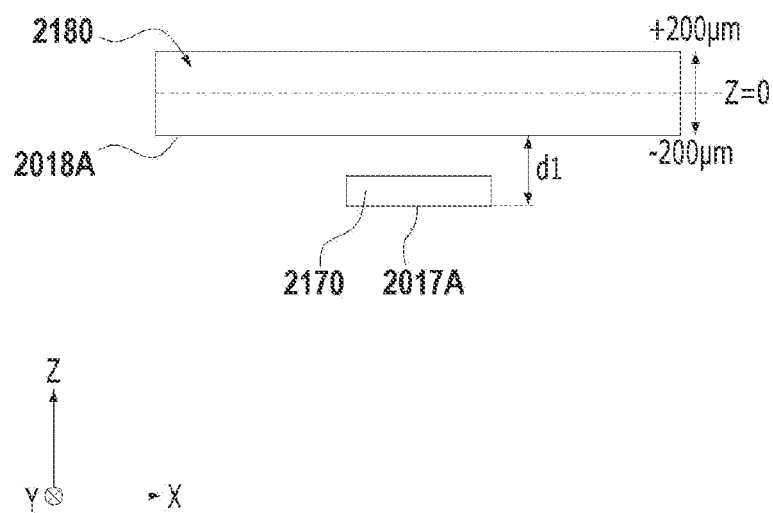
FIG. 35b shows a change in the position of a sensing coil of FIG. 35a according to the movement of an AF moving part in the optical axis direction.
Figure 35C:
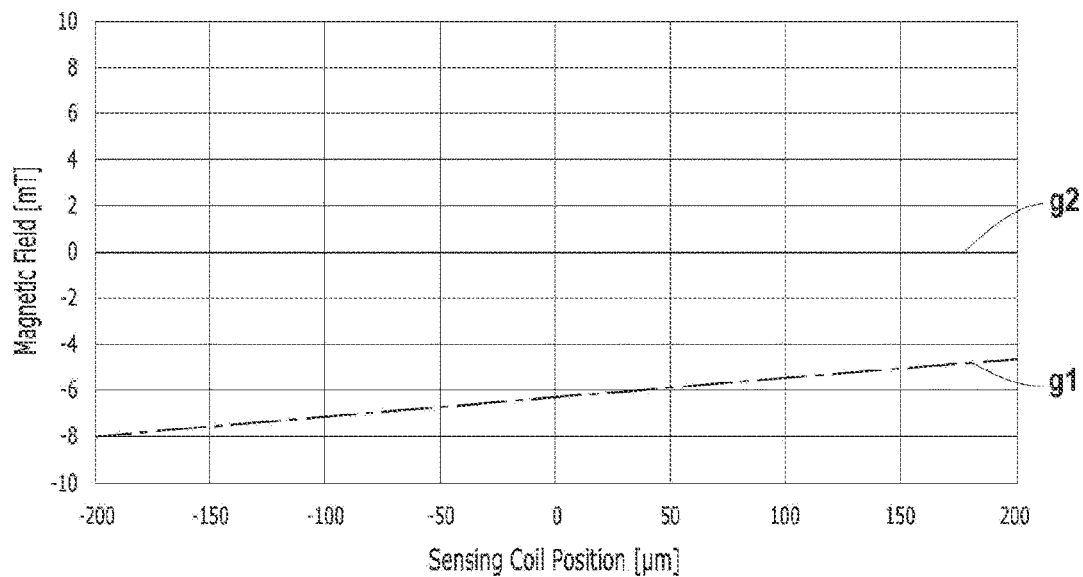
FIG. 35c illustrates a change in the strength of a magnetic field of a sensing coil sensed by a position sensor according to a change in the position of the sensing coil of FIG. 35b.

FIG. 35a shows the disposement of a sensing coil 2180 and a position sensor 2170 for simulation, FIG. 35b shows a change in the position of a sensing coil 2180 of FIG. 35a according to the movement of an AF moving part in the optical axis direction, and FIG. 35c illustrates a change in the strength of a magnetic field of a sensing coil 2180 sensed by a position sensor 2170 according to a change in the position of the sensing coil 2180 of FIG. 35b.

Referring to FIGS. 35a to 35c, the shape of the outer circumferential surface of the sensing coil 2180 as viewed from above may be a quadrangle, but is not limited thereto. The length X1 of the outer circumferential surface of the sensing coil 2180 may be 3.29 [mm], the width Y1 of the outer circumferential surface of the sensing coil 2180 may be 2.05 [mm], the length X2 of the inner circumferential surface of the sensing coil 2180 may be 1.93 [mm], the width Y2 of the inner circumferential surface of the sensing coil 2180 may be 0.74 [mm], and the length Z1 of the sensing coil 2180 in the optical axis direction is 0.54 [mm]. In addition, the driving signal Ia provided to the sensing coil 2180 may be 100 [mA]. In addition, the separation distance d1 from the lower surface 217A of the position sensor 2170 to the lower surface 2018A of the sensing coil 2180 may be 0.43 [mm].

At the initial position of the AF moving part (for example, a position where Z=0), the forward stroke of the AF moving part may be 200 [μm], and the rear stroke of the AF moving part may be 200 [μm].

In FIG. 35c, the X-axis represents the displacement (or position) of the sensing coil 2180 in the optical axis direction, and the Y-axis represents a change in the strength of the magnetic field of the sensing coil 2180 detected by the position sensor 2170. g1 represents the change in the strength of the magnetic field of the sensing coil 2180 in the optical axis direction detected by the position sensor 2170, and g2 represents a change in the strength of the magnetic field of the sensing coil 2180 in a direction perpendicular to the optical axis detected by the position sensor 2170.

As illustrated in g1, the change in the magnetic field in the optical axis direction sensed by the position sensor 2170 according to the displacement in the optical axis direction of the AF moving part may be in the range of −4.6 [mT] to −8.2 [mT] and, g1 may be a linear graph.

The output of the position sensor 2170 may be proportional to the strength of the magnetic field of the sensing coil 2180 detected by the position sensor 2170, and the camera module 2200 or the control units 2410 and 780 of the terminal 2200A may detect the displacement of the AF moving part in the optical axis direction using the output of the position sensor 2170.

In another embodiment, two magnet units may be disposed on two side portions (for example, 2141-1 and 2141-2) of the housing 2140 facing each other. At this time, the position sensor 2170 may be disposed on the base 2210 so as to be overlapped with a portion of the coil 2120 disposed on the outer side surface of the bobbin 2110 corresponding to any one among the side portions of the housing 2140 in which the two magnet units are not disposed, and the corner portions, in the optical axis direction.

Referring to FIGS. 35*a* and 35*b*, the center of the position sensor 2170 and the center of the sensing coil 2180 in the optical axis direction may be disposed to be overlapped with each other, but is not limited thereto. In another embodiment, the center of the position sensor 2170 is disposed to be overlapped with the edge or edge side of the sensing coil 2180 rather than the center of the sensing coil 2180, or may be disposed to be overlapped with some sides of the sensing coil 2180.

Figure 36:
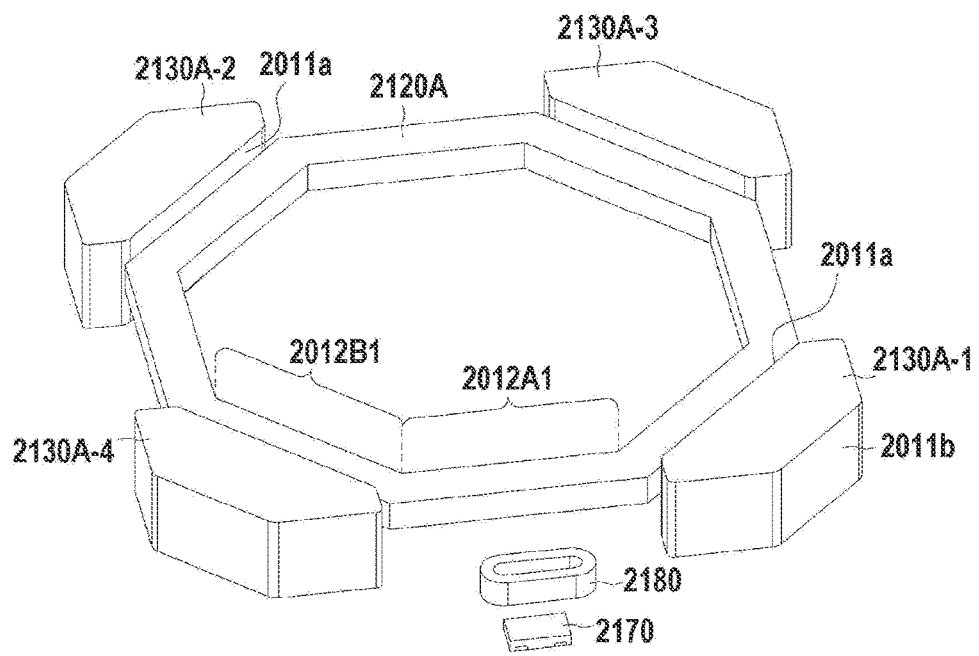
FIG. 36 illustrates an disposement of a coil, magnet units, a sensing coil, and a position sensor according to another exemplary embodiment.

FIG. 36 illustrates an disposement of a coil 2120A, magnet units 2130A-1 to 2130A-4, a sensing coil 2180, and a position sensor 2170 according to another exemplary embodiment.

Referring to FIG. 36, magnet units 2130A-1 to 2130A-4 may be disposed at corner portions of the housing. The shape of each of the magnet units 2130A-1 to 2130A-4 disposed in the corner portions of the housing may be a polyhedral shape to be easily seated in the corner portion of the housing.

For example, the area of a first surface of each of the magnet units 2130A-1 to 2130A-4 may be greater than the area of a second surface. The first surface 2011*a* of each of the magnet units 2130A-1 to 2130A-4 may be a surface facing any one surface of the coil 2120A (or the outer side surface of the bobbin 2110), and the second surface 2011*b* may be a surface opposite to the first surface 2011*a*. For example, the length of the second surface 2011*b* in the horizontal direction may be smaller than the length of the first surface 2011*a* in the horizontal direction.

For example, each of the first to fourth magnet units 2130A-1 to 2130A-4 may comprise a portion in which the length in the horizontal direction is gradually decreased in a direction directing from the first surface 2011*a* toward the second surface 2011*b*.

The coil 2120A may comprise: first portions 2012A1 disposed on side portions of the bobbin 2110 corresponding to side portions of the housing; and second portions 2012B1 disposed at corner portions of the bobbin 2110 corresponding to the corner portions of the housing.

The position sensor 2170 may be disposed so as to be overlapped with any one among the first portions 2012A1 of the coil 2120A disposed on the side portion of the bobbin 2110 corresponding to any one of the side portions of the housing in the optical axis direction. The first shortest distance between the coil 2120A and the position sensor 2170 may be smaller than the second shortest distance between the position sensor 2170 and the adjacent magnet unit (for example, 2130A-1 and 2130A-4) and the position sensor. In another embodiment, the first shortest distance may be greater than or equal to the second shortest distance.

The sensing coil 2120 may be disposed to be overlapped with any one of the first portions 2012A1 of the coil 2120A disposed on the side portion of the bobbin 2110 corresponding to any one of the side portions of the housing, in the optical axis direction.

For example, the sensing coil 2180 may be overlapped with the first portion 2012A1 of the coil 2120A disposed on the side portion 2110*b*1 of the bobbin 2110 corresponding to the side portion 2141-1 of the housing, in the optical axis direction.

In the embodiment, the sensing coil 2180 is disposed closer to the position sensor 2170 than the coil 2120, and since the strength of the magnetic field of the sensing coil 2180 on the position sensor 2170 is greater than the strength of the magnetic field of the coil 2120 on the position sensor 2170, the embodiment can further enhance the sensing sensitivity of the position sensor 2170 to the magnetic field of the sensing coil 2180.

As the size of the lens driving device is getting smaller due to the requests from the customers, in a lens driving device that uses a sensing magnet to detect the position of the bobbin in the optical axis direction, the distance between the sensing magnet and the driving magnet becomes narrower.

Figure 37:
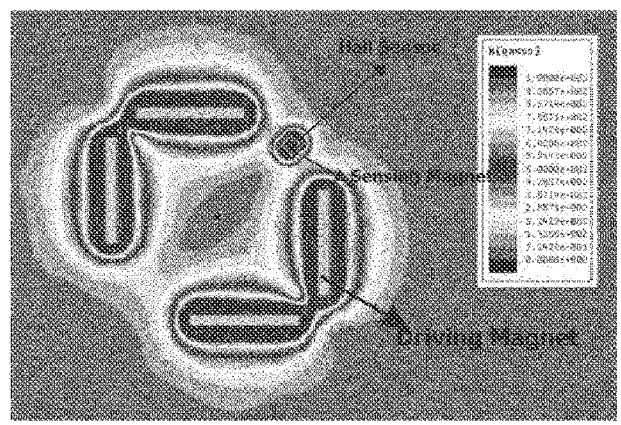
FIG. 37 is a diagram illustrating a magnetic field distribution of each of a sensing magnet and a driving magnet in a lens driving device using a sensing magnet.

FIG. 37 is a diagram illustrating a magnetic field distribution of each of a sensing magnet and a driving magnet in a lens driving device using a sensing magnet.

Referring to FIG. 37, when the distance between the sensing magnet and the driving magnet becomes narrow, the reliability of the output value of the Hall sensor, which is the position sensor, becomes degraded due to mutual magnetic field interference between the sensing magnet and the driving magnet, and the AF driving accuracy may be reduced, and there are difficulties in VCM design.

The embodiment does not separately provide a sensing magnet, since the position sensor 2170 disposed on the base 2210 detects position (or displacement) of bobbin 2110 by detecting the magnetic force change of the magnetic field of the coil 2120 according to the movement (or displacement) of the AF moving part (for example, the bobbin 2110) in the optical axis direction, it is possible to prevent the reliability of the output value of the position sensor from being deteriorated due to the magnetic field interference between the sensing magnet and the magnet units.

Figure 38:
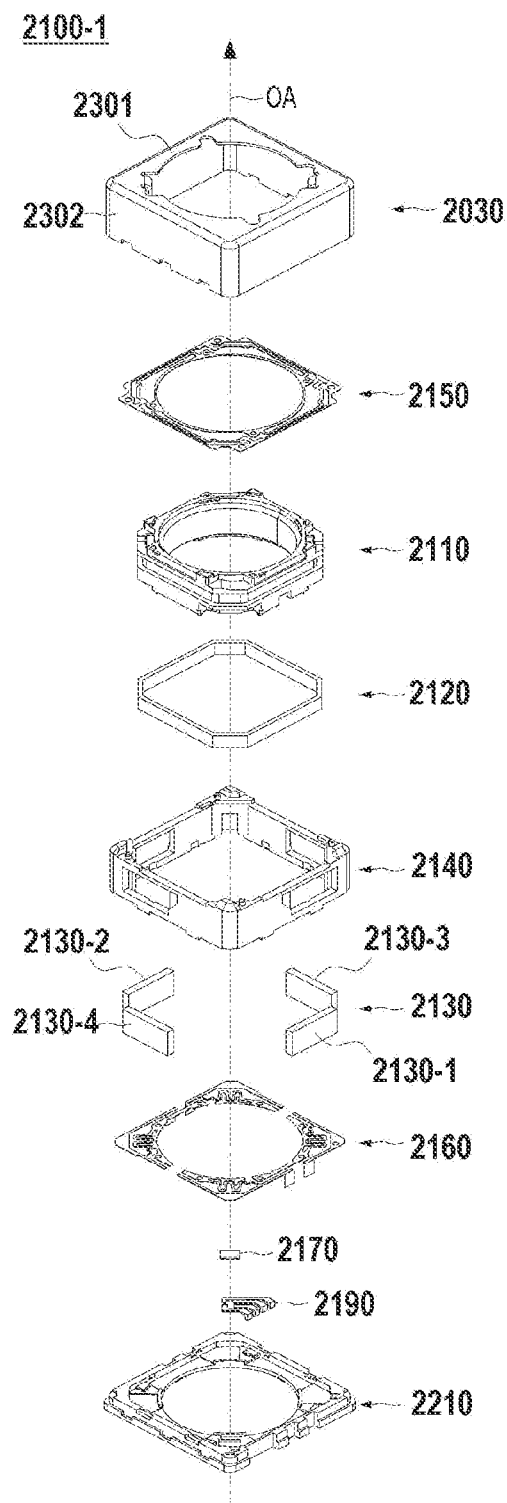
FIG. 38 is an exploded view of a lens driving device according to another exemplary embodiment.
Figure 39:
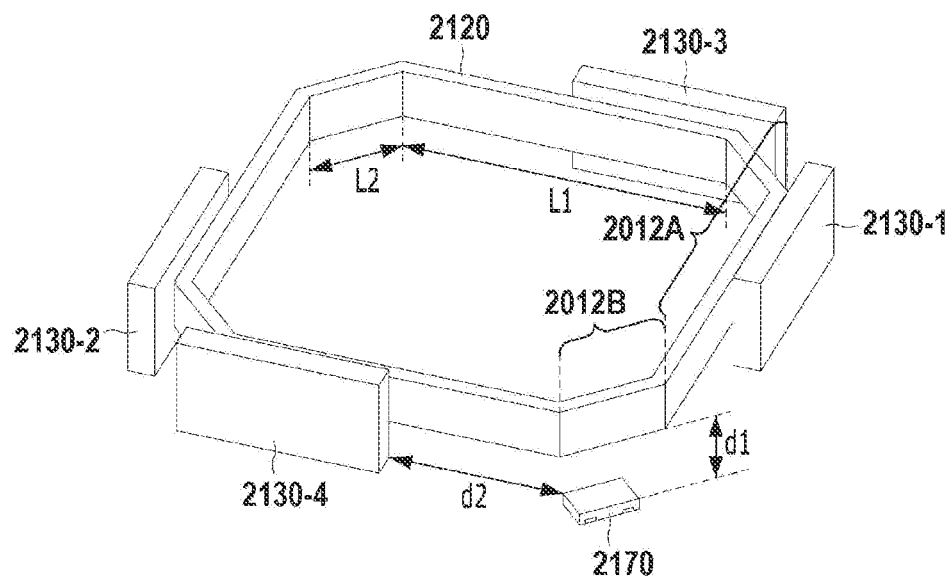
FIG. 39 shows an disposement of a coil, magnet units, and a position sensor of FIG. 38.
Figure 40:
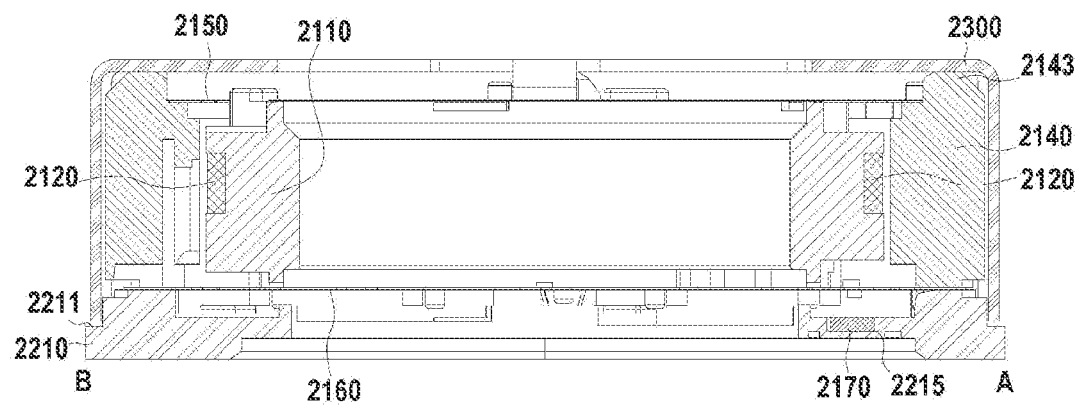
FIG. 40 is a cross-sectional view of a lens driving device of FIG. 38 in a direction AB of FIG. 24.

FIG. 38 is an exploded view of a lens driving device 2100-1 according to another exemplary embodiment, FIG. 39 shows an disposement of a coil 2120, magnet units 2130-1 to 2130-4, and a position sensor 2170 of FIG. 38, and FIG. 40 is a cross-sectional view of a lens driving device 2100-1 of FIG. 38 in a direction AB of FIG. 24.

In FIG. 38, the same reference numerals as those of FIG. 23 indicate the same components, and descriptions of the same components will be omitted or simplified.

Referring to FIGS. 38 to 40, the lens driving device 2100-1 may have a structure in which the sensing coil 2180 is omitted from the lens driving device of FIG. 23.

The position sensor 2170 may be disposed below the coil 2120. For example, the position sensor 2170 may be overlapped with any one of the second parts 2012B of the coil 2120 in the optical axis direction. For d1 and d2 of FIG. 39, the description of FIG. 33*a* may be applied or may be applied mutatis mutandis.

The driving signal provided to the coil 2120 may comprise a DC signal and an AC signal. At this time, the AC signal comprised in the driving signal provided to the coil 2120 may generate electromagnetic force by interaction with the magnet units 2130-1 to 2130-4. For example, the AC signal may be a pulse width modulation (PWM) signal.

In addition, for example, the coil 2120 may generate a magnetic field for the position sensor 2170 by a DC signal comprised in the driving signal provided to the coil 2120.

Figure 41:
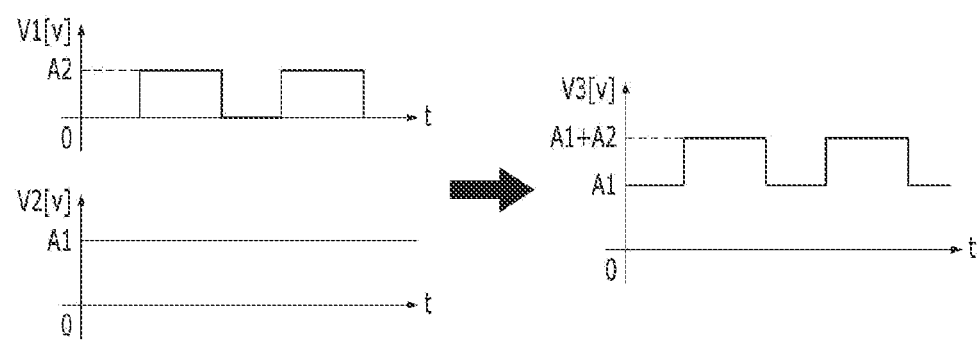
FIG. 41 illustrates an example of a driving signal provided to a coil of FIG. 38.

FIG. 41 illustrates an example of a driving signal provided to a coil 2120 of FIG. 38.

Referring to FIG. 41, the driving signal V3 provided to the coil 2120 may comprise a PWM signal V1 and a DC signal V2 having a constant magnitude A.

The electromagnetic force between the magnet units 2130-1 to 2130-4 and the coil 2120 may be controlled by the PWM signal V1. That is, by controlling the duty ratio of the PWM signal, the electromagnetic force between the magnet units 2130-1 to 2130-4 and the coil 2120 may be controlled.

The strength of the magnetic field generated in the coil 2120 by the DC signal V2 may be constant regardless of the displacement of the bobbin 2110. However, as the bobbin 2110 moves, the strength or magnetic force of the magnetic field of the coil 2120 by the DC signal V2 detected by the position sensor 2170 may be changed, and the position sensor 2170 may output an output signal proportional to the strength of the detected magnetic field.

That is, the position sensor 2170 may detect the strength of the magnetic field of the coil 2120 moving in the optical axis direction, and may output an output signal according to the detected result.

The control units 2410 and 780 of the camera module or optical apparatus may detect the displacement of the bobbin 2110 in the optical axis direction by using the output signal of the position sensor 2170.

Figure 42:
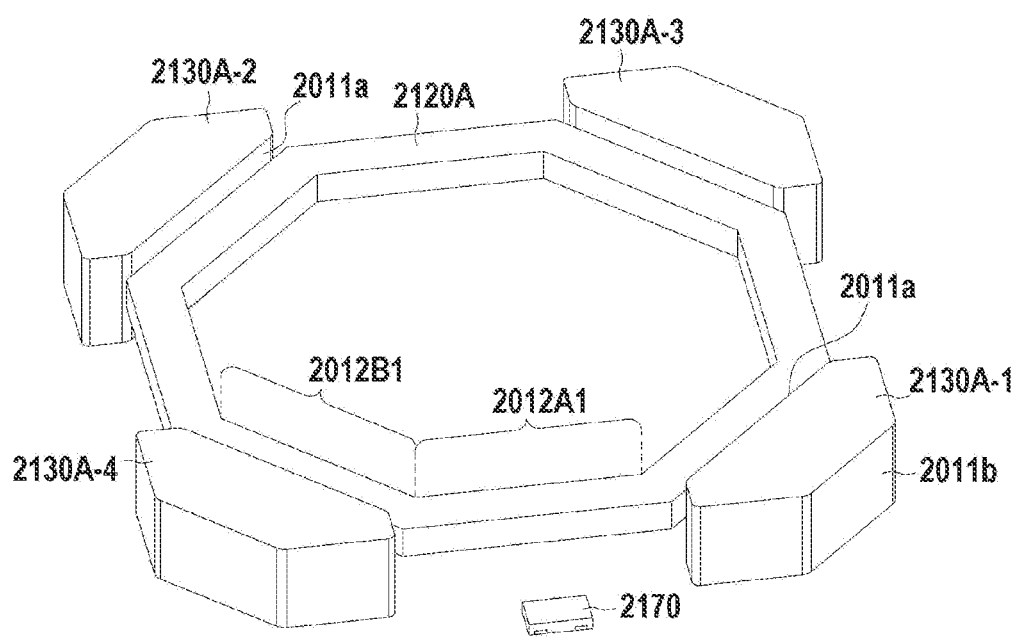
FIG. 42 shows an disposement of magnet units, a coil, and a position sensor according to another embodiment.

FIG. 42 shows an disposement of magnet units, a coil, and a position sensor 2170 according to another embodiment. FIG. 42 may be a modified embodiment of FIG. 36. In the embodiment of FIG. 42, the sensing coil 2180 is omitted from FIG. 36, and the description of FIG. 36 may be applied or applied mutatis mutandis.

The lens driving devices 2100 and 2100-1 according to the above-described embodiments may be implemented in various fields, for example, as a camera module or an optical apparatus, or may be used in a camera module or an optical apparatus.

For example, the lens driving devices 2100 and 2100-1 according to the present embodiment may be comprised in optical apparatuses being used for forming an image of an object in space by using the characteristics of light such as reflection, refraction, absorption, interference, and diffraction, or increasing the visual acuity of the eyes, or recording the image by the lens and reproducing thereof, or optical measurement, image propagation or transmission, or the like. For example, the optical apparatus according to the present embodiment may comprise a smartphone and a portable terminal equipped with a camera.

Figure 43:
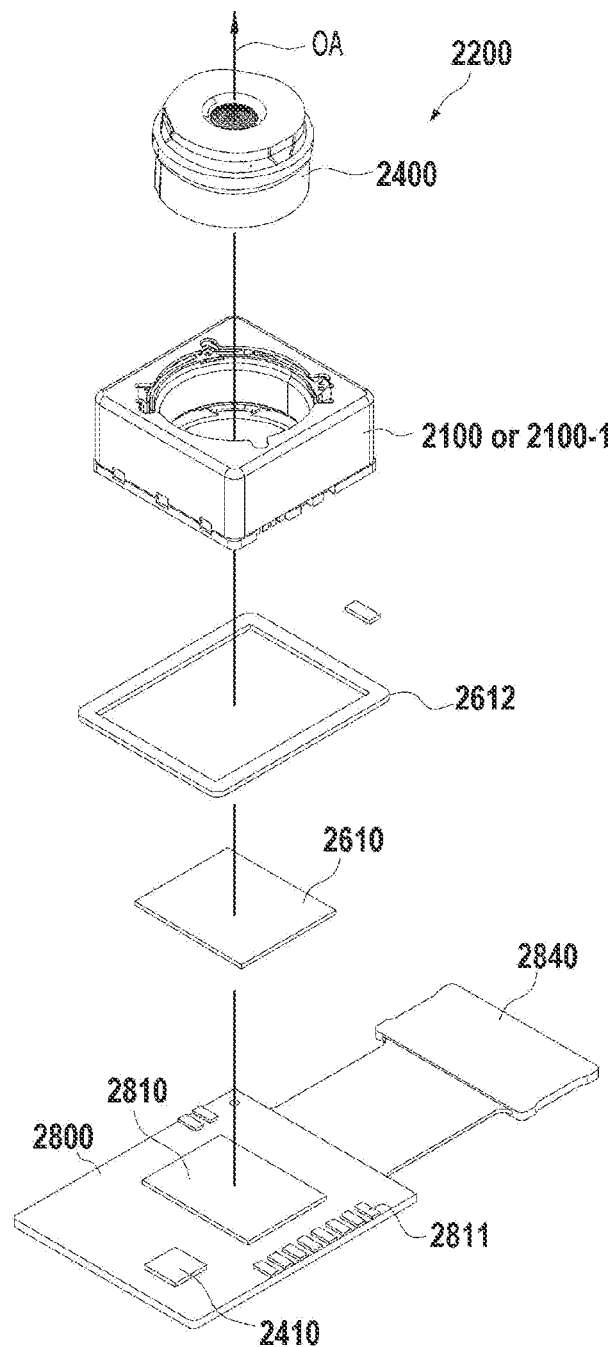
FIG. 43 is an exploded perspective view of a camera module according to a second embodiment of the present invention.

FIG. 43 is an exploded perspective view of a camera module 2200 according to a second embodiment of the present invention.

Referring to FIG. 43, the camera module may comprise a lens module 2400, a lens driving device 2100, an adhesive member 2612, a filter 2610, a circuit board 2800, an image sensor 2810, a control unit 2410, and a connector 840. The camera module may comprise a lens driving device 2100-1 instead of the lens driving device 2100.

The lens module 2400 may comprise a lens or a lens barrel, and may be mounted or coupled to the bobbin 2110 of the lens driving device 2100.

For example, the lens module 2400 may comprise one or more lenses and a lens barrel accommodating the one or more lenses. However, one configuration of the lens module is not limited to the lens barrel, and any holder structure capable of supporting one or more lenses may be used. The lens module may be coupled to the lens driving device 2100 and move together with the lens driving devices 2100 and 2100-1.

For example, the lens module 2400 may be screw-coupled to the lens driving device 2100, as an example. The lens module 2400 may be coupled to the lens driving device 2100 by an adhesive (not shown), as an example. Meanwhile, light passing through the lens module 2400 passes through the filter 2610 and may be irradiated to the image sensor 2810.

The adhesive member 2612 may couple or attach the base 2210 of the lens driving device 2100 to the circuit board 2800. For example, the adhesive member 2612 may be an epoxy, a thermosetting adhesive, an ultraviolet curable adhesive, or the like.

The filter 2610 may play the role of blocking light of a specific frequency band in the light passing through the lens barrel 2400 from being incident on the image sensor 2810. The filter 2610 may be an infrared cut filter, but is not limited thereto. At this time, the filter 2610 may be disposed parallel to the x-y plane.

At this time, the infrared cut filter may be formed of a film material or a glass material. As an example, the infrared filter may be formed by coating an infrared blocking coating material on a flat optical filter such as a cover glass for protecting an imaging surface or a cover glass.

The filter 2610 may be disposed below the base 2210 of the lens driving device 2100.

For example, the base 2210 of the lens driving device 2100 may have a seating portion for seating the filter 2610 on a lower surface thereof. In another embodiment, a separate sensor base for mounting the filter 2610 may be provided.

The circuit board 2800 may be disposed at a lower portion of the lens driving device 2100, and the image sensor 2810 may be mounted on the circuit board 2800. The image sensor 2810 may receive an image comprised in light incident through the lens driving device 2100 and convert the received image into an electrical signal.

The image sensor 2810 may be positioned so that the lens module 2400 and the optical axis coincide. Through this, the image sensor may acquire the light passing through the lens module 2400. The image sensor 2810 may output the irradiated light as an image.

The circuit board 2800 may be electrically connected to the lens driving device 2100.

For example, the circuit board 2800 may be electrically connected to the coil 2120, the sensing coil 2180, and the position sensor 2170 of the lens driving device 2100.

For example, the circuit board 2800 may be provided with first to fourth terminals 2164-1 to 2164-4 of the lower elastic member 2160 of the lens driving device 2100, and terminals 2811 electrically connected to terminals P1 to P4 of the terminal part 2190.

For example, a driving signal may be provided to the position sensor 2170 through the circuit board 2800, and an output signal of the position sensor 2170 may be transmitted to the circuit board 2800. For example, the output signal of the position sensor 2170 may be received by the control unit 2410, but is not limited thereto, and may be transmitted to the control unit 2780 of the terminal 2200A through the terminal 2811.

In addition, for example, a driving signal may be provided to the coil 2120 through the circuit board 2800, and a driving signal may be provided to the sensing coil 2180.

The circuit board 2800 is illustrated as comprising eight terminals, but is not limited thereto, and in another embodiment, the circuit board 2800 may comprise a plurality of terminals for AF driving, for example, two or more terminals.

The filter 2610 and the image sensor 2810 may be disposed spaced apart to face each other in a first direction.

The connector 2840 is electrically connected to the circuit board 2800 and may be provided with a port for electrically connecting to an external device.

The control unit 2410 may control AF driving of the lens driving device 2100, but is not limited thereto, and AF driving of the lens driving device may be controlled by the control unit 2780 of the terminal 2200A.

In addition, the camera module 2200 may further comprise a motion sensor for outputting rotational angular velocity information due to the movement of the camera module 2200.

Figure 44:
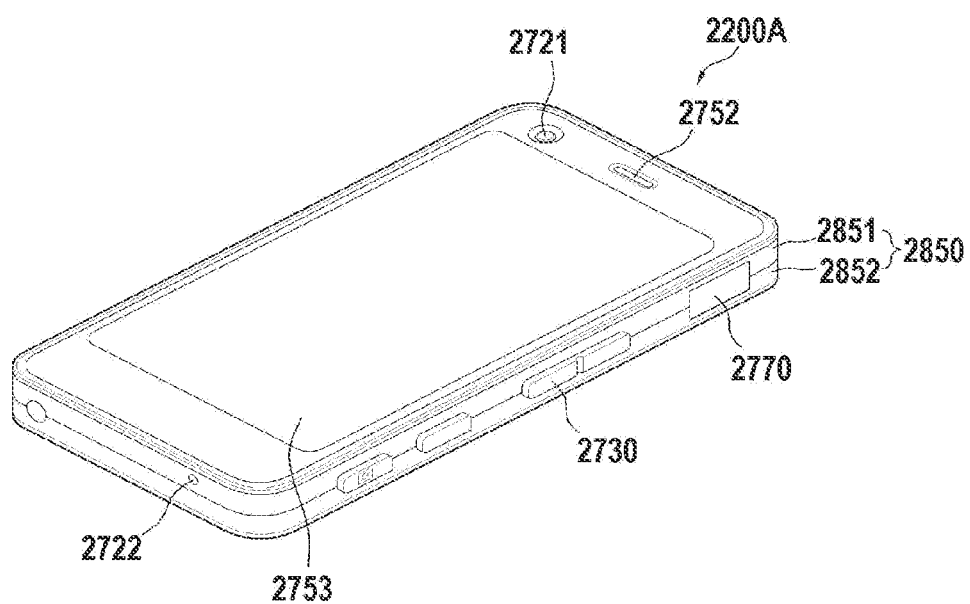
FIG. 44 is a perspective view of a portable terminal according to a second embodiment of the present invention.
Figure 45:
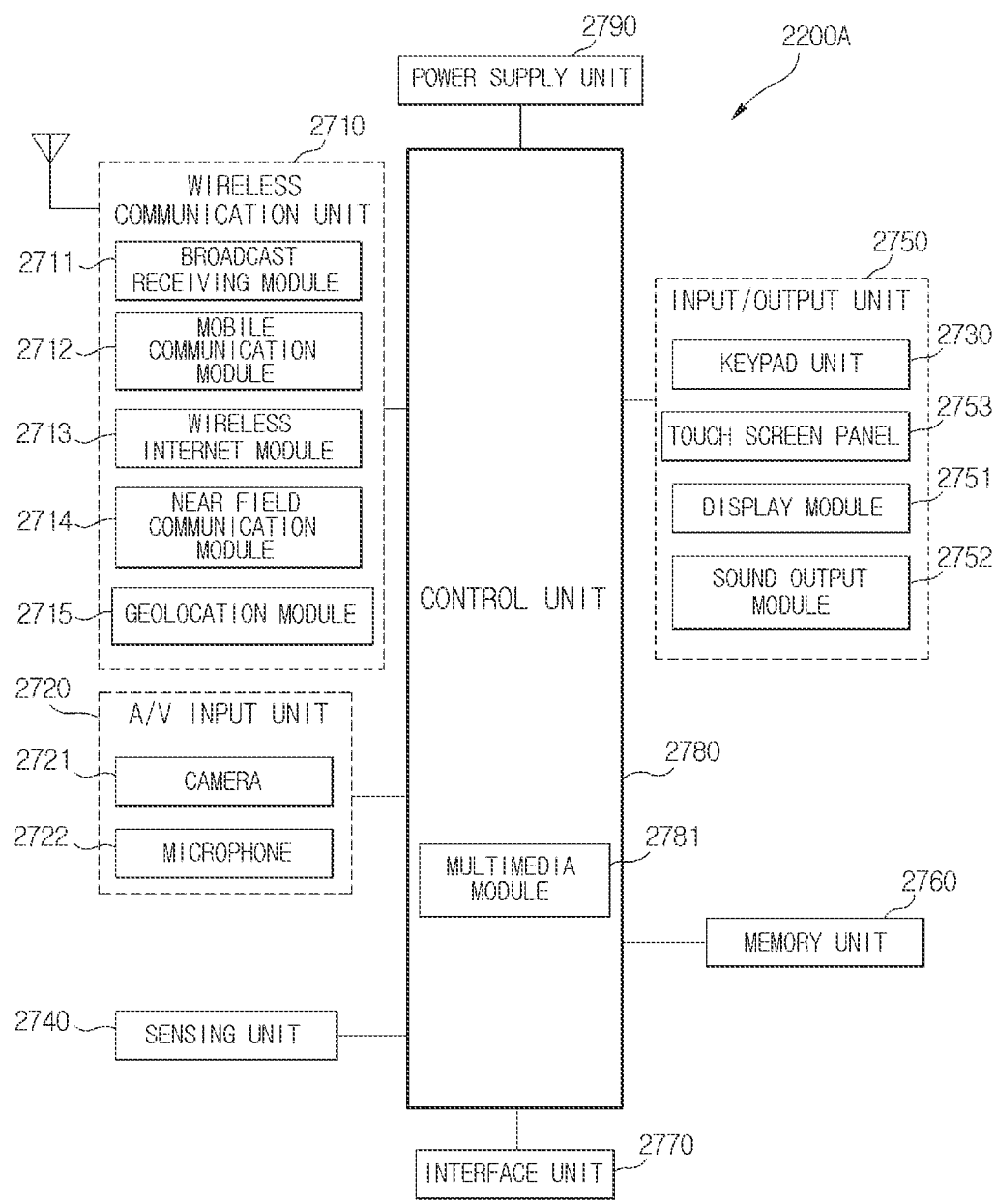
FIG. 45 is a block diagram of a portable terminal illustrated in FIG. 44.

FIG. 44 is a perspective view of a portable terminal 2200A according to a second embodiment of the present invention, and FIG. 45 is a block diagram of a portable terminal 2200A illustrated in FIG. 44.

Referring to FIGS. 44 and 45, the portable terminal 2200A (hereinafter referred to as "terminal") may comprise a body 2850, a wireless communication unit 2710, an A/V input unit 2720, a sensing unit 2740, an input/output unit 2750, a memory unit 2760, an interface unit, a control unit 2780, and a power supply 2790.

The body 2850 illustrated in FIG. 44 has a bar shape, but is not limited thereto, and may have various structures such as a slide type, a folder type, a swing type, a swivel type, and the like in which two or more sub-bodies are coupled to be movable relative to each other.

The body 2850 may comprise a case (casing, housing, cover, and the like) forming an outer appearance. For example, the body 2850 may be divided into a front case 2851 and a rear case 2852. Various electronic components of the terminal may be embedded in a space formed between the front case 2851 and the rear case 2852.

The wireless communication unit 2710 may be composed of one or more modules that enable wireless communication between the terminal 2200A and the wireless communication system or between the terminal 2200A and the network in which the terminal 2200A is located. For example, the wireless communication unit 2710 may be composed of a broadcast reception module 2711, a mobile communication module 2712, a wireless Internet module 2713, a short-range communication module 2714, and a location information module 2715.

The A/V input unit 2720 is for inputting an audio signal or a video signal, and may comprise a camera 2721, a microphone 2722, and the like.

The camera 2721 may comprise a camera module 2200 according to an embodiment.

The sensing unit 2740 may generate a sensing signal for controlling the operation of the terminal 2200A by detecting the current state of the terminal 2200A, such as the opening/closing state of the terminal 2200A, the position of the terminal 2200A, the presence or absence of user contact, the orientation of the terminal 2200A, acceleration/deceleration of the terminal 2200A, and the like. For example, when the terminal 2200A is in the form of a slide phone, it is possible to sense whether the slide phone is opened or closed. In addition, it is responsible for sensing functions related to whether the power supply unit 2790 is supplied with power, whether the interface unit 2770 is coupled to an external device, and the like.

The input/output unit 2750 is for generating input or output in relation to the sense of sight, hearing, or touch. The input/output unit 2750 may generate input data for operation control of the terminal 2200A, and in addition, may display information processed by the terminal 2200A.

The input/output unit 2750 may comprise a keypad unit 2730, a display module 2751, a sound output module 2752, and a touch screen panel 2753. The keypad unit 2730 may generate input data in response to a keypad input.

The display module 2751 may comprise a plurality of pixels whose color changes according to an electrical signal. For example, the display module 2751 may comprise at least one among a liquid crystal display, a thin film transistor-liquid crystal display, an organic light-emitting diode, a flexible display, and a 3D display.

The sound output module 2752 may output audio data received from the wireless communication unit 2710 in a call signal reception, a call mode, a recording mode, a voice recognition mode, or a broadcast reception mode, and the like, or may output audio data stored in the memory unit 2760.

The touch screen panel 2753 may convert a change in capacitance generated due to a user's touch on a specific area of the touch screen into an electrical input signal.

The memory unit 2760 may store a program for processing and control of the control unit 2780, and input/output data (for example, phone book, message, audio, still image, photo, video, and the like) may be temporarily stored. For example, the memory unit 2760 may store an image photographed by the camera 2721, for example, a photo, or a video.

The interface unit 2770 serves as a passage for connecting to an external device connected to the terminal 2200A. The interface unit 2770 receives data from an external device, receives power and transmits it to each component inside the terminal 2200A, or transmits data inside the terminal 2200A to an external device. For example, the interface unit 2770 may comprise a wired/wireless headset port, an external charger port, a wired/wireless data port, a memory card port, a port for connecting a device having an identification module, and an audio input/output (I/O) port, video input/output (I/O) port, an earphone port, and the like.

The control unit 2780 may control the overall operation of the terminal 2200A. For example, the control unit 2780 may perform related control and processing for voice call, data communication, video call, and the like.

The control unit 2780 may comprise a multimedia module 2781 for playing multimedia. The multimedia module 2781 may be implemented in the control unit 2780 or may be implemented separately from the control unit 2780.

The control unit 2780 may perform a pattern recognition process capable of recognizing a handwriting input or a drawing input performed on the touch screen as characters and images, respectively.

The power supply unit 2790 may receive external power or internal power under the control of the control unit 2780 to supply power required for operation of each component.

The lens driving device according to the second embodiment of the present invention may comprise the sensing structure of the first embodiment of the present invention. In more detail, the lens driving device according to the second embodiment of the present invention may comprise a sensing coil 180 and a position sensor 170 according to the first embodiment of the present invention. The lens driving device according to the second embodiment of the present invention may comprise a substrate 3600 and a lower elastic part material 3520 according to the third embodiment of the present invention.

Hereinafter, a configuration of a lens driving device according to a third embodiment of the present invention will be described with reference to the drawings.

Figure 46:
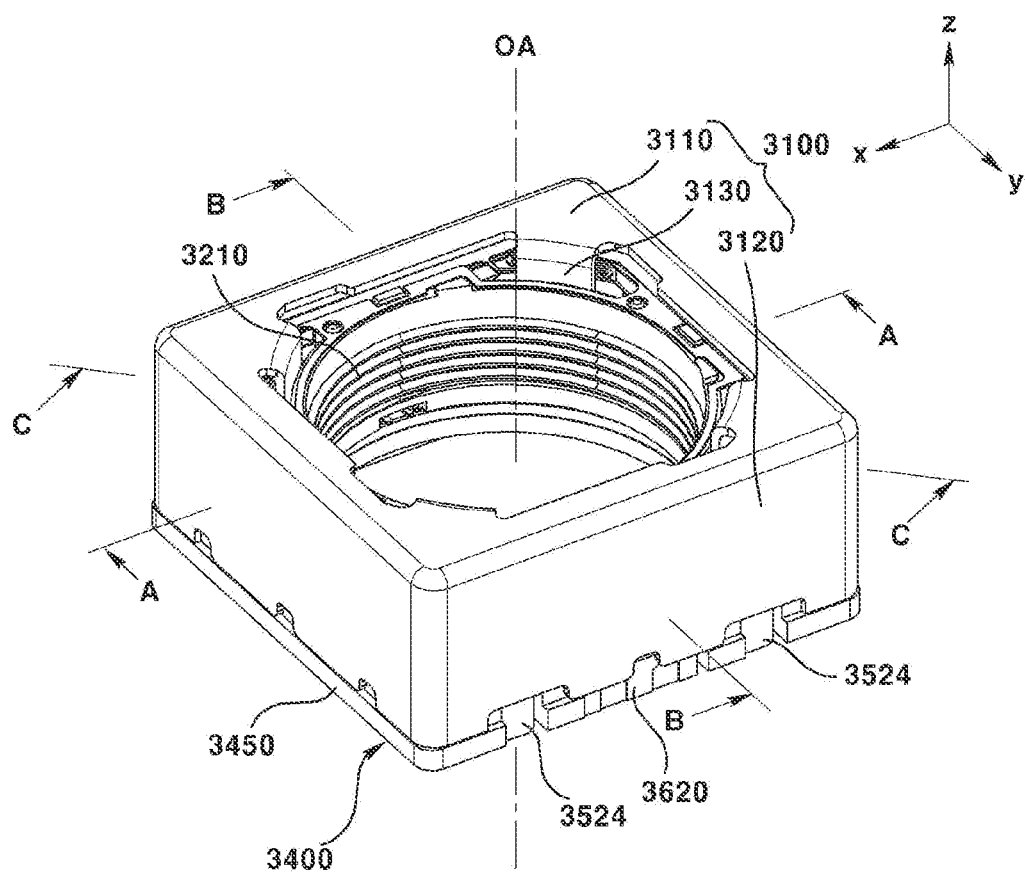
FIG. 46 is a perspective view of a lens driving device according to a third embodiment of the present invention.
Figure 47:
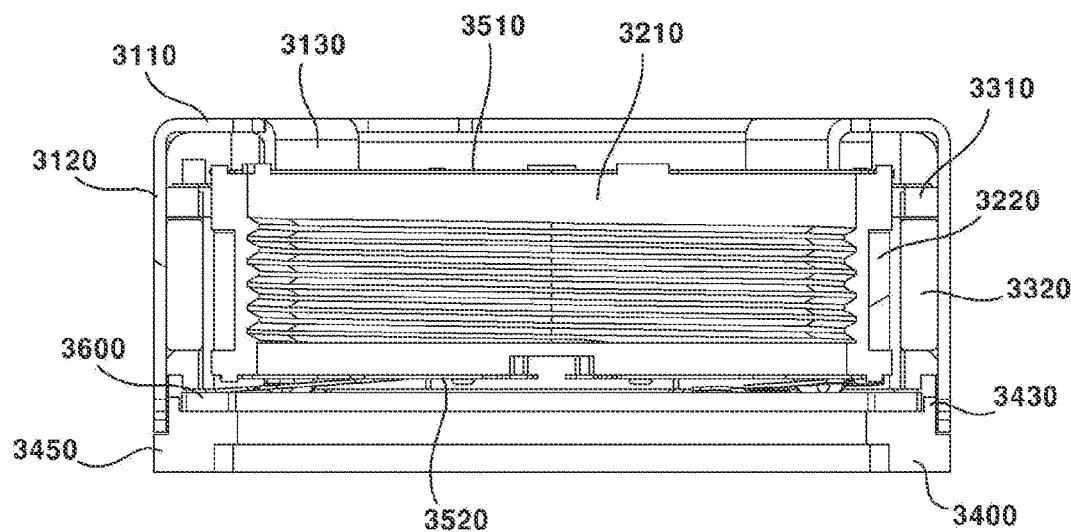
FIG. 47 is a cross-sectional view taken along line A-A of FIG. 46.
Figure 48:
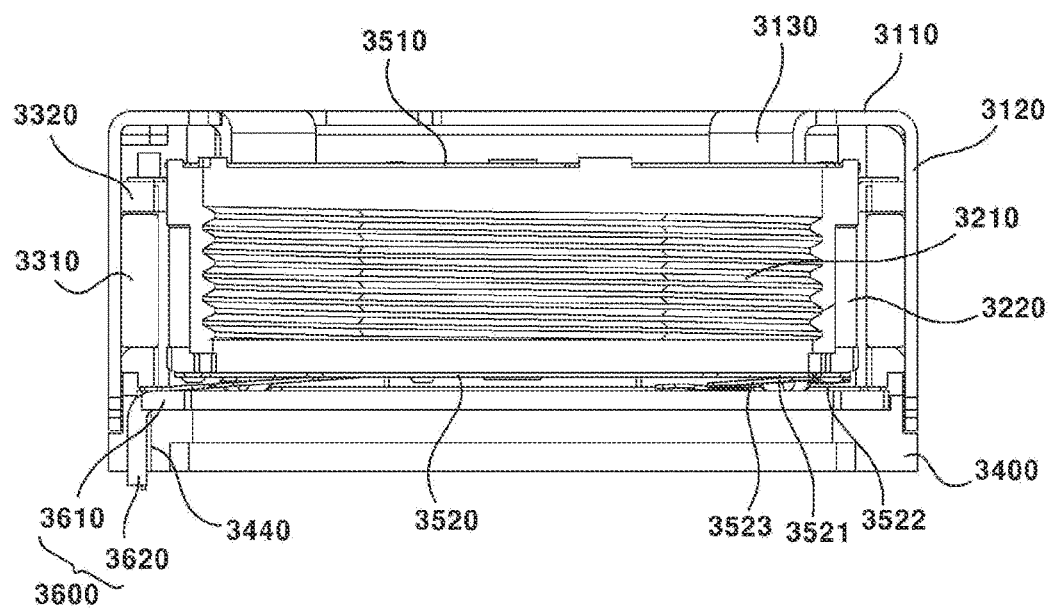
FIG. 48 is a cross-sectional view taken along line B-B of FIG. 46.
Figure 49:
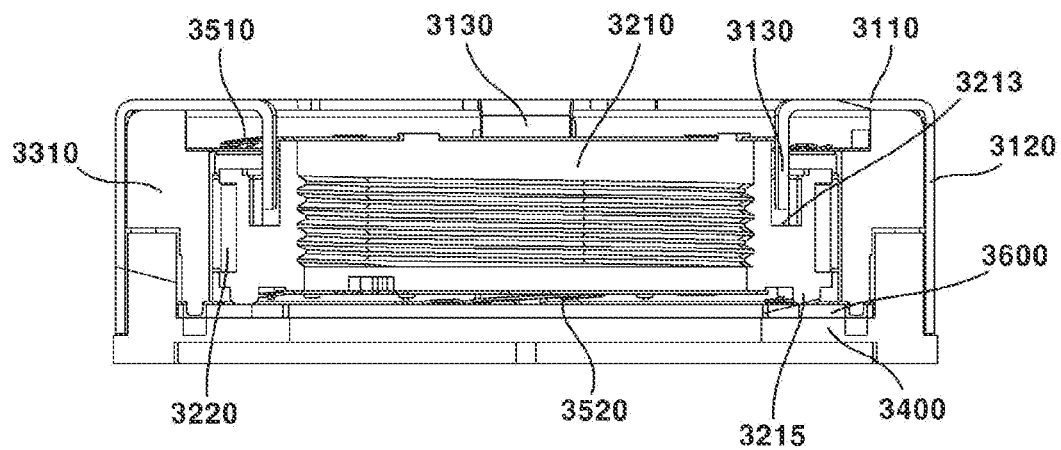
FIG. 49 is a cross-sectional view taken along line C-C of FIG. 46.
Figure 50:
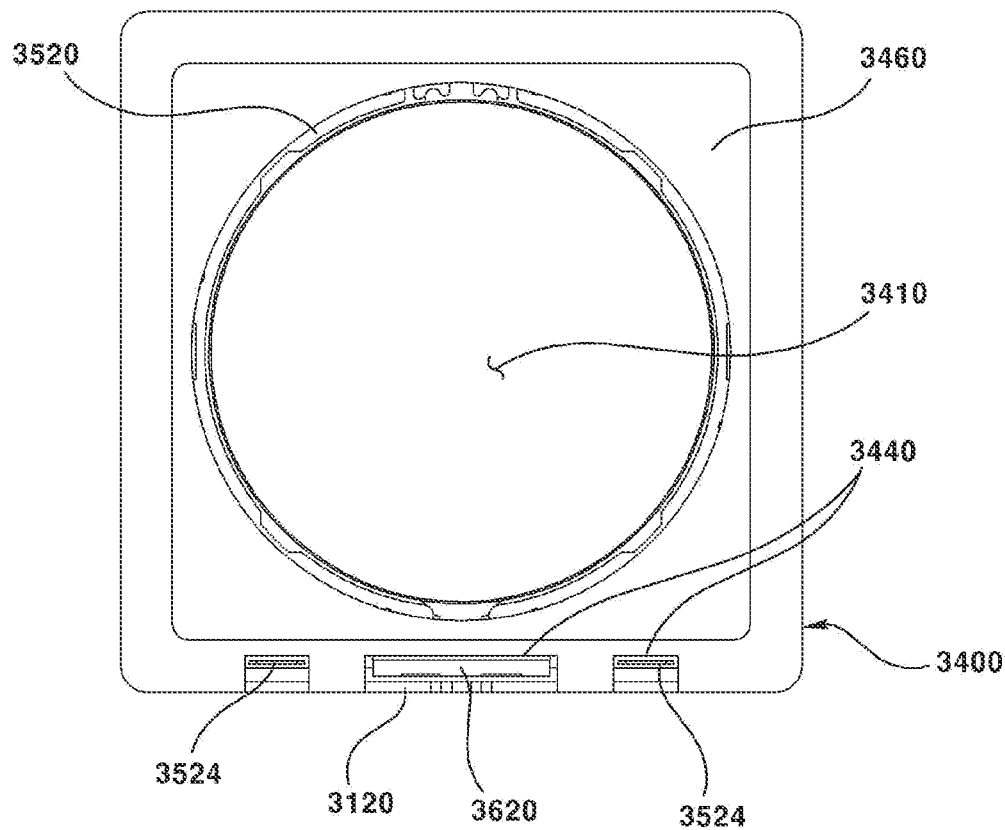
FIG. 50 is a bottom view of a lens driving device according to a third embodiment of the present invention.
Figure 51:
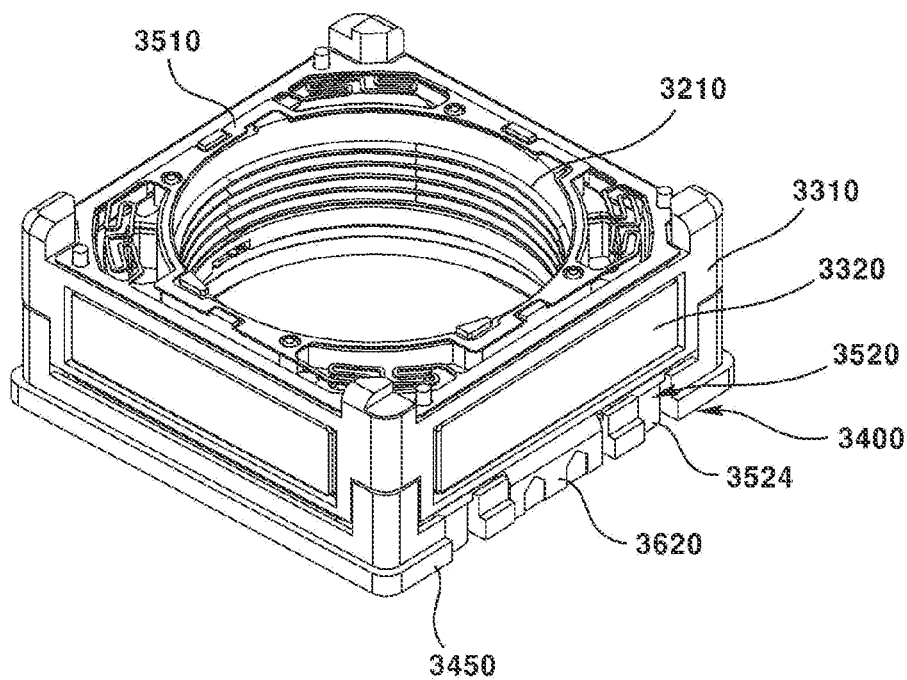
FIG. 51 is a perspective view of a state in which a cover is removed in FIG. 46.
Figure 52:
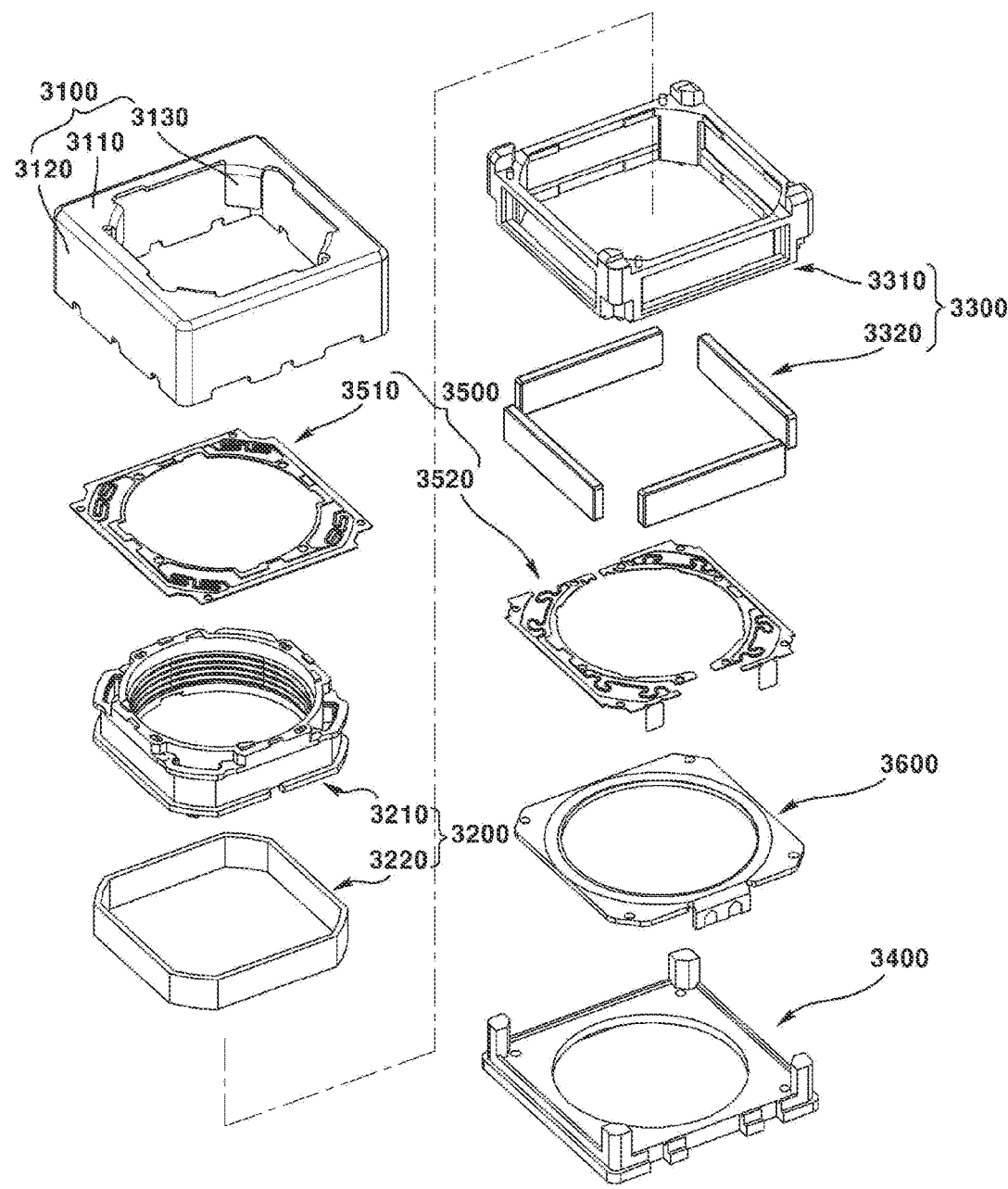
FIG. 52 is an exploded perspective view of a lens driving device according to a third embodiment of the present invention.
Figure 53:
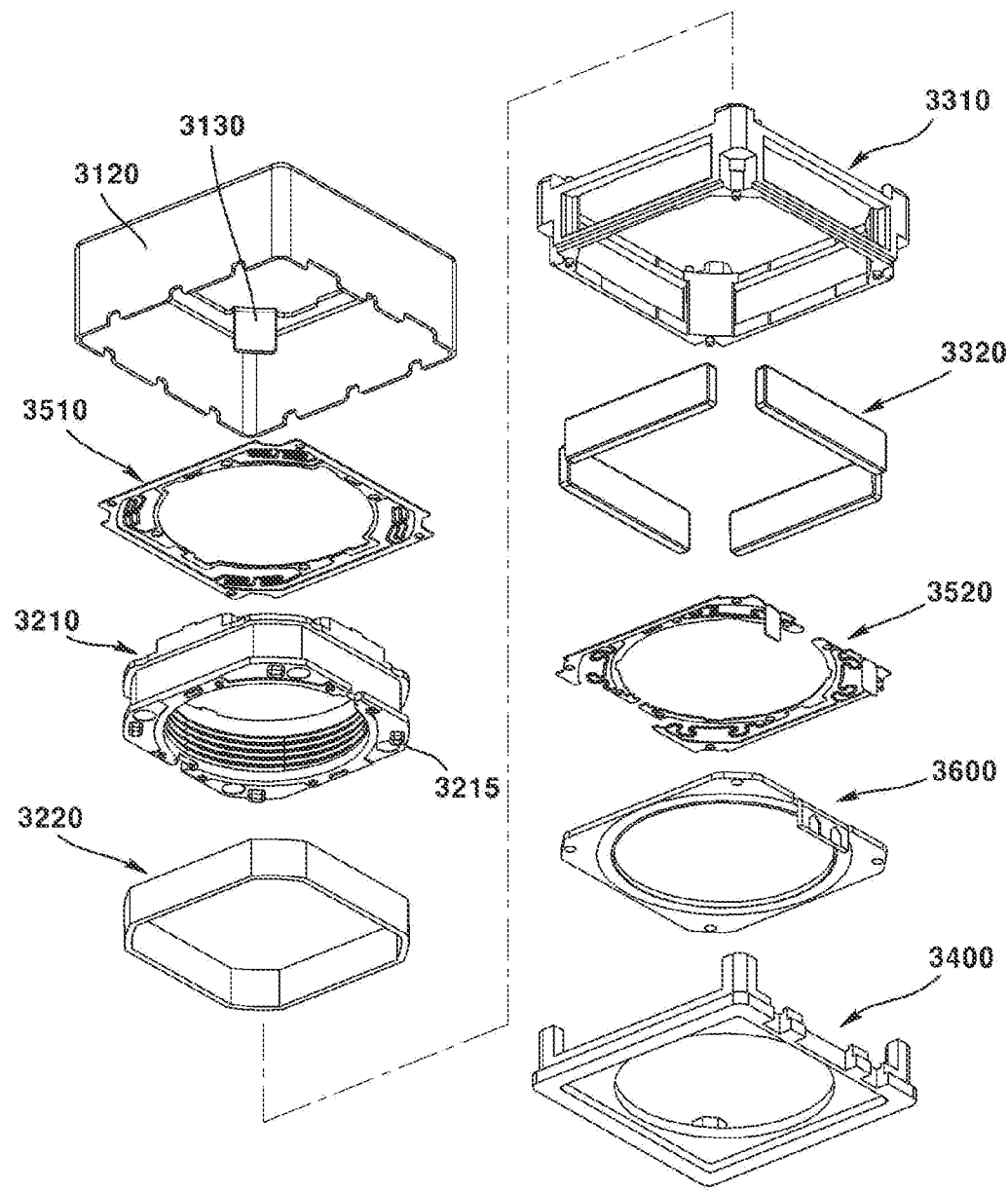
FIG. 53 is an exploded perspective view of a lens driving device according to a third embodiment of the present invention, viewed from a different direction from that of FIG. 52.
Figure 54:
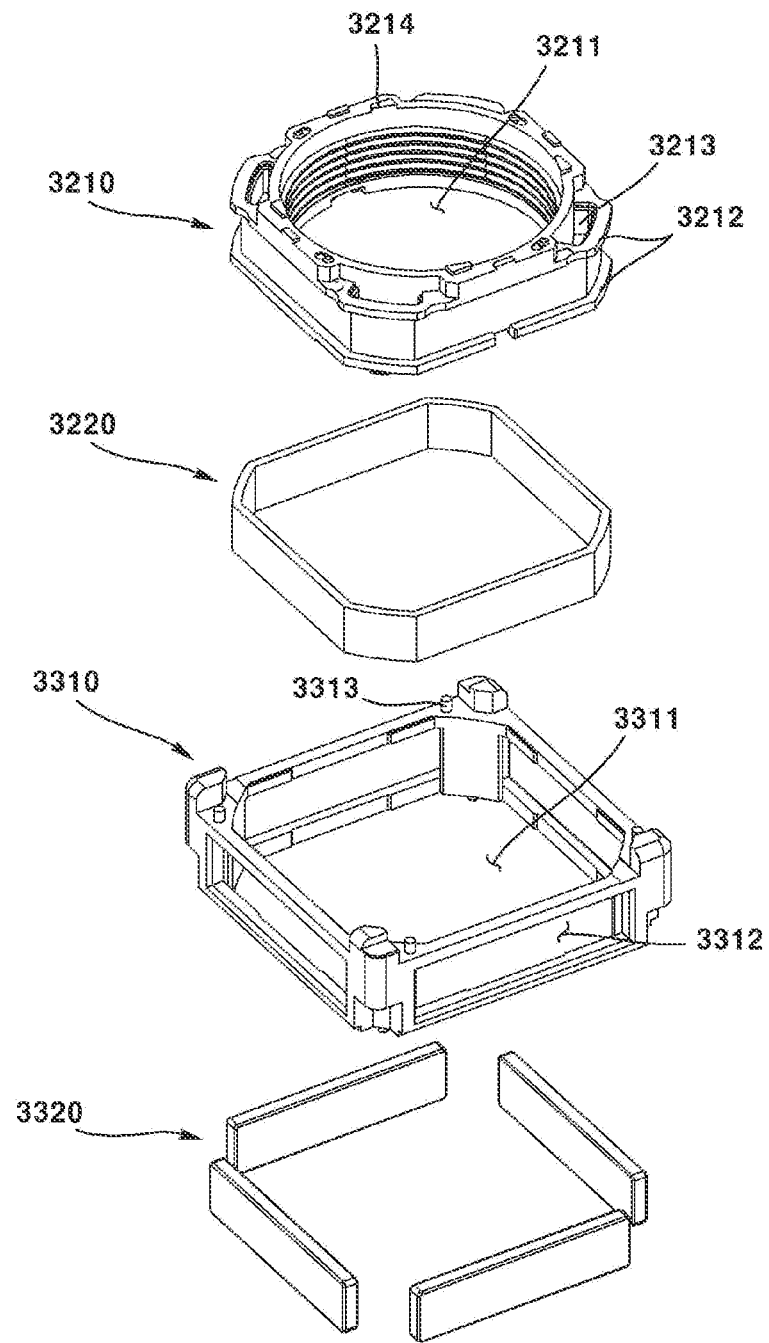
FIG. 54 is an exploded perspective view illustrating a mover and a stator according to a third embodiment of the present invention.
Figure 55:
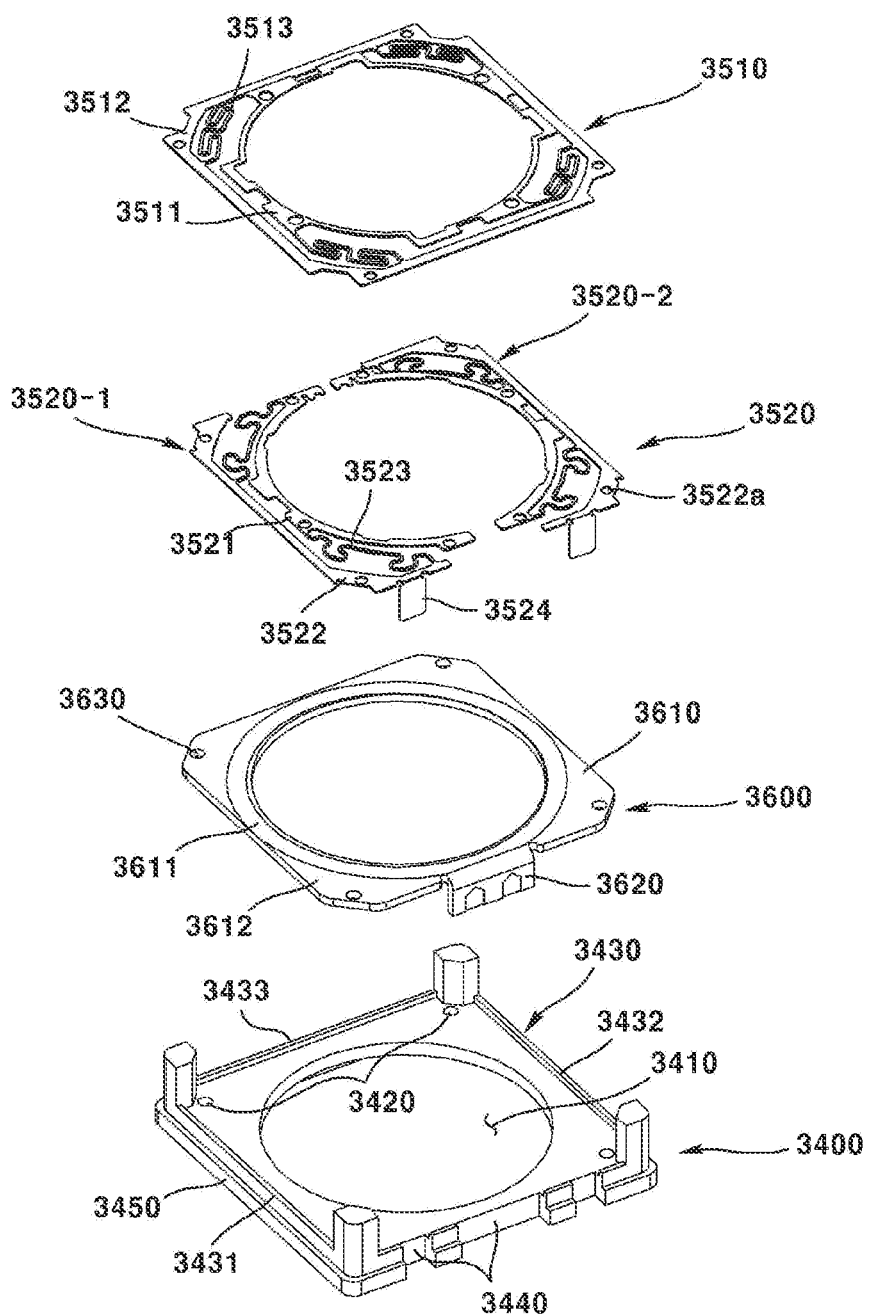
FIG. 55 is an exploded perspective view showing a base, an elastic member, and a substrate according to a third embodiment of the present invention.
Figure 56:
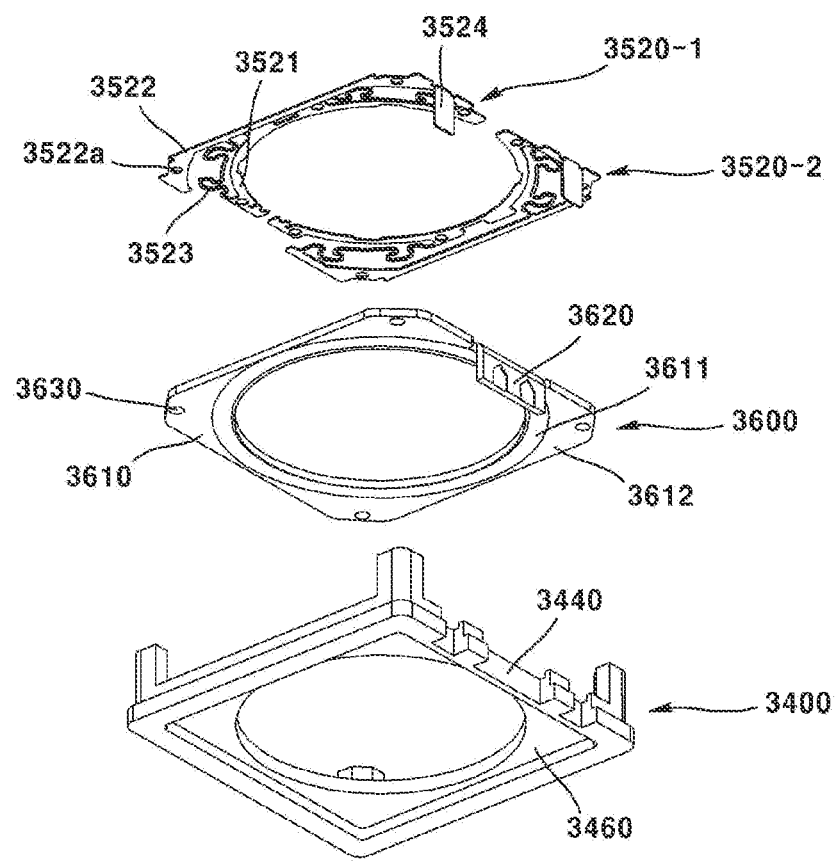
FIG. 56 is an exploded perspective view of a part of a configuration according to a third embodiment of the present invention as viewed from a direction different from that of FIG. 55.
Figure 57A:
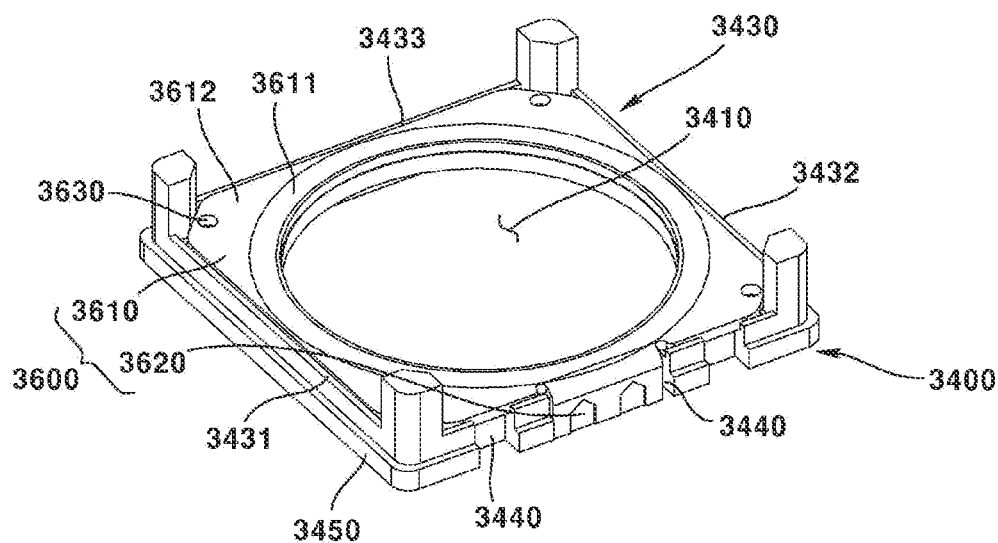
FIG. 57a is a perspective view illustrating a coupling state between a base and a substrate according to a third embodiment of the present invention.
Figure 57B:
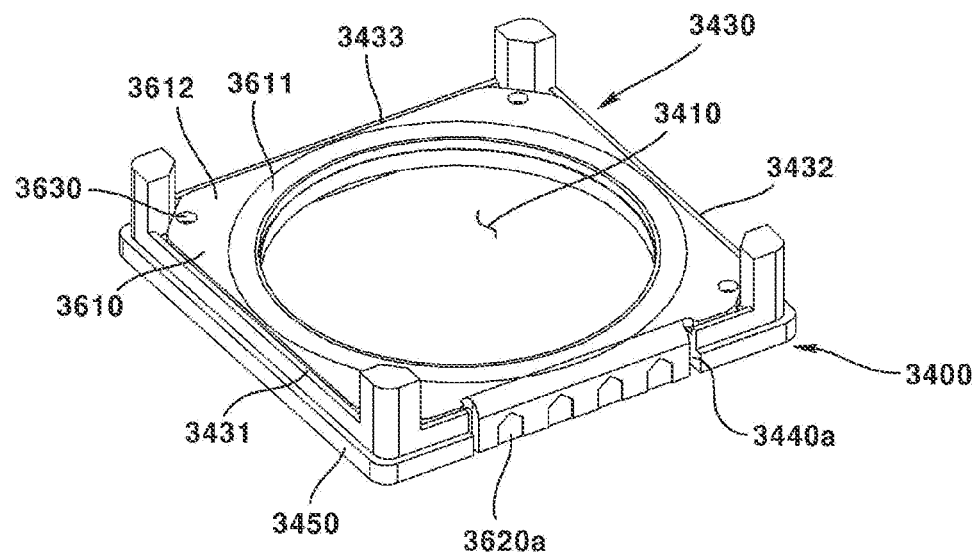
FIG. 57b is a perspective view illustrating a coupling state between a base and a substrate according to a modified example.
Figure 58:
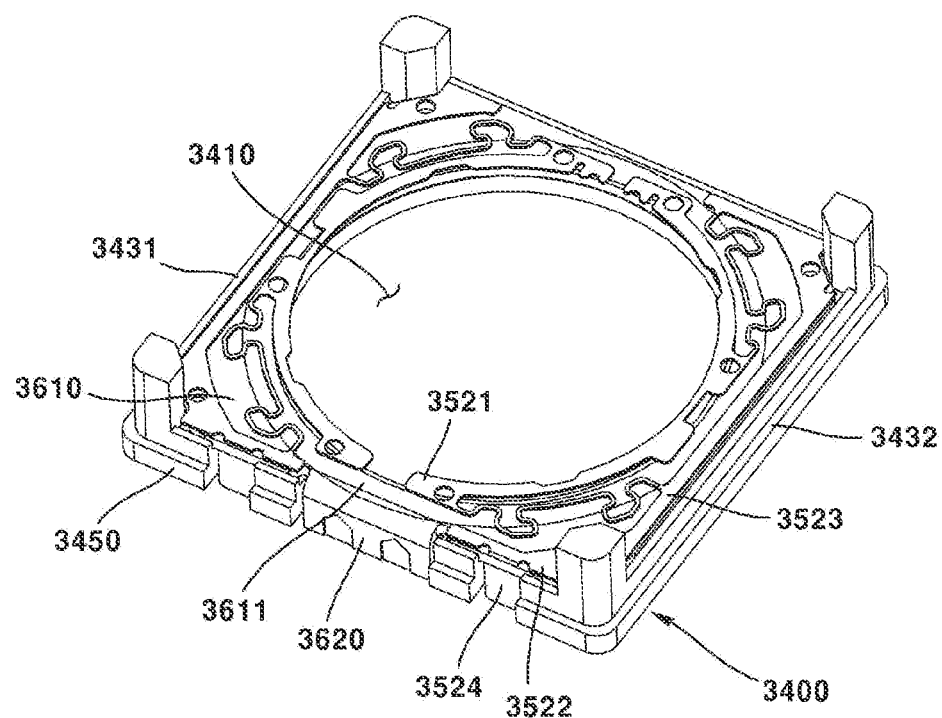
Figure 59:
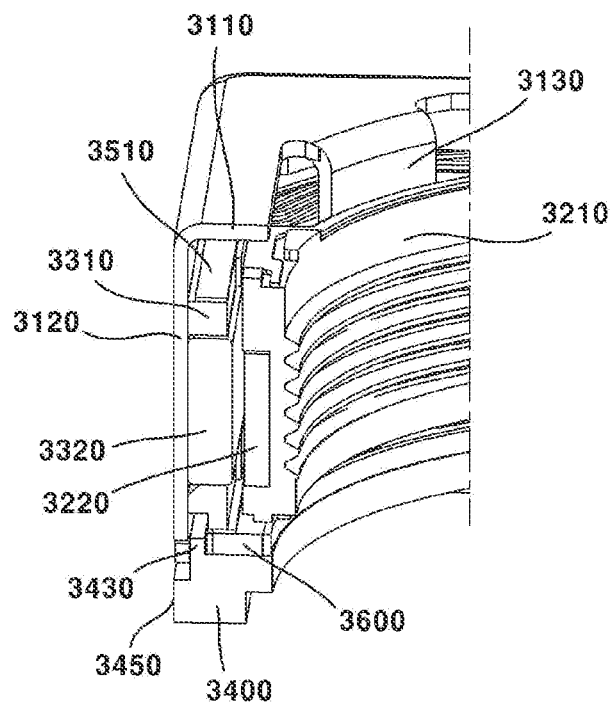
FIG. 59 is a cross-sectional perspective view of a part of a lens driving device according to a third embodiment of the present invention.

FIG. 46 is a perspective view of a lens driving device according to a third embodiment of the present invention, FIG. 47 is a cross-sectional view taken along line A-A of FIG. 46, FIG. 48 is a cross-sectional view taken along line B-B of FIG. 46, FIG. 49 is a cross-sectional view taken along line C-C of FIG. 46, FIG. 50 is a bottom view of a lens driving device according to a third embodiment of the present invention, FIG. 51 is a perspective view of a state in which a cover is removed in FIG. 46, FIG. 52 is an exploded perspective view of a lens driving device according to a third embodiment of the present invention, FIG. 53 is an exploded perspective view of a lens driving device according to a third embodiment of the present invention, viewed from a different direction from that of FIG. 52, FIG. 54 is an exploded perspective view illustrating a mover and a stator according to a third embodiment of the present invention, FIG. 55 is an exploded perspective view showing a base, an elastic member, and a substrate according to a third embodiment of the present invention, FIG. 56 is an exploded perspective view of a part of a configuration according to a third embodiment of the present invention as viewed from a direction different from that of FIG. 55, FIG. 57a is a perspective view illustrating a coupling state between a base and a substrate according to a third embodiment of the present invention, FIG. 57b is a perspective view illustrating a coupling state between a base and a substrate according to a modified example, FIG. 58 is a perspective view illustrating a state in which a lower elastic member is additionally coupled to FIG. 57a, and FIG. 59 is a cross-sectional perspective view of a part of a lens driving device according to a third embodiment of the present invention.

The lens driving device 3010 may be a voice coil motor (VCM). The lens driving device 3010 may be a lens driving motor. The lens driving device 3010 may be a lens driving motor. The lens driving device 3010 may be a lens driving actuator. In the present embodiment, the lens driving device 3010 may comprise a CLAF actuator or a CLAF module. For example, a state in which a lens, an image sensor 3060, and a printed circuit board 3050 are assembled to the lens driving device 3010 may be understood as a camera module.

The lens driving device 3010 may comprise a cover 3100. The cover 3100 may cover the housing 3310. The cover 3100 may be coupled to the base 3400. An internal space may be formed between the cover 3100 and the base 3400. The cover 3100 may accommodate the housing 3310 therein. The cover 3100 may accommodate the bobbin 3210 therein. The cover 3100 may form the outer appearance of the camera module. The cover 3100 may have a hexahedral shape with an open lower surface. The cover 3100 may be a non-magnetic material. The cover 3100 may be formed of a metal material. The cover 3100 may be formed of a metal plate. The cover 3100 may be connected to the ground portion of the printed circuit board. Through this, the cover 3100 may be grounded. The cover 3100 may block electromagnetic interference (EMI). At this time, the cover 3100 may be referred to as a 'shield can' or an 'EMI shield can'.

The cover 3100 may comprise an upper plate 3110. The cover 3100 may comprise a side plate 3120. The side plate 3120 may be extended from the upper plate 3110. The cover 3100 may comprise an upper plate 3110 and a side plate 3120 being extended downward from an outer periphery or edge of the upper plate 3110. The lower end of the side plate 3120 of the cover 3100 may be disposed on a step 3450 of the base 3400. The inner surface of the side plate 3120 of the cover 3100 may be fixed to the base 3400 by an adhesive.

The cover 3100 may comprise a plurality of side plates. The cover 3100 may comprise a plurality of side plates and a plurality of corners formed by the plurality of side plates. The cover 3100 may comprise four side plates and four corners formed between the four side plates. The cover 3100 may comprise a first side plate, a second side plate disposed opposite to the first side plate, a third side plate, and a fourth side plate disposed opposite to each other between the first side plate and the second side plate. The cover 3100 may comprise first to fourth corners. The cover 3100 may comprise a first corner, a second corner disposed opposite to the first corner, and a third corner and a fourth corner disposed opposite to each other.

The cover 3100 may comprise an inner yoke 3130. The inner yoke 3130 may be extended downward from the inner circumference of the upper plate 3110. The inner yoke 3130 may be disposed in the side plate 3120. At least a portion of the inner yoke 3130 may be disposed in a groove 3213 of the bobbin 3210. The inner yoke 3130 may be formed to prevent rotation of the bobbin 3210. The inner yoke 3130 may comprise a plurality of inner yokes. The inner yoke 3130 may comprise four inner yokes. The four inner yokes may be respectively formed at four corners of the cover 3100.

The lens driving device 3010 may comprise a mover 3200. The mover 3200 may be coupled to a lens. The mover 3200 may be connected to the stator 3300 through an elastic part material 3500. The mover 3200 may move through interaction with the stator 3300. At this time, the mover 3200 may move integrally with the lens. Meanwhile, the mover 3200 may move during AF driving. At this time, the mover 3200 may be referred to as an 'AF mover'.

The lens driving device 3010 may comprise a bobbin 3210. The bobbin 3210 may be disposed inside the housing 3310. The bobbin 3210 may be movably coupled to the housing 3310. The bobbin 3210 may move in the optical axis direction against the housing 3310. The bobbin 3210 may be disposed inside the cover 3100. The bobbin 3210 may be disposed on the base 3400.

The bobbin 3210 may comprise a hole 3211. The hole 3211 may be a hollow hole. A lens may be coupled to the hole 3211. A screw thread may be formed on the inner circumferential surface of the hole 3211 of the bobbin 3210. Or, the inner circumferential surface of the hole 3211 of the bobbin 3210 may be formed as a curved surface without a screw thread. The bobbin 3210 may comprise a first protrusion coupled to an upper elastic part material 3510. The first protrusion of the bobbin 3210 may be inserted into and coupled to a corresponding hole of the upper elastic part material 3510. The bobbin 3210 may comprise a second protrusion coupled to a lower elastic part material 3520. The second protrusion of the bobbin 3210 may be inserted into and coupled to the corresponding hole of the lower elastic part material 3520.

The bobbin 3210 may comprise a rib 3212. The rib 3212 may be protruded from a side surface of the bobbin 3210. The rib 3212 may fix the first coil 3220. The rib 3212 may comprise an upper rib being protruded from an upper portion of the bobbin 3210 and a lower rib being protruded from a lower portion of the bobbin 3210. The first coil 3220 may be wound and fixed between the upper rib and the lower rib.

The bobbin 3210 may comprise a groove 3213. The groove 3213 may be an inner yoke accommodating groove.

At least a portion of the inner yoke 3130 of the cover 3100 may be disposed in the groove 3213. The groove 3213 may be formed by being recessed in the upper surface of the bobbin 3210. The width of the groove 3213 may be slightly larger than the width of the inner yoke 3130. Through the aforementioned disposement structure, when the bobbin 3210 rotates, the bobbin 3210 is caught by the inner yoke 3130 and the bobbin 3210 can be prevented from being rotated.

The bobbin 3210 may comprise an upper stopper 3214. The upper stopper 3214 may be protruded from an upper surface of the bobbin 3210. The upper surface of the upper stopper 3214 may form an upper end of the bobbin 3210. Through this, when the bobbin 3210 moves upward as much as possible, the upper surface of the upper stopper 3214 may be in contact with the upper plate 3110 of the cover 3100. The upper stopper 3214 of the bobbin 3210 may be overlapped with the upper plate 3110 of the cover 3100 in the optical axis direction.

The bobbin 3210 may comprise a lower stopper 3215. The lower stopper 3215 may be formed to be protruded from a lower surface of the bobbin 3210. The lower surface of the lower stopper 3215 may form a lower end of the bobbin 3210. Through this, when the bobbin 3210 moves downward as much as possible, the lower surface of the lower stopper 3215 may contact the base 3400. The lower stopper 3215 of the bobbin 3210 may be overlapped with the base 3400 in the optical axis direction.

The bobbin 3210 may be coupled to any one or more of the elastic part material 3500 and the first coil 3220 by an adhesive. At this time, the adhesive may be an epoxy that is cured by any one or more of heat, laser, and ultraviolet (UV) light.

The lens driving device 3010 may comprise a first coil 3220. The first coil 3220 may be an 'AF driving coil'. The first coil 3220 may be disposed on the bobbin 3210. The first coil 3220 may be disposed in contact with the bobbin 3210. The first coil 3220 may be disposed between the bobbin 3210 and the housing 3310. The first coil 3220 may be disposed on the outer circumference of the bobbin 3210. The first coil 3220 may be directly wound on the bobbin 3210. The first coil 3220 may face the magnet 3320. The first coil 3220 may electromagnetically interact with the magnet 3320. When a current is supplied to the first coil 3220 to form an electromagnetic field around the first coil 3220, the first coil 3220 is formed by electromagnetic interaction between the first coil 3220 and the magnet 3320. It can move against the magnet 3320.

The lens driving device 3010 may comprise a stator 3300. The stator 3300 may movably support the mover 3200. The stator 3300 may move the mover 3200 through interaction with the mover 3200. The stator 3300 may comprise a housing 3310 and a magnet 3320. However, the base 3400 and the cover 3100 may also be understood as the stator 3300.

The lens driving device 3010 may comprise a housing 3310. The housing 3310 may be disposed on an outer side of the bobbin 3210. The housing 3310 may accommodate at least a portion of the bobbin 3210. The housing 3310 may be disposed inside the cover 3100. The housing 3310 may be disposed between the cover 3100 and the bobbin 3210. The housing 3310 may be formed of a material different from that of the cover 3100. The housing 3310 may be formed of an insulating material. The housing 3310 may be formed of an injection-molded material. A magnet 3320 may be disposed in the housing 3310. The housing 3310 and the magnet 3320 may be coupled by an adhesive. An upper elastic part material 3510 may be coupled to an upper portion of the housing 3310. A lower elastic part material 3520 may be coupled to a lower portion of the housing 3310. The housing 3310 may be coupled to the elastic part material 3500 by heat fusion and/or adhesive.

The housing 3310 may comprise: first and second side portions disposed on opposite sides of each other; third and fourth side portions disposed on opposite sides of each other; a first corner portion connecting the first side portion and the third side portion; a second corner portion connecting the first side portion and the fourth side portion; a third corner portion connecting the second side portion and the fourth side portion; and a fourth corner portion connecting the second side portion and the third side portion.

The housing 3310 may comprise a first hole 3311. The first hole 3311 may be a hollow hole. The first hole 3311 may be formed by vertically penetrating through in the central portion of the housing 3310. A bobbin 3210 may be disposed in the first hole 3311 of the housing 3310.

The housing 3310 may comprise a second hole 3312. The second hole 3312 may be a 'magnet accommodating hole'. A magnet 3320 may be disposed in the second hole 3312. The second hole 3312 may be formed by being penetrated through a side portion of the housing 3310 in a direction perpendicular to the optical axis. As a modified embodiment, the second hole 3312 may be formed as a groove.

The housing 3310 may comprise a protrusion 3313. The protrusion 3313 may be formed to be protruded from an upper surface of the housing 3310. The protrusion 3313 may be coupled to the upper elastic part material 3500. The protrusion 3313 may be inserted into and coupled to the corresponding hole of the elastic part material 3500.

The housing 3310 may be coupled to any one or more among the cover 3100, the base 3400, the elastic part material 3500, and the magnet 3320 by an adhesive. At this time, the adhesive may be an epoxy that is cured by any one or more of heat, laser, and ultraviolet (UV) light.

The lens driving device 3010 may comprise a magnet 3320. The magnet 3320 may be a 'driving magnet'. The magnet 3320 may be disposed in the housing 3310. The magnet 3320 may be disposed between the first coil 3220 and the side plate 3120 of the cover 3100. The magnet 3320 may be disposed between the bobbin 3210 and the housing 3310. The magnet 3320 may face the first coil 3220. The magnet 3320 may electromagnetically interact with the first coil 3220. The magnet 3320 may be used for AF driving. The magnet 3320 may be disposed on a side portion of the housing 3310. At this time, the magnet 3320 may be formed of a flat magnet. The magnet 3320 may be formed in a flat plate shape. The magnet 3320 may be formed in a rectangular parallelepiped shape.

The magnet 3320 may comprise a plurality of magnets. The magnet 3320 may comprise four magnets. The magnet 3320 may comprise first to fourth magnets 3321, 3322, 3333, and 3334. The first magnet 3321 may be disposed on the first side portion of the housing 3310. The second magnet 3322 may be disposed on the second side portion of the housing 3310. The third magnet 3323 may be disposed on the third side portion of the housing 3310. The fourth magnet 3324 may be disposed on the fourth side portion of the housing 3310.

The lens driving device 3010 may comprise a base 3400. The base 3400 may be disposed below the housing 3310. The base 3400 may be disposed below the bobbin 3210. The base 3400 may be spaced apart from the bobbin 3210 at least in part. The base 3400 may be coupled to the side plate 3120 of the cover 3100. The base 3400 may be disposed between the bobbin 3210 and the sensor holder. The base 3400 may be formed separately from the sensor holder. However, as a modified embodiment, the base 3400 may be integrally formed with the sensor holder.

The base 3400 may comprise a hole 3410. The hole 3410 may be a hollow hole. The hole 3410 may penetrate through the base 3400 in the optical axis direction. Light passing through the lens through the hole 3410 may be incident on the image sensor 3060.

The base 3400 may comprise a groove 3420. The groove 3420 of the base 3400 may be an 'adhesive accommodating groove'. The groove 3420 may be formed on an upper surface of the base 3400. The groove 3420 may be formed at a position corresponding to the hole 3630 of the substrate 3600. The groove 3420 may be formed at a position corresponding to the hole 3522a of the lower elastic part material 3520. An adhesive may be disposed on at least a portion of the groove 3420. The substrate 3600 and the outer side portion 3522 of the lower elastic part material 3520 may be fixed to the base 3400 by an adhesive.

As a modified embodiment, the base 3400 may comprise a protrusion. The protrusion may be formed on an upper surface of the base 3400. The protrusion may be formed at a position corresponding to the hole 3630 of the substrate 3600. The protrusion may be formed at a position corresponding to the hole 3522a of the lower elastic part material 3520. The protrusion of the base 3400 may be inserted into the hole 3522a of the lower elastic part material 3520 and the hole 3630 of the substrate 3600. That is, the assembly position of the outer side portion 3522 of the lower elastic part material 3520 and the substrate 3600 may be aligned and/or guided by the protrusion of the base 3400.

An adhesive may be disposed on at least a portion of the groove 3420. The substrate 3600 and the outer side portion 3522 of the lower elastic part 3520 may be fixed to the base 3400 by an adhesive.

The base 3400 may comprise a protruding part 3430. The protruding part 3430 may be extended from an outer side surface of the base 3400. The protruding part 3430 may be protruded from an upper surface of the base 3400. The protruding part 3430 may be formed on an upper surface of the base 3400. The protruding part 3430 may be formed around the outer circumference of the base 3400.

The protruding part 3430 may comprise a plurality of protruding parts. The protruding part 3430 may comprise first to third protruding parts 3431, 3432, and 3433. The protruding part 3430 may comprise: a first protruding part 3431 formed on a first side of the outer side surface of the base 3400; and a second protruding part 3432 formed on a second side opposite to the first side among the outer side surfaces of the base 3400.

The base 3400 may comprise a groove 3440. The groove 3440 may be a terminal part accommodating groove. The groove 3440 may be formed by being recessed in the side surface of the base 3400. A terminal 3524 of the lower elastic part material 3520 may be disposed in the groove 3440. The groove 3440 may be formed to correspond to the shape of at least a portion of the terminal 3524 of the lower elastic part material 3520. The depth of the groove 3440 may correspond to the thickness of the terminal 3524 of the lower elastic part material 3520 or may be greater than the thickness of the terminal 3524.

The base 3400 may comprise a step 3450. The step 3450 may be formed on a side surface of the base 3400. The step 3450 may be formed on an outer circumferential surface of the base 3400. The step 3450 may be formed as a lower portion of a side surface of the base 3400 is protruded. The lower end of the side plate 3120 of the cover 3100 may be disposed on the step 3450.

The base 3400 may comprise a groove 3460. The groove 3460 may be formed on a lower surface of the base 3400. The groove 3460 may be formed to be spaced apart from the outer circumference of the base 3400. A sensor holder may be form fitted into the groove 3460 of the base 3400.

The lens driving device 3010 may comprise an elastic part material 3500. The elastic part material 3500 may connect the housing 3310 and the bobbin 3210. The elastic part material 3500 may be coupled to the housing 3310 and bobbin 3210. The elastic part material 3500 may movably support the bobbin 3210. The elastic part material 3500 may elastically support the bobbin 3210. The elastic part material 3500 may have elasticity at least in part. The elastic part material 3500 may support the movement of the bobbin 3210 when AF driving. At this time, the elastic part material 3500 may be an 'AF support member'.

The elastic part material 3500 may comprise an upper elastic part material 3510. The upper elastic part material 3510 may be coupled to an upper portion of the bobbin 3210 and an upper portion of the housing 3310. The upper elastic part material 3510 may be coupled to an upper surface of the bobbin 3210. The upper elastic part material 3510 may be coupled to an upper surface of the housing 3310. The upper elastic part material 3510 may be formed of a leaf spring.

The upper elastic part material 3510 may comprise an inner side part 3511. The inner side part 3511 may be coupled to the bobbin 3210. The inner side part 3511 may be coupled to an upper surface of the bobbin 3210. The inner side part 3511 may comprise a hole or groove coupled to the protrusion of the bobbin 3210. The inner side part 3511 may be fixed to the bobbin 3210 by an adhesive.

The upper elastic part material 3510 may comprise an outer side part 3512. The outer side part 3512 may be coupled to the housing 3310. The outer side part 3512 may be coupled to an upper surface of the housing 3310. The outer side part 3512 may comprise a hole or groove coupled to the protrusion 3313 of the housing 3310. The outer side part 3512 may be fixed to the housing 3310 by an adhesive.

The upper elastic part material 3510 may comprise a connection part 3513. The connection part 3513 may connect the outer side part 3512 and the inner side part 3511. The connection part 3513 may have elasticity. At this time, the connection part 3513 may be referred to as an 'elastic part'. The connection part 3513 may comprise a shape being bent twice or more.

The elastic part material 3500 may comprise a lower elastic part material 3520. The lower elastic part material 3520 may connect the bobbin 3210 and the base 3400. The lower elastic part material 3520 may be coupled to a lower portion of the bobbin 3210 and a lower portion of the housing 3310. The lower elastic part material 3520 may be coupled to the lower surface of the bobbin 3210. The lower elastic part material 3520 may be coupled to the lower surface of the housing 3310. The lower elastic part material 3520 may be formed of a leaf spring. A portion of the lower elastic part material 3520 may be fixed between the housing 3310 and the base 3400.

The lower elastic part material 3520 may comprise a plurality of lower elastic part materials. The lower elastic part material 3520 may comprise two lower elastic part materials. The lower elastic part material 3520 may comprise first and second lower elastic part materials 35204 and 3520-2. The first and second lower elastic part materials 3520-1 and 3521-2 may be spaced apart from each other.

The first and second lower elastic part materials 3520-1 and 3520-2 may be electrically connected to the first coil 3220. The first and second lower elastic part materials 3520-1 and 3520-2 may be used as conductive lines for applying a current to the first coil 3220. The lower elastic part material 3520 may comprise a first lower elastic unit 3520-1 electrically connected to one end of the first coil 3220, and a second lower elastic unit 3520-2 spaced apart from the first lower elastic unit 35204 and electrically connected to the other end of the first coil 3220. Each of the first lower elastic unit 3520-1 and the second lower elastic unit 3520-2 may comprise a terminal 3524.

The lower elastic part material 3520 may comprise an inner side part 3521. The inner side part 3521 may be connected to the bobbin 3210. The inner side part 3521 may be coupled to the bobbin 3210. The inner side part 3521 may be coupled to a lower surface of the bobbin 3210. The inner side part 3521 may comprise a hole or groove coupled to the protrusion of the bobbin 3210, The inner side part 3521 may be fixed to the bobbin 3210 by an adhesive.

The lower elastic part material 3520 may comprise an outer side part 3522. The outer side part 3522 may be disposed on an upper surface of the substrate 3600. The outer side part 3522 may directly contact an upper surface of the substrate 3600. The outer side part 3522 may be fixed to an upper surface of the substrate 3600 by an adhesive. The outer side part 3522 may be coupled to an upper surface of the substrate 3600. The outer side part 3522 may be fixed to the base 3400. The outer side part 3522 may be fixed to an upper surface of the base 3400. The outer side part 3522 may be connected to the base 3400. The outer side part 3522 may be coupled to the housing 3310. The outer side part 3522 may be coupled to a lower surface of the housing 3310. The outer side part 3522 may comprise a hole or groove coupled to the protrusion of the housing 3310. The outer side part 3522 may be fixed to the housing 3310 by an adhesive.

The lower elastic part material 3520 may comprise a hole 3522a formed in the outer side part 3522. The hole 3522a of the outer side part 3522 may be formed at a position corresponding to the hole 3630 of the substrate 3600 and the groove 3420 of the base 3400. An adhesive may be disposed in at least a portion of the hole 3522a of the outer side part 3522.

The lower elastic part material 3520 may comprise a connection part 3523. The connection part 3523 may connect the outer side part 3522 and the inner side part 3521. The connection part 3523 may have elasticity. At this time, the connection part 3523 may be referred to as an 'elastic part'. The connection part 3523 may comprise a shape bent twice or more.

The lower elastic part material 3520 may comprise terminals 3524. The terminal 3524 may be extended from the outer side part 3522. The terminal 3524 may be connected to the outer side part 3522. The terminal 3524 may be integrally formed with the outer side part 3522 and may be bent downward from the outer side part 3522. In a modified embodiment, the terminal 3524 may be formed separately from the lower elastic part material 3520. Terminal 3524 may comprise two terminals. The terminal 3524 may be coupled to the terminal of the printed circuit board 3050 through a conducting member. At this time, the conducting member may be a solder ball or a conducting epoxy. The terminal 3524 may be disposed on a side surface of the base 3400. The terminal 3524 may be disposed in the groove 3440 of the base 3400. Each of the two lower elastic part materials may comprise a terminal 3524. The terminal 3524 may be disposed between the second coil 3611 and the base 3400 in a direction perpendicular to the optical axis. The terminal 3524 may penetrate the substrate 3600. The terminal 3524 may penetrate through the body part 3610 of the substrate 3600.

The lens driving device 3010 may comprise a substrate 3600. The substrate 3600 may comprise a flexible printed circuit board (FPCB). The substrate 3600 may be disposed on the base 3400. The substrate 3600 may be disposed on an upper surface of the base 3400. At least a portion of the substrate 3600 may be overlapped with the magnet 3320 in the optical axis direction. The substrate 3600 may be disposed between the outer side part 3522 of the lower elastic part material 3520 and the base 3400.

The substrate 3600 may comprise a body part 3610. The body part 3610 may be disposed on an upper surface of the base 3400. The body part 3610 may be disposed between the first protruding part 3431 and the second protruding part 3432.

The lens driving device 3010 may comprise a second coil 3611. The substrate 3600 may comprise a second coil 3611. The body part 3610 of the substrate 3600 may comprise a second coil 3611. The second coil 3611 may be a sensing coil. The second coil 3611 may be disposed on the base 3400. The second coil 3611 may be disposed on an upper surface of the base 3400. At least a portion of the second coil 3611 may be overlapped with the first coil 3220 in the optical axis direction. At least a portion of the second coil 3611 may be overlapped with the base 3400 in a direction perpendicular to the optical axis. The second coil 3611 may be formed as a patterned coil on the substrate 3600. The second coil 3611 may be formed as an FP coil (fine pattern coil) on the substrate 3600.

In the present embodiment, an arbitrary high frequency signal may be synthesized with a driving signal for driving the lens module 3020 and applied to the first coil 3220. In one example, the driving signal is a signal component for moving the mover 3200, and the high-frequency signal may be a signal component for sensing the position of the mover 3200. The high frequency signal may be a higher frequency signal than the driving signal. The high frequency signal synthesized into the driving signal may be about 100 kHz to about 5 MHz. An induced current or voltage may be generated in the second coil 3611 by interaction with the first coil 3220. That is, an induced current or voltage may be generated in the second coil 3611 by the high-frequency signal applied to the first coil 3220, and the position of the mover 3200 may be sensed by measuring the generated induced current or voltage.

In the present embodiment, as the second coil 3611 is formed as a patterned coil on the substrate 3600, an increase of a thickness of the substrate 3600 or less may be caused in the total length of the camera module when compared to an open loop auto focus (OLAF) module without the second coil 3611.

In a modified embodiment, the second coil 3611 may be wound separately from the substrate 3600. The second coil 3611 may be provided separately from the substrate 3600 and may be coupled to the substrate 3600 through soldering. In this case, the lower elastic part material 3520 may be connected to the substrate 3600 without the terminal 3524, and the bent portion of the substrate 3600 may be connected to the printed circuit board 3050.

The body part 3610 of the substrate 3600 may comprise a substrate part 3612. The substrate part 3612 may be a portion of the body part 3610 of the substrate 3600 excluding the second coil 3611.

The substrate 3600 may comprise a terminal part 3620. The terminal part 3620 may be extended downward from the body part 3610. The terminal part 3620 may be disposed on a third side connecting the first side and the second side among the outer side surfaces of the base 3400. The terminal part 3620 may be disposed between the terminal 3524 of the first lower elastic unit 3520-1 and the terminal 3524 of the second lower elastic unit 3520-2. The terminal part 3620 may comprise two terminals electrically connected to the second coil 3611.

In a modified embodiment, each of the first lower elastic unit 3520-1 and the second lower elastic unit 3520-2 may be electrically connected to the substrate 3600. At this time, the terminal part 3620 of the substrate 3600 may comprise four terminals as illustrated in FIG. 57b. In more detail, the terminal part 3620 of the substrate 3600 may comprise two terminals electrically connected to the first coil 3220 and two terminals electrically connected to the second coil 3611.

The substrate 3600 may comprise a hole 3630. The hole 3630 may be formed at a position corresponding to the hole 3522a of the outer side part 3522 of the lower elastic part material 3520. The hole 3630 may be formed at a position corresponding to the groove 3420 of the base 3400. An adhesive may be disposed in at least a portion of the hole 3630.

In a modified embodiment, the substrate 3600 may comprise a hole formed at a position corresponding to the lower stopper 3215 of the bobbin 3210. In case when the bobbin 3210 moves downward, the lower stopper 3215 of the bobbin 3210 may be in contact with the base 3400 instead of the substrate 3600. Accordingly, a phenomenon in which the lower stopper 3215 of the bobbin 3210 continuously strikes the substrate 3600 may prevent the second coil 3611 of the substrate 3600 from being damaged.

Hereinafter, a camera module according to a third embodiment of the present invention will be described with reference to the drawings.

Figure 60:
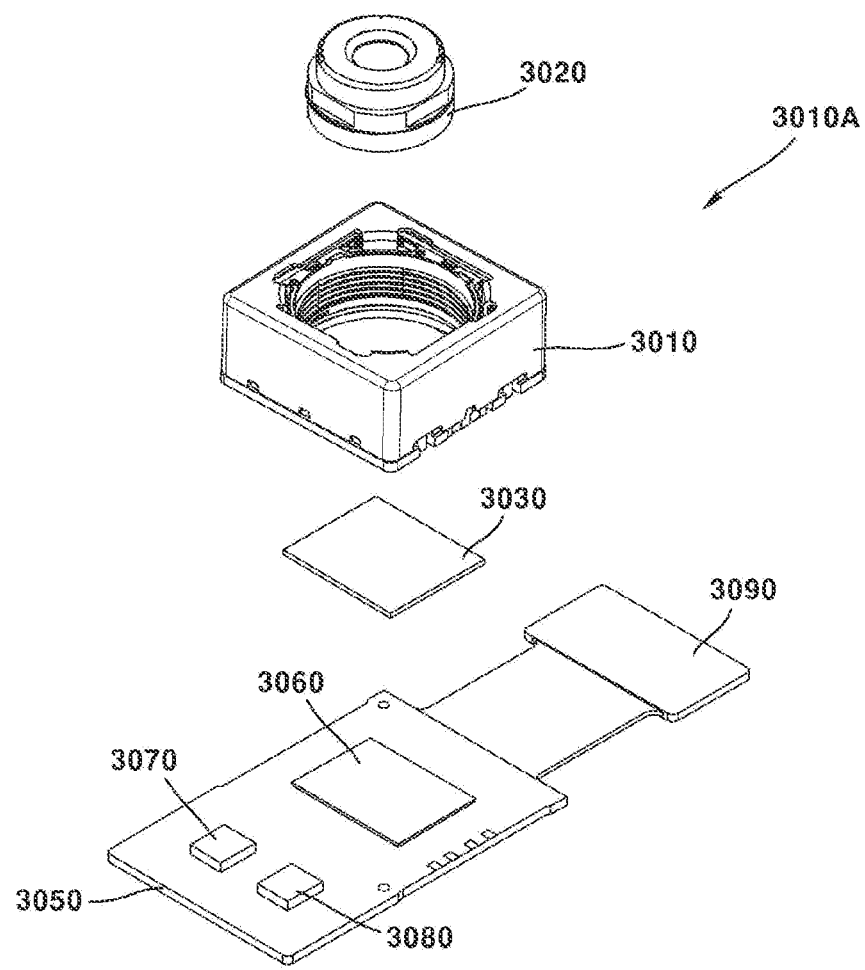
FIG. 60 is an exploded perspective view of a camera module according to a third embodiment of the present invention.

FIG. 60 is an exploded perspective view of a camera module according to a third embodiment of the present invention.

The camera device 3010A may comprise a camera module.

The camera device 3010A may comprise a lens module 3020. The lens module 3020 may comprise at least one lens. The lens may be disposed at a position corresponding to the image sensor 3060. The lens module 3020 may comprise a lens and a barrel. The lens module 3020 may be coupled to a bobbin 3210 of the lens driving device 3010. The lens module 3020 may be coupled to the bobbin 3210 by screw-coupling and/or adhesive. The lens module 3020 may move integrally with the bobbin 3210.

The camera device 3010A may comprise a filter 3030. The filter 3030 may serve to block light of a specific frequency band from being incident on the image sensor 3060 in light passing through the lens module 3020. The filter 3030 may be disposed to be parallel to the x-y plane. The filter 3030 may be disposed between the lens module 3020 and the image sensor 3060. The filter 3030 may be disposed in the sensor holder. In a modified embodiment, the filter 3030 may be disposed on the base 3400. The filter 3030 may be adhesively fixed to a lower surface of the base 3400. A groove having a shape corresponding to that of the filter 3030 may be formed on a lower surface of the base 3400. The filter 3030 may comprise an infrared filter. The infrared filter may block light in the infrared region from being incident on the image sensor 3060.

The camera device 3010A may comprise a sensor holder. The sensor holder may be disposed between the lens driving device 3010 and the printed circuit board 3050. The sensor holder may comprise a protruding part 341 on which the filter 3030 is disposed. An opening may be formed in a portion of the sensor holder where the filter 3030 is disposed so that light passing through the filter 3030 may be incident on the image sensor 3060. The adhesive member 345 may couple or attach the base 3400 of the lens driving device 3010 to the sensor holder. The adhesive member 345 may additionally serve to prevent foreign substances from being introduced into the lens driving device 3010. The adhesive member 345 may comprise any one or more among an epoxy, a thermosetting adhesive, and an ultraviolet curable adhesive.

The camera device 3010A may comprise a printed circuit board (PCB) 3050. The printed circuit board 3050 may be a board or a circuit board. A lens driving device 3010 may be disposed on the printed circuit board 3050. A sensor holder may be disposed between the printed circuit board 3050 and the lens driving device 3010. The printed circuit board 3050 may be electrically connected to the lens driving device 3010. An image sensor 3060 may be disposed on the printed circuit board 3050. The printed circuit board 3050 may be provided with various circuits, devices, control units, and the like in order to convert an image formed on the image sensor 3060 into an electrical signal and transmit it to an external device.

The camera device 3010A may comprise an image sensor 3060. The image sensor 3060 may be a configuration in which light passing through a lens and a filter 3030 is incident to form an image. The image sensor 3060 may be mounted on the printed circuit board 3050. The image sensor 3060 may be electrically connected to the printed circuit board 3050. For example, the image sensor 3060 may be coupled to the printed circuit board 3050 by a surface mounting technology (SMT). As another example, the image sensor 3060 may be coupled to the printed circuit board 3050 by flip chip technology. The image sensor 3060 may be disposed so that the lens and the optical axis coincide. That is, the optical axis of the image sensor 3060 and the optical axis of the lens may be aligned. The image sensor 3060 may convert light irradiated to the effective image area of the image sensor 3060 into an electrical signal. The image sensor 3060 may be any one among a charge coupled device (CCD), a metal oxide semi-conductor (MOS), a CPD, and a CID.

The camera device 3010A may comprise a motion sensor 3070. The motion sensor 3070 may be mounted on the printed circuit board 3050. The motion sensor 3070 may be electrically connected to the control unit 3080 through a circuit pattern provided on the printed circuit board 3050. The motion sensor 3070 may output rotational angular velocity information due to the movement of the camera device 3010A. The motion sensor 3070 may comprise a 2-axis or 3-axis gyro sensor, or an angular velocity sensor.

The camera device 3010A may comprise a control unit 3080. The control unit 3080 may be disposed on the printed circuit board 3050. The control unit 3080 may be electrically connected to the first and second coils 3220 and 3430 of the lens driving device 3010. The control unit 3080 may individually control the direction, intensity, and amplitude of the current supplied to the first and second coils 3220 and 3430. The control unit 3080 may control the lens driving device 3010 to perform an autofocus function and/or an image stabilization function. Furthermore, the control unit 3080 may perform auto focus feedback control and/or handshake correction feedback control for the lens driving device 3010.

The camera device 3010A may comprise a connector 3090. The connector 3090 may be electrically connected to the printed circuit board 3050. The connector 3090 may comprise a port for electrically connecting to an external device.

Hereinafter, an optical apparatus according to a third embodiment of the present invention will be described with reference to the drawings.

Figure 61:
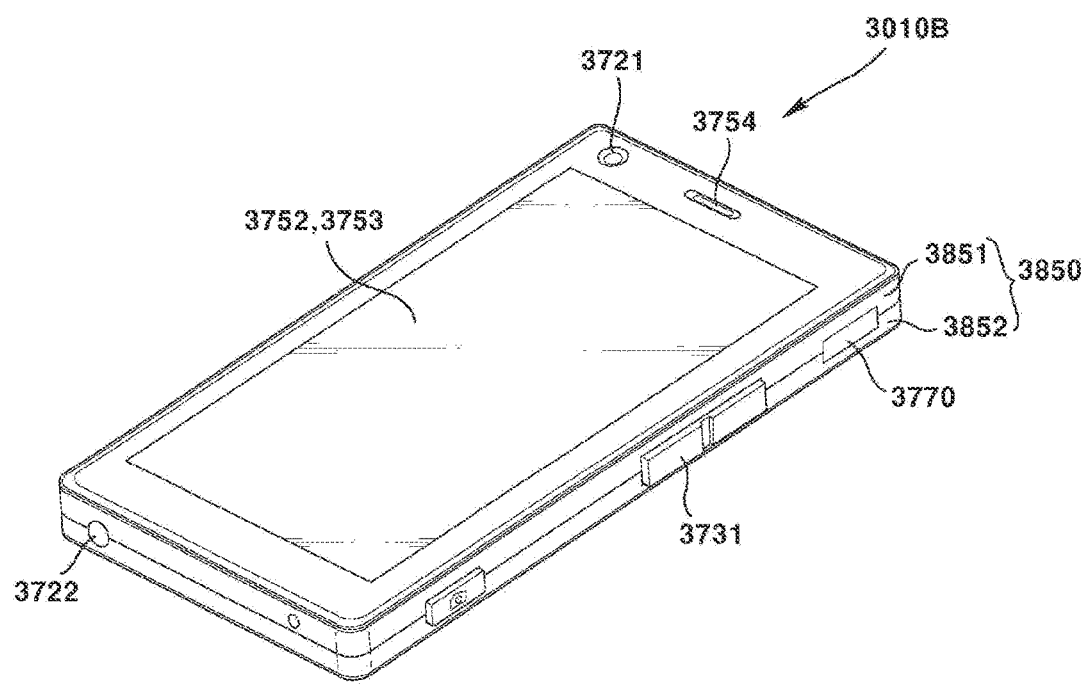
FIG. 61 is a perspective view of an optical apparatus according to a third embodiment of the present invention.
Figure 62:
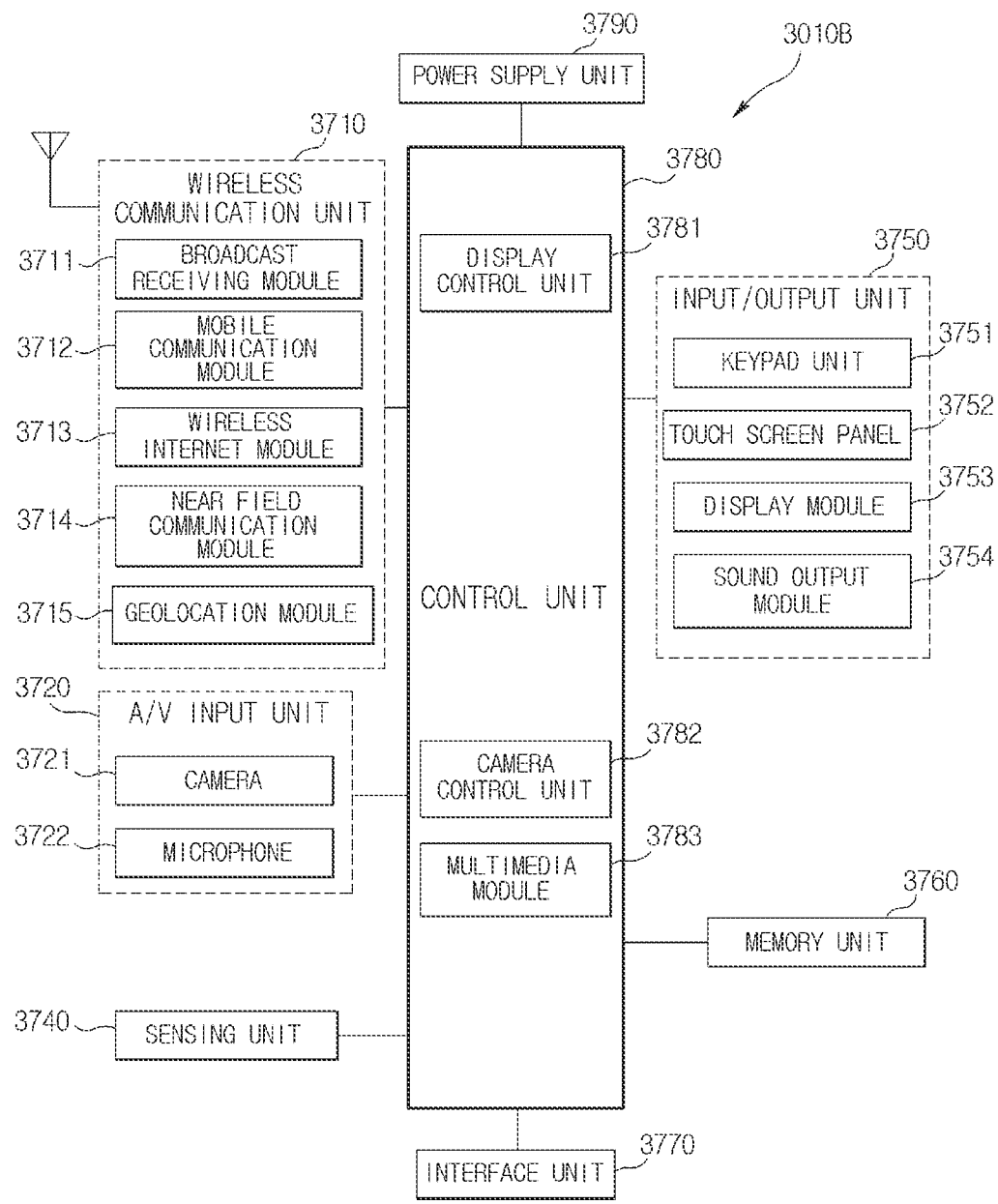
FIG. 62 is a block diagram of an optical apparatus according to a third embodiment of the present invention.

FIG. 61 is a perspective view of an optical apparatus according to a third embodiment of the present invention, and FIG. 62 is a block diagram of an optical apparatus according to a third embodiment of the present invention.

The optical apparatus 3010B may be any one among a hand phone, a mobile phone, a smart phone, a portable smart device, a digital camera, a laptop computer, a digital broadcasting terminal, a personal digital assistant (PDA), a portable multimedia player (PMP), and a navigation device However, the type of the optical apparatus 3010B is not limited thereto, and any device for photographing an image or a picture may be comprised in the optical apparatus 3010B.

The optical apparatus 3010B may comprise a main body 3850. The body 3850 may have a bar shape. Or, the main body 3850 may have various structures such as a slide type, a folder type, a swing type, a swivel type, in which two or more sub-bodies are coupled to be relatively movable. The main body 3850 may comprise a case (casing, housing, and cover) forming an outer appearance. For example, the main body 3850 may comprise a front case 3851 and a rear case 3852. Various electronic components of the optical apparatus 3010B may be embedded in a space formed between the front case 3851 and the rear case 3852. A display module 3753 may be disposed on one surface of the body 3850. A camera 3721 may be disposed on one or more surfaces of one surface of the body 3850 and the other surface disposed opposite to the one surface.

The optical apparatus 3010B may comprise a wireless communication unit 3710. The wireless communication unit 3710 may comprise one or more modules that enable wireless communication between the optical apparatus 3010B and a wireless communication system or between the optical apparatus 3010B and a network in which the optical apparatus 3010B is located. For example, the wireless communication unit 3710 may be composed of a broadcast reception module 3711, a mobile communication module 3712, a wireless Internet module 3713, a short-range communication module 3714, and a location information module 3715.

The optical apparatus 3010B may comprise an A/V input unit 3720. The A/V input unit 3720 is for inputting an audio signal or a video signal, and may comprise a camera 3721, a microphone 3722, and the like. At this time, the camera 3721 may comprise a camera device 3010A according to an embodiment.

The optical apparatus 3010B may comprise a sensing unit 3740. The sensing unit 3740 may generate a sensing signal for controlling the operation of the terminal 3200A by detecting the current state of the terminal 3200A, such as the opening/closing state of the terminal 3200A, the position of the terminal 3200A, the presence or absence of user contact, the orientation of the terminal 3200A, acceleration/deceleration of the terminal 3200A, and the like. For example, when the terminal 3200A is in the form of a slide phone, it is possible to sense whether the slide phone is opened or closed. In addition, it is responsible for sensing functions related to whether the power supply unit 3790 is supplied with power, whether the interface unit 3770 is coupled to an external device, and the like.

The optical apparatus 3010B may comprise an input/output unit 3750. The input/output unit 3750 is for generating input or output in relation to the sense of sight, hearing, or touch. The input/output unit 3750 may generate input data for operation control of the optical apparatus 3010B, and in addition, may display information processed by the optical apparatus 3010B.

The input/output unit 3750 may comprise any one or more among a keypad unit 3751, a touch screen panel 3752, a display module 3753, and a sound output module 3754. The keypad unit 3751 may generate input data in response to a keypad input. The touch screen panel 3752 may convert a change in capacitance generated due to a user's touch on a specific area of the touch screen into an electrical input signal. The display module 3753 may output an image photographed by the camera 3721. The display module 3753 may comprise a plurality of pixels whose color changes according to an electrical signal. For example, the display module 3751 may comprise at least one among a liquid crystal display, a thin film transistor-liquid crystal display, an organic light-emitting diode, a flexible display, and a 3D display. The sound output module 3754 may output audio data received from the wireless communication unit 3710 in a call signal reception, a call mode, a recording mode, a voice recognition mode, or a broadcast reception mode, and the like, or may output audio data stored in the memory unit 3760.

The optical apparatus 3010B may comprise a memory unit 3760. A program for processing and controlling the control unit 3780 may be stored in the memory unit 3760. In addition, the memory unit 3760 may store input/output data, for example, any one or more among a phone book, a message, an audio, a still image, a photo, and a moving image. The memory unit 3760 may store an image, for example, photo, or video photographed by the camera 3721.

The optical apparatus 3010B may comprise an interface unit 3770. The interface unit 3770 serves as a passage for connecting to an external device connected to the optical apparatus 3010B. The interface unit 3770 receives data from an external device, receives power and transmits it to each component inside the optical apparatus 3010B, or transmits data inside the optical apparatus 3010B to an external device. For example, the interface unit 3770 may comprise one or more among a wired/wireless headset port, an external charger port, a wired/wireless data port, a memory card port, a port for connecting a device having an identification module, and an audio input/output (I/O) port, video input/output (I/O) port, an earphone port, and the like.

The optical apparatus 3010B may comprise a control unit 3780. The control unit 3780 may control the overall operation of the optical apparatus 3010B. The control unit 3780 may perform related control and processing for voice call, data communication, video call, and the like. The control unit 3780 may comprise a display control unit 3781 that controls a display module 3753 that is a display of the optical apparatus 3010B. The control unit 3780 may comprise a camera control unit 3782 that controls the camera device 3010A. The control unit 3780 may comprise a multimedia module 3783 for playing multimedia. The multimedia module 3783 may be provided in the control unit 3180 or may be provided separately from the control unit 3780. The control unit 3780 may perform a pattern recognition process capable of recognizing a handwriting input or a drawing input performed on the touch screen as characters and images, respectively.

The optical apparatus 3010B may comprise a power supply unit 3790. The power supply unit 3790 may receive external power or internal power under the control of the control unit 3780 to supply power required for operation of each component.

The lens driving device according to the third embodiment of the present invention may comprise the sensing structure of the first embodiment of the present invention. In more detail, the lens driving device according to the third embodiment of the present invention may comprise a sensing coil 180 and a position sensor 170 according to the first embodiment of the present invention. The lens driving device according to the third embodiment of the present invention may comprise the sensing structure of the second embodiment of the present invention. In more detail, the lens driving device according to the third embodiment of the present invention may comprise a sensing coil 2180 and a position sensor 2170 according to the second embodiment of the present invention.

The fourth embodiment of the present invention may comprise some configurations of the first embodiment and some configurations of the second embodiment of the present invention. The fifth embodiment of the present invention may comprise some configurations of the second embodiment and some configurations of the third embodiment of the present invention. The sixth embodiment of the present invention may comprise some configurations of the first embodiment and some configurations of the third embodiment of the present invention. The seventh embodiment of the present invention may comprise some configurations of the first embodiment, some configurations of the second embodiment, and some configurations of the third embodiment of the present invention. In more detail, the sensing coil and the position sensor of the first or second embodiment may be applied to the third embodiment of the present invention.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A lens driving device comprising:
a substrate;
a housing disposed on the substrate;
a bobbin disposed in the housing;
a sensing coil disposed on the bobbin;
a first magnet, a second magnet, a third magnet, and a dummy member disposed on different side portions of the housing;
a first coil comprising a first coil unit corresponding to the first magnet and a second coil unit corresponding to the second magnet;
a second coil comprising third to fifth coil units corresponding to the first to third magnets in an optical axis direction; and
a first position sensor disposed on the substrate and configured to sense the sensing coil, wherein the first magnet and the second magnet are disposed opposite to each other, and the third magnet and the dummy member are disposed opposite to each other,
wherein a long side length of the sensing coil is smaller than a long side length of each of the third to fifth coil units,
wherein a short side length of the sensing coil is smaller than a short side length of each of the third to fifth coil units, and
wherein a length of the sensing coil in the optical axis direction is greater than a length of each of the third to fifth coil units in the optical axis direction.

2. The lens driving device of claim 1,
wherein a driving signal is provided to the sensing coil, and the first position sensor is configured to detect a strength of a magnetic field of the sensing coil and output an output signal.

3. The lens driving device of claim 1, wherein the sensing coil is overlapped with the first position sensor in the optical axis direction.

4. The lens driving device of claim 1, wherein the bobbin comprises a protruding part protruding from an outer lateral surface of the bobbin, and
wherein the sensing coil is coupled to the protruding part of the bobbin.

5. The lens driving device of claim 4, wherein the sensing coil has a ring shape comprising a hole coupled to the protruding part of the bobbin, and
wherein the hole of the sensing coil is formed to pass through the sensing coil in the optical axis direction.

6. The lens driving device of claim 1, wherein the sensing coil is disposed at a position lower than a center of each of the first coil unit and the second coil unit.

7. The lens driving device of claim 1, wherein the dummy member comprises a first dummy and a second dummy spaced apart from each other, and
wherein at least a portion of the sensing coil is disposed between the first dummy and the second dummy.

8. The lens driving device of claim 1, further comprising a second position sensor disposed on the substrate and comprising a first sensor corresponding to the first magnet and a second sensor corresponding to the third magnet.

9. The lens driving device of claim 1, wherein the sensing coil is not overlapped with the third to fifth coil units in the optical axis direction.

10. The lens driving device of claim 1, wherein the first position sensor is a Hall sensor, a driver IC comprising the Hall sensor, or a Tunnel Magnetoresistance (TMR) sensor.

11. The lens driving device of claim 1, wherein the first position sensor is closer to the dummy member than to each of the first magnet, the second magnet and the third magnet.

12. A camera module comprising:
a printed circuit board;
an image sensor disposed on the printed circuit board;
the lens driving device of claim 1 disposed on the printed circuit board; and
a lens coupled to the bobbin of the lens driving device.

13. An optical apparatus comprising:
a main body;
the camera module of claim 12 disposed on the main body; and
a display disposed on the main body and outputting an image photographed by the camera module.

14. The lens driving device of claim 1, wherein a damper is disposed between an inner lateral surface of the housing and an outer lateral surface of the bobbin.

15. The lens driving device of claim 1, further comprising:
first to fourth upper elastic members coupled with an upper surface of the bobbin and an upper surface of the housing, the first to fourth upper elastic members being spaced apart from each other, each of the first to fourth upper elastic members including:
  a first inner frame coupled with the bobbin;
  a first outer frame coupled with the housing; and
  a first frame connection part connecting the first inner frame and the first outer frame, and
a damper disposed in a space between the bobbin and the first frame connection part of each of the first to fourth upper elastic members.

16. The lens driving device of claim 1, further comprising:
a lower elastic member including a second inner frame coupled with a lower surface of the bobbin, a second outer frame coupled with a lower surface of the housing, and a second frame connection part connecting the second inner frame and a second outer frame; and
a damper disposed between the second frame connection part of the lower elastic member and the bobbin.

17. A lens driving device comprising:
a base;
a substrate disposed on the base;
a housing disposed on the substrate;
a bobbin disposed in the housing;
a driving magnet comprising first to third magnets;
a first coil disposed on the bobbin and comprising a first coil unit corresponding to the first magnet and a second coil unit corresponding to the second magnet;
a second coil disposed on the substrate and comprising third to fifth coil units corresponding to the first to third magnets in an optical axis direction;
a dummy member disposed on the housing;
a sensing coil disposed on the bobbin; and
a first position sensor disposed on the substrate and configured to sense the sensing coil,
wherein the first position sensor is closer to the dummy member than to the driving magnet,
wherein a long side length of the sensing coil is smaller than a long side length of each of the third to fifth coil units,
wherein a short side length of the sensing coil is smaller than a short side length of each of the third to fifth coil units, and
wherein a length of the sensing coil in the optical axis direction is greater than a length of each of the third to fifth coil units in the optical axis direction.

18. The lens driving device of claim 17, wherein the first magnet and the second magnet are disposed opposite to each other,
wherein the third magnet is disposed opposite to the dummy member, and
wherein the first position sensor is closer to the dummy member than to each of the first magnet, the second magnet and the third magnet.

19. The lens driving device of claim 18, further comprising a second position sensor disposed on the substrate and comprising a first sensor configured to sense the first magnet and a second sensor configured to sense the third magnet.

20. The lens driving device of claim 17, wherein the dummy member comprises a first dummy and a second dummy spaced apart from each other, and
wherein at least a portion of the sensing coil is disposed between the first dummy and the second dummy.

* * * * *